Nov. 29, 1960 T. G. GRANRYD 2,961,889

TRACTOR LOADERS

Original Filed Sept. 10, 1956 16 Sheets-Sheet 1

INVENTOR.

Thorwald G. Granryd

BY Paul O. Pippel

Atty.

Nov. 29, 1960 T. G. GRANRYD 2,961,889

TRACTOR LOADERS

Original Filed Sept. 10, 1956 16 Sheets-Sheet 2

INVENTOR.
Thorwald G. Granryd
BY Paul O. Pippel
Atty.

Nov. 29, 1960 T. G. GRANRYD 2,961,889

TRACTOR LOADERS

Original Filed Sept. 10, 1956 16 Sheets-Sheet 3

INVENTOR.
Thorwald G. Granryd
BY Paul O. Pippel
Atty.

Nov. 29, 1960 T. G. GRANRYD 2,961,889

TRACTOR LOADERS

Original Filed Sept. 10, 1956 16 Sheets-Sheet 4

INVENTOR.
Thorwald G. Granryd
BY Paul O. Pippel
Att'y.

Nov. 29, 1960 T. G. GRANRYD 2,961,889

TRACTOR LOADERS

Original Filed Sept. 10, 1956 16 Sheets-Sheet 5

INVENTOR.
Thorvald G. Granryd
BY Paul O. Pippel
Atty.

Nov. 29, 1960 T. G. GRANRYD 2,961,889

TRACTOR LOADERS

Original Filed Sept. 10, 1956 16 Sheets-Sheet 6

INVENTOR.
Thorwald G. Granryd
BY Paul O. Pippel
Atty.

INVENTOR.
Thorwald G. Granryd
BY Paul O. Pippel
Atty.

INVENTOR.
Thorwald G. Granryd
BY Paul O. Pippel
Atty.

Nov. 29, 1960 T. G. GRANRYD 2,961,889

TRACTOR LOADERS

Original Filed Sept. 10, 1956 16 Sheets-Sheet 9

INVENTOR.

Thorwald G. Granryd

BY Paul O. Pippel

Atty.

Nov. 29, 1960 T. G. GRANRYD 2,961,889

TRACTOR LOADERS

Original Filed Sept. 10, 1956 16 Sheets-Sheet 10

INVENTOR.
Thorvald G. Granryd
BY Paul O. Pippel
Atty.

Nov. 29, 1960

T. G. GRANRYD 2,961,889

TRACTOR LOADERS

Original Filed Sept. 10, 1956

16 Sheets-Sheet 11

INVENTOR.

Thorvald G. Granryd

BY Paul O. Pippel

Atty

Nov. 29, 1960 T. G. GRANRYD 2,961,889

TRACTOR LOADERS

Original Filed Sept. 10, 1956 16 Sheets-Sheet 12

INVENTOR.
Thorvald G. Granryd
BY Paul O. Pippel
Atty.

INVENTOR.
Thorvald G. Granryd
BY Paul O. Pippel
Atty.

Nov. 29, 1960

T. G. GRANRYD 2,961,889

TRACTOR LOADERS

Original Filed Sept. 10, 1956

16 Sheets-Sheet 14

INVENTOR.
Thorvald G. Granryd
BY Paul O. Pippel
Atty.

Nov. 29, 1960 T. G. GRANRYD 2,961,889

TRACTOR LOADERS

Original Filed Sept. 10, 1956 16 Sheets-Sheet 15

INVENTOR.
Thorvald G. Granryd
BY Paul O. Pippel
Atty.

Nov. 29, 1960
T. G. GRANRYD
2,961,889
TRACTOR LOADERS
Original Filed Sept. 10, 1956
16 Sheets-Sheet 16
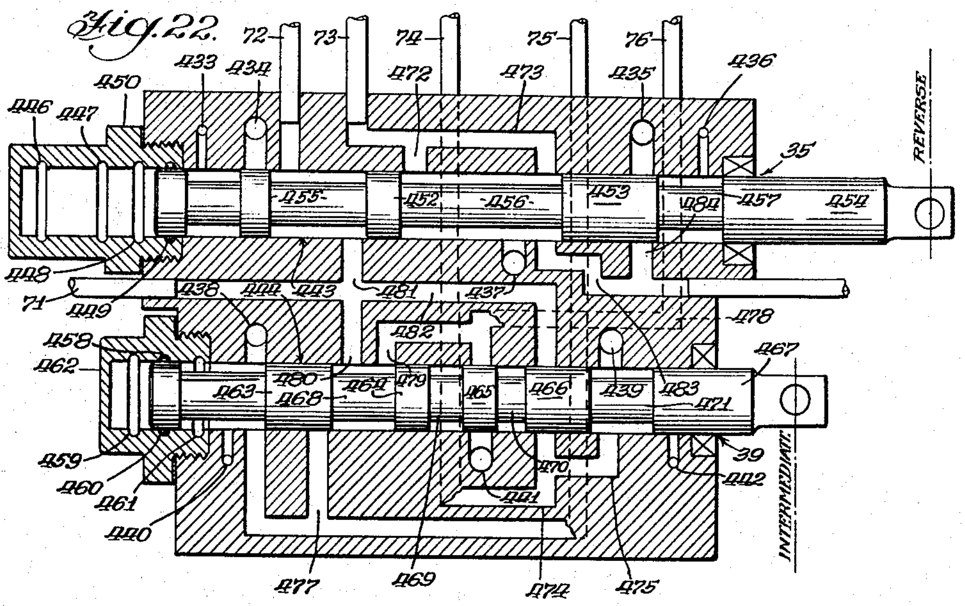
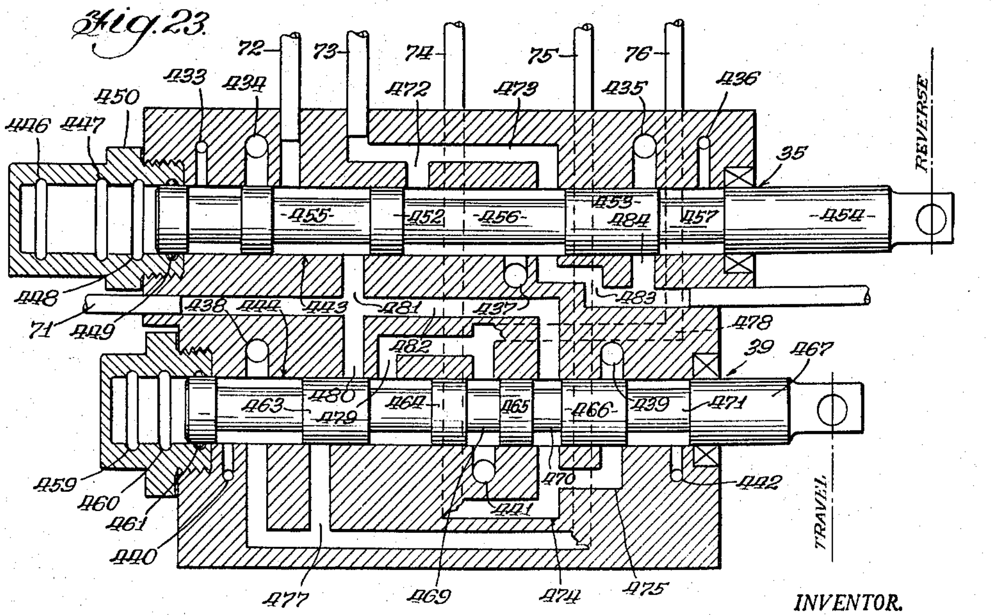
INVENTOR.
Thorvald G. Granryd
BY Paul O. Pippel
Atty.

2,961,889

TRACTOR LOADERS

Thorvald G. Granryd, Libertyville, Ill., assignor to The Frank G. Hough Co., a corporation of Illinois Original application Sept. 10, 1956, Ser. No. 608,909, now Patent No. 2,842,273, dated July 8, 1958. Divided and this application Oct. 17, 1957, Ser. No. 696,897

6 Claims. (Cl. 74—472)

This invention relates generally to tractor loaders, and more specifically to improved transmission and hydraulic means for driving the traction wheels of the loader and for operating the hydraulic systems thereof, and to novel control means for controlling the various functions of the loader. This invention is a division of my previously filed application Serial No. 608,909, filed September 10, 1956, now Patent No. 2,842,273, for Tractor Loaders.

Tractor loaders as generally known in the art comprises a tractor of either the four wheel rubber tired type or the crawler-track type, and tool means carried by the tractor, and operated by an operator from an operator's station in the tractor for performing various material handling functions such as digging, carrying and dumping of different materials. The tractors generally comprise some type of power plant such as an internal combustion engine, transmission means, and hydraulic means. The power plant or engine is connected to the input of the transmission means through some clutching means, and the output of the transmission means is connected to the traction members which may be wheels or crawler-tracks. Additionally, some means for power take-off from the engine is provided for driving the necessary hydraulic pump, which in turn delivers the hydraulic fluid under pressure used for operating the tool means of the loader. Thus, it may be seen that the available power of the engine or power source is divided between the traction members and the tool means through the transmission and the hydraulic pump. The methods and constructions for dividing this available engine power as presently known in the art, all have one common disadvantage. This disadvantage arises from the fact that a tractor loader as compared to other vehicles and material handling equipment is used or operated in a unique manner. The power consumed by the traction members and the tool means is rarely used completely separately and at different times. In the usual operation of tractor loaders, power is consumed by both the traction members and the tool means at the same time. A common operation is to operate the traction means to move the tractor so that the tool means engages the material being worked while operating the tool means to work the material in some manner. As soon as the traction members meet with some resistance, a condition which is common in digging, a torque reaction is applied from the traction members to the engine through the transmission. This torque reaction will act as a brake upon the engine causing it to slow down and reduce the power which it develops. Under certain conditions the engine may be completely stalled. Now as the engine output is reduced by the torque reaction from the traction members, the portion of the engine power delivered to the tool means is also reduced so that at these critical times in the operation of the loader, the entire efficiency thereof is drastically reduced. The obstruction or resistance encountered by the traction members results in a lowered efficiency of the tool means, so that often times the tool means will have insufficient power to operate and relieve the obstruction from the traction members. The converse of this is also true. Many times in the operation of these tractor loaders the tool means, while working some material, will meet an obstruction causing a torque reaction to be applied from the tool means to the engine of the tractor, which torque reaction will reduce the power output of the engine. Again, this point in the operation of the loader generally coincides with the point at which power is being supplied to the traction members and maximum power thereat is desirable in order to maintain high tractive effort at the traction members so that the traction members may aid the tool means in overcoming the obstruction or working of the material. However with the reduced power output of the engine, less power is supplied to the traction members.

Power plants as used in tractor loaders are generally so designed that at or near the governed speed, maximum engine power is available, and the highest efficiencies for any one-sized loader are produced when the power plant is operated at the governed speed.

These inefficiencies produced in the operation of loaders as now known in the art may be more clearly seen if one specific example thereof is considered. Considering a tractor of either the four-wheel rubber-tired type or the crawler-track type having an internal combustion engine developing a certain maximum power at full throttle governed speed. Further considering that the engine is connected to a transmission through some clutching means such as a torque convertor, and that the transmission is in turn connected to drive the wheels or tracks of the tractor. Additionally, considering the tool means to be a shovel mechanism mounted forwardly of the tractor and operatively connected with the tractor through hydraulically operated boom and linkage means, and a continuously operated hydraulic pump mounted so as to be driven by a power take-off shaft from the engine. In a normal digging operation of this considered loader, the shovel mechanism is indexed in a dig position, and the transmission then operated to cause the engine to drive the wheels or tracks of the tractor in a forward direction. The tractor will thus force the shovel mechanism into the material to be dug somewhat filling the shovel. While the wheels or tracks are urging the shovel into the material being dug, the hydraulic means are operated to tilt the shovel rearwardly to retain a heaping load within the confines of the shovel. The shovel may also be raised through the material being dug in a scooping action. The loaded shovel is then held in the carrying position and transported to some remote position for dumping, whereupon the loader may again return to the material being dug to repeat the cycle. It thus may be seen that at the critical portion of the cycle, that in which both tractive effort and hydraulic power are required for maximum material handling effort, a loader arrangement such as described is very inefficient. When both the tractive effort and the hydraulic operation is required at the same time as in the digging function, a torque reaction through the hydraulic pump causes a reduction in the speed of the engine and its power output to the traction members with a corresponding decrease in tractive effort at the traction members, and conversely a torque reaction from the traction members will reduce the speed of the engine to cause a corresponding decrease in the speed of the hydraulic pump.

The power trains of tractor loaders presently known in the art have further inherent inefficiencies and disadvantages for example, it is peculiar to the tractor loader art that the transmission should be so constructed that a shift to the various speeds in the reverse direction will result in an overdrive ratio. This is advantageous in that tractor loaders when in the reverse direction are generally not engaged in the working of any material, but are being moved in preparation for digging operations in the forward direction. Since the load on the tractor loader is then at a minimum and since preparations for actual working operations should be done in a rapid manner, an overdrive ratio in reverse is desirable. These desirable ratios for a tractor loader may be produced by transmissions known in the art today, however, the resulting transmissions are then quite cumbersome and expensive and amount to little more than compromise arrangements.

As the tractor loader art has advanced, the use of power shift transmissions with torque convertors between the transmission and the engine have been made. These arrangements have one important disadvantage which results from the torque convertor's inability to substantially completely absorb the momentary shock produced in shifting of the transmission. This shock is transmitted to the traction elements and, of course, felt by the operator of the loader. Another disadvantage has been that the tractor loader will creep or drag slightly when the transmission is in one of the driving positions and even when the engine is operating at its lowest speed.

It is an object of the present invention to produce power train means from an engine to the traction members and to the hydraulic system of a tractor loader which will overcome the inefficiencies and disadvantages known in tractor loaders presently used in the art today and to provide an arrangement which will substantially fulfill the unique requirements of tractor loaders.

It is another object of the present invention to provide a planetary type transmission in which all of the elements of each planetary set is identical in size to the corresponding elements of every other planetary set, and to produce speed ratios which are ideal ratios for a tractor loader.

It is another object of the present invention to provide means in a tractor loader for driving the hydraulic system and for driving the traction members simultaneously, and so that a torque reaction from either the hydraulic system or the traction members increases the torque output to the other.

It is another object of the present invention to provide in a tractor loader having a single engine or power source, a power divider which will divide the available engine power between the traction members and the hydraulic system so that the loading of either one of the hydraulic system or the traction members does not result in a decreased output of the engine but produces a greater engine torque in the other member.

It is another object of the present invention to provide a power shift transmission cooperating with a power divider so that any sudden change in direction or ratio of the transmission will not result in any shock transmitted to the traction members.

It is another object of the present invention to provide means in a tractor loader whereby the full engine power is easily selectively transmitted to either the hydraulic system or the traction members.

It is a further object of the present invention to provide a tractor loader having a hydraulic system wherein power is divided between the traction members and the hydraulic system so that the hydraulic pump of the hydraulic system is rotated intermittently and only as required.

It is another object of the present invention to provide in a tractor loader, a planetary set power divider connected to the engine with one of the members of the planetary set driving the hydraulic system for the loader and with another one of the members of the planetary set driving the traction members of the loader.

It is another object of the present invention to provide in tractor loader, a planetary set power divider wherein one member of the planetary set delivers power to a transmission and another member delivers power to the tractor hydraulic system, and wherein the transmission comprises a plurality of planetary sets of the same size as the power divider planetary set and wherein speeds produced at the traction members are ideally suited for tractor loaders.

It is another object of the present invention to provide a planetary set power divider connected to a tractor engine with one member of the planetary set driving the hydraulic system for the loader and with another member of the planetary set supplying power to the traction members of the loader and wherein the hydraulic system supplies a torque reaction at least as great as the corresponding torque delivered to the traction members and wherein the traction members supply a torque reaction directly proportional to the torque supplied to the hydraulic system.

It is another object of the present invention to provide a planetary set power divider in a tractor loader with one member of the planetary set driving the traction members and with another member of the planetary set driving the main hydraulic pump for the hydraulic system of the loader, and further wherein a throttle sensitive pressure regulating valve is provided for applying a regulating force upon the main hydraulic pump of a magnitude dependent upon the throttle setting.

It is another object of the present invention to provide a planetary set power divider in a tractor loader with one member of the planetary set driving the traction members and with another member of the planetary set driving the main hydraulic pump for the hydraulic system of the loader, and further wherein an engine speed sensitive pressure regulating valve is provided for applying a regulating force upon the main hydraulic pump of a magnitude dependent upon the speed of the engine.

It is another object of the present invention to provide a tractor loader with a planetary set power divider wherein one member of the planetary set drives the traction members through a transmission and wherein a novel control arrangement cooperates with the transmission to provide a brake for that member of the planetary set to lock the traction members against movement.

It is a further object of the present invention to provide a transmission for a tractor loader which will fulfill the ideal ratio requirements for a tractor loader and which is formed of a plurality of planetary sets to provide a forward and reverse direction in two different speeds. It is a further object to provide such a transmission with means for easily converting it to a three-speed forward and reverse direction transmission, and further such that the intermediate speed ratio will split the difference ratio between the low and the high speed equally, in other words, that for the particularly-sized planetary set the three used ratios from low to high will form an exact geometrical series.

It is another object of the present invention to provide a planetary set power divider wherein one member of the planetary set drives the traction members through a transmission and another member of the planetary set drives a hydraulic system, and having control means operating to substantially remove any torque reaction from the member of the planetary set driving the hydraulic system whereby the tractor will not creep when the transmission is operated to one of the speed ratios and the engine is operating at its lowest speed.

A further object of the present invention is to provide a tractor loader with a transmission and a hydraulic system connected to the engine so that the transmission is operable to one position to provide a direct drive between the engine and the hydraulic system.

A further object of the present invention is the provision in a tractor loader of a power divider simultaneously driving the main hydraulic pump and the transmission for the tractor with the power divider so constructed that the main hydraulic pump performs the function of a shock absorber for the transmission as the transmission is operated through its different speed ratios and directions.

A further object of the present invention is to provide a simple and efficient control system for the different load conditions encountered in a tractor loader having a single engine driving a planetary set power divider in turn simultaneously driving a main hydraulic pump and the traction members of the tractor.

Other objects and the features of the present invention will be apparent upon perusal of the following specification and drawings of which:

Figure 4A:
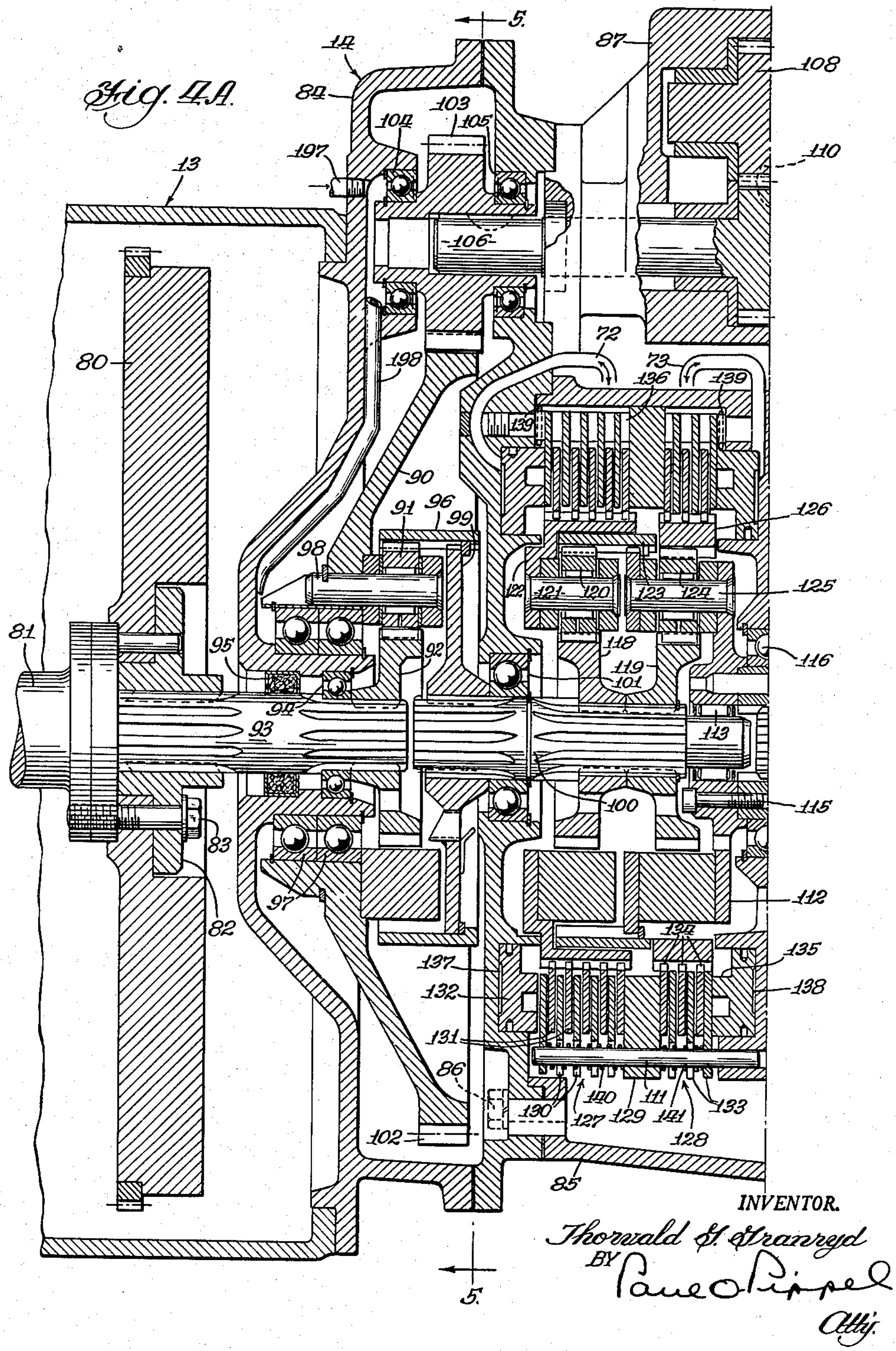
Figure 4B:
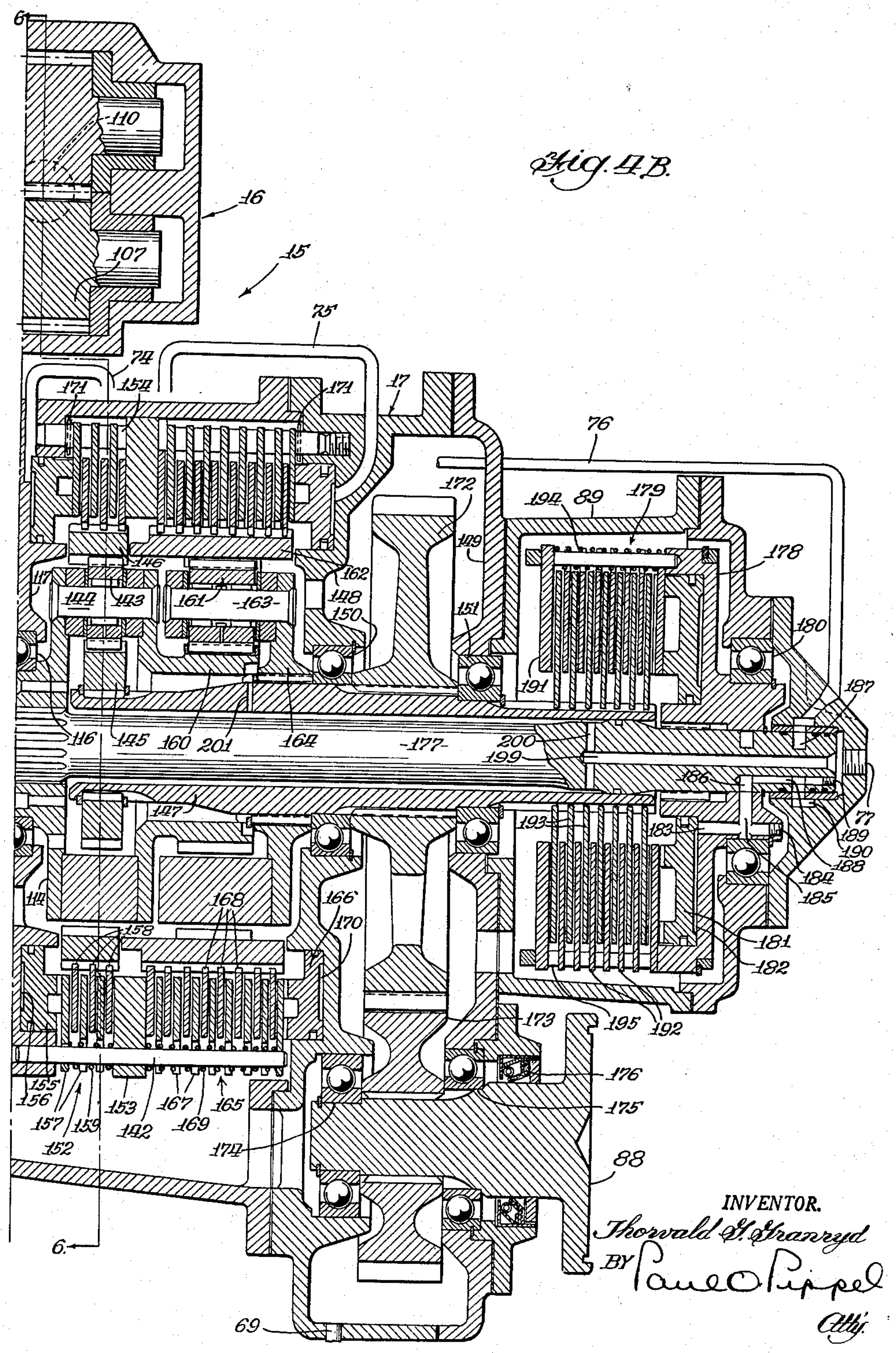
Figure 5:
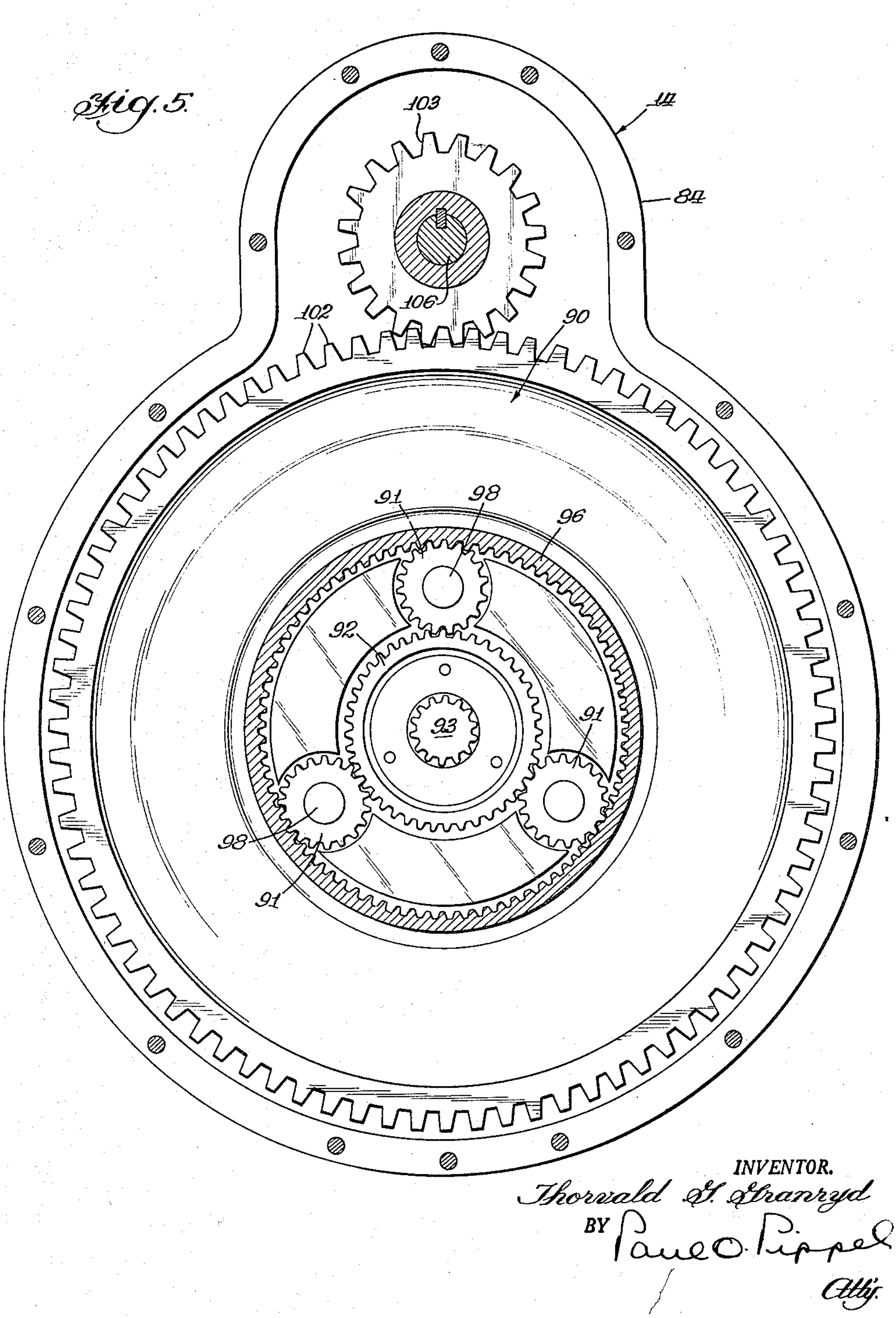
Figure 6:
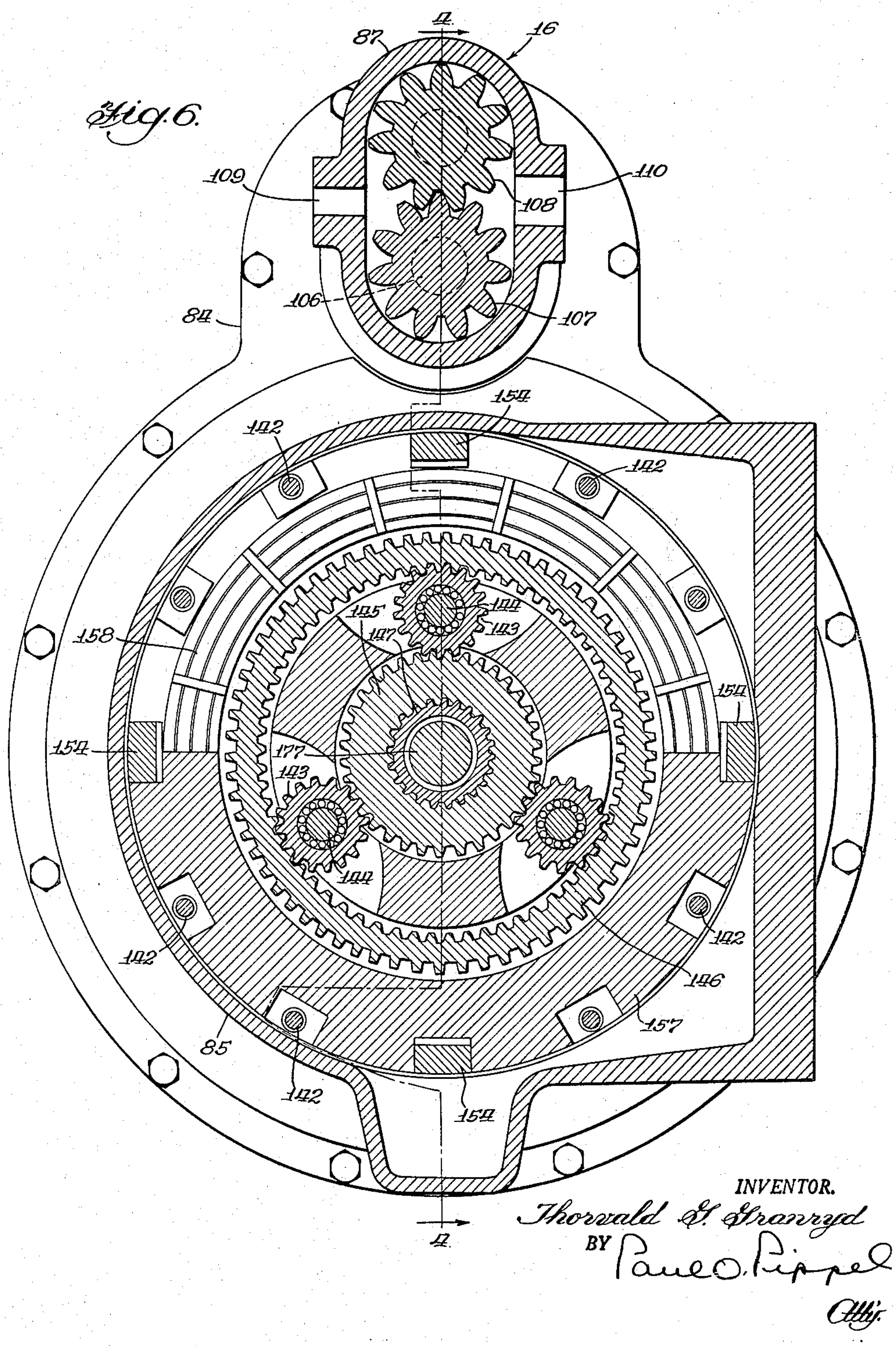
Figures 7, 22:
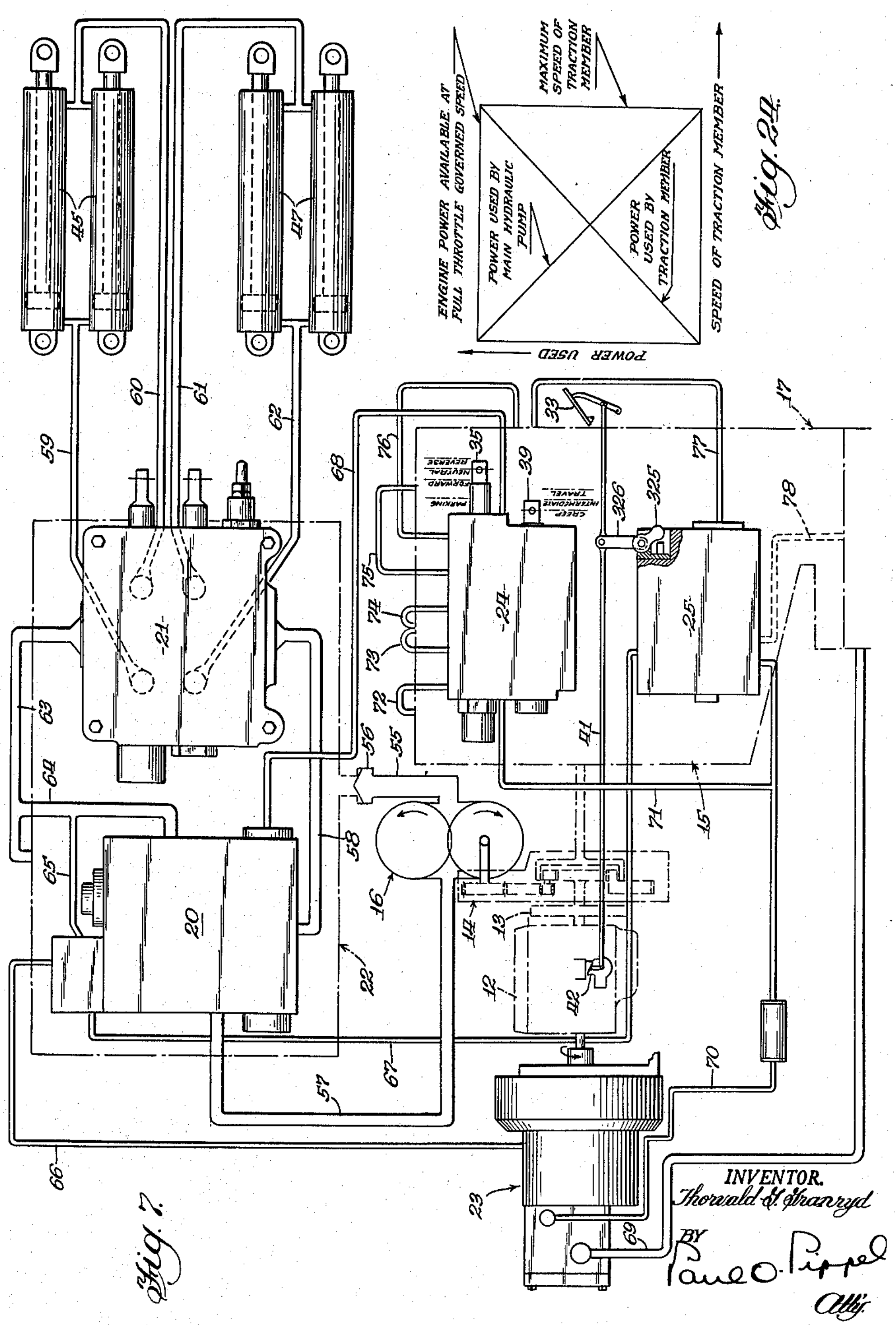
Figure 8:
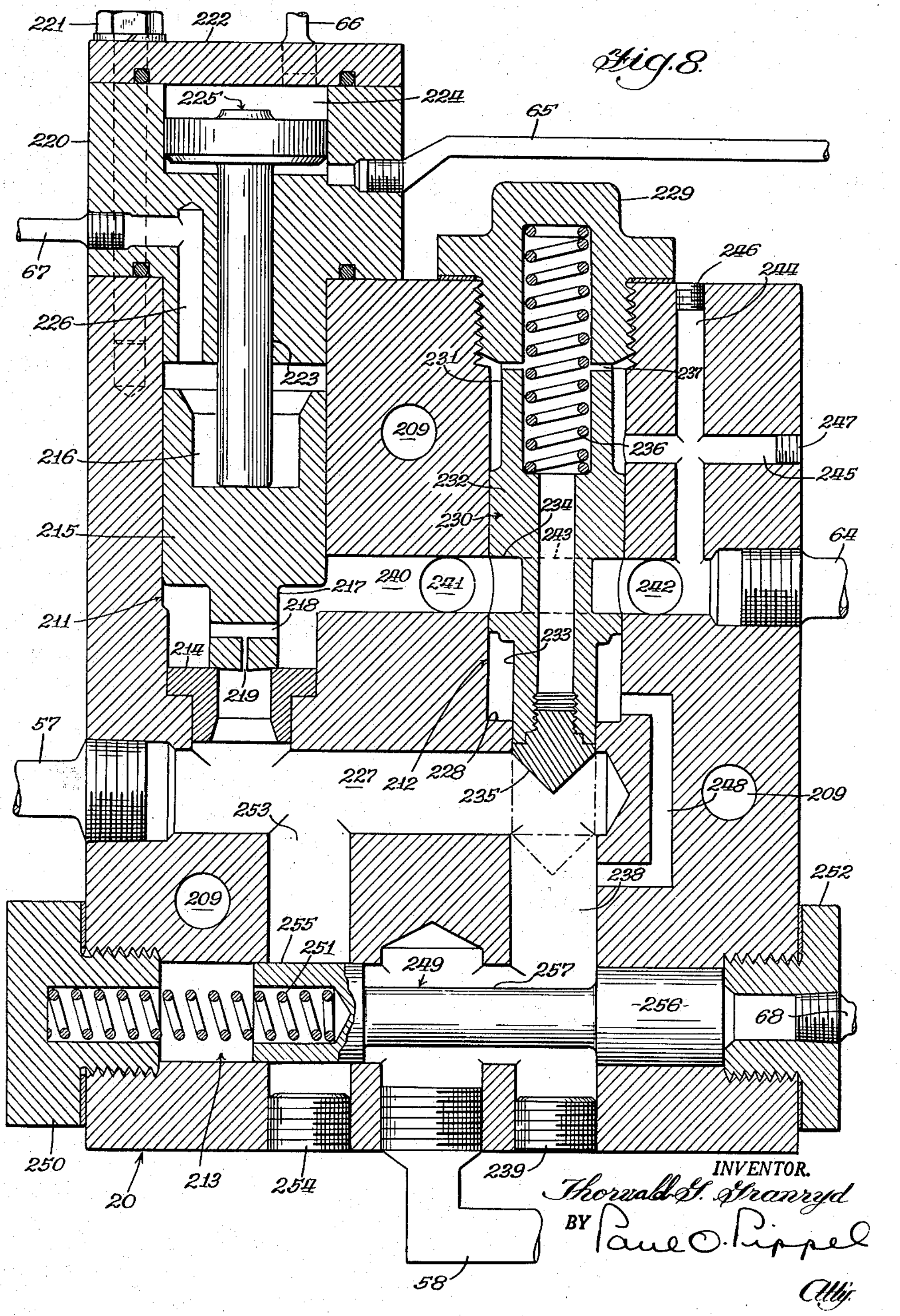
Figure 9:
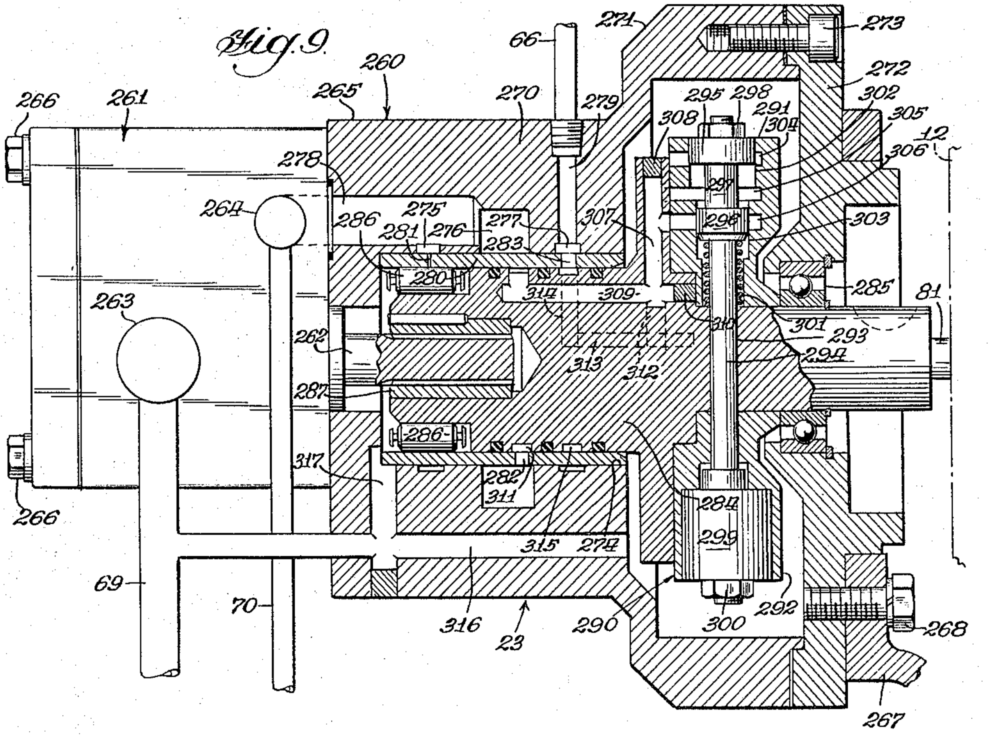
Figure 10:
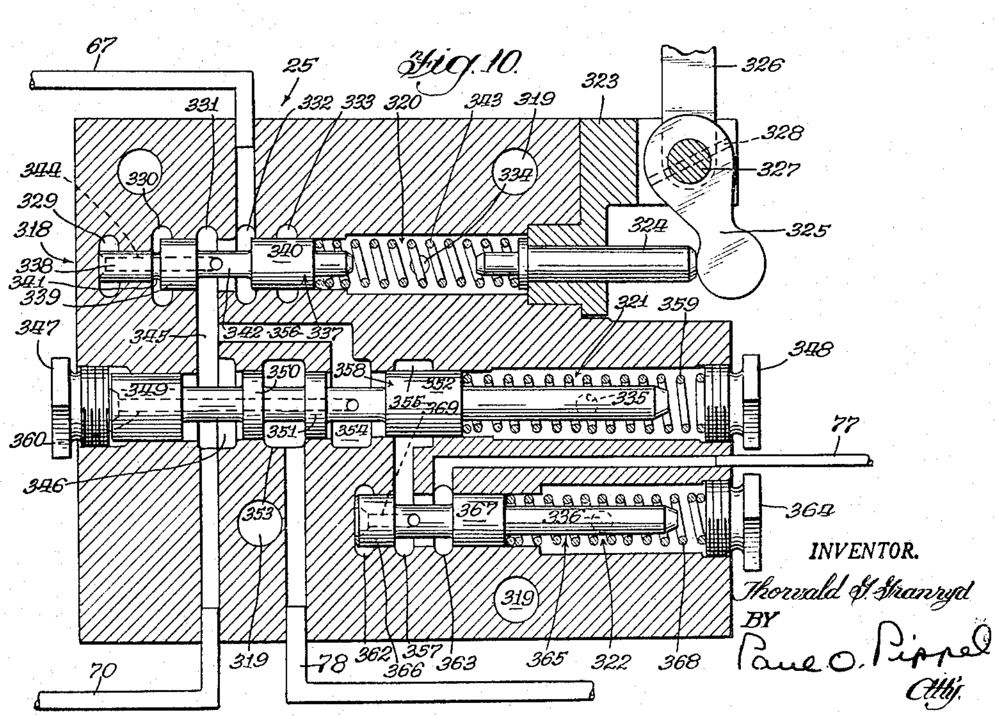
Figure 11:
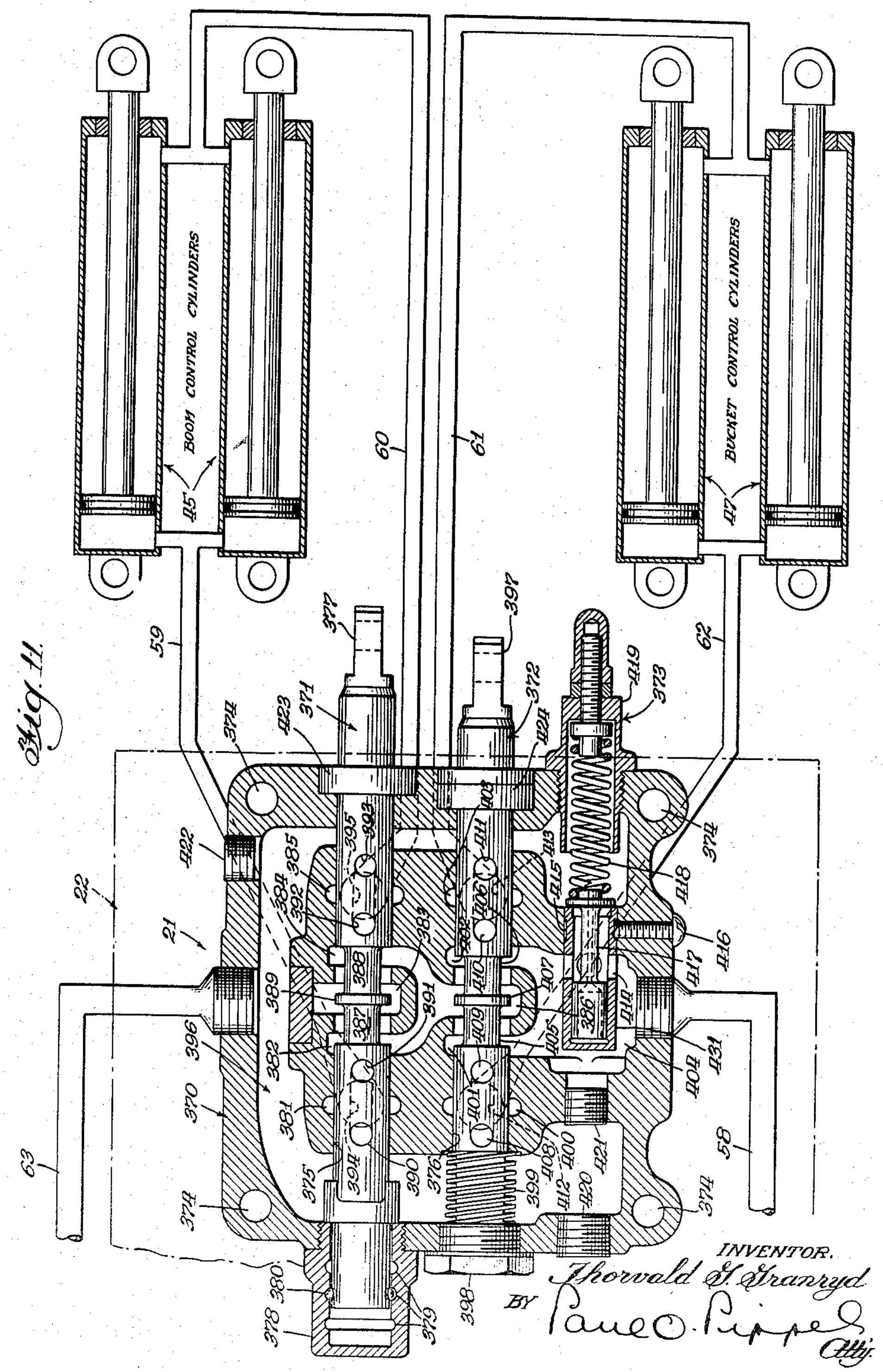
Figure 12:
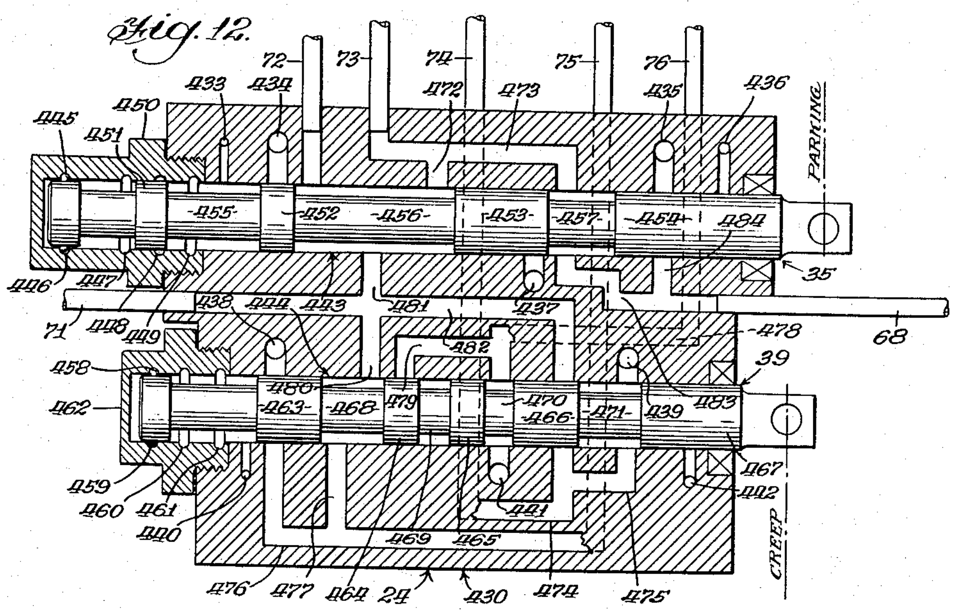

Figures 4A and 4B which are intended to be placed side by side for viewing are a cross-sectional view of the transmission and power divider elements of the present invention; and taken along a line such as line 4—4 of Figure 6;

Figure 5 is a cross-sectional view of the power divider element of the present invention as taken substantially along a line such as line 5—5 of Figure 4A;

Figure 6 is a cross-sectional view of the transmission portion of the present invention and is taken along a line such as line 6—6 of Figure 4B;

Figure 7 is a diagrammatic view of the various elements of the present invention particularly showing the hydraulic interconnections of the various elements;

Figure 8 is an enlarged cross-sectional view of one of the elements shown in Figure 7;

Figures 9, 10, and 11 are also enlarged cross-sectional views of different ones of the elements shown in Figure 7;

Figure 12 is another enlarged cross-sectional view of one of the elements shown in Figure 7 and with that element operated to one of its twelve possible operated positions;

Figures 13 through 23 are views substantially identical to Figure 12 except that the valve spools are shown in the other eleven operated positions; and Figure 24 is a graph showing how the engine power is divided in the present invention between the traction members and the hydraulic system.

The present embodiment is a preferred embodiment but it is to be understood that changes can be made in the present embodiment by one skilled in the art without departing from the spirit and scope of the present invention.

*General description*

Figure 1:
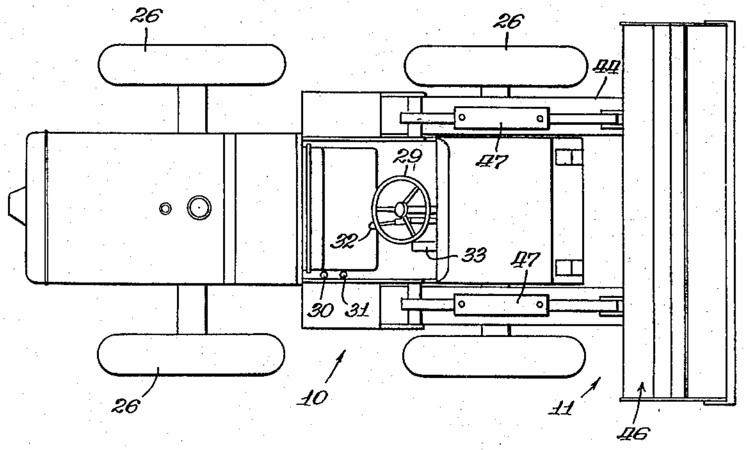
Figure 1 is a top plan view of one embodiment of a tractor loader constructed according to the present invention.
Figure 2:
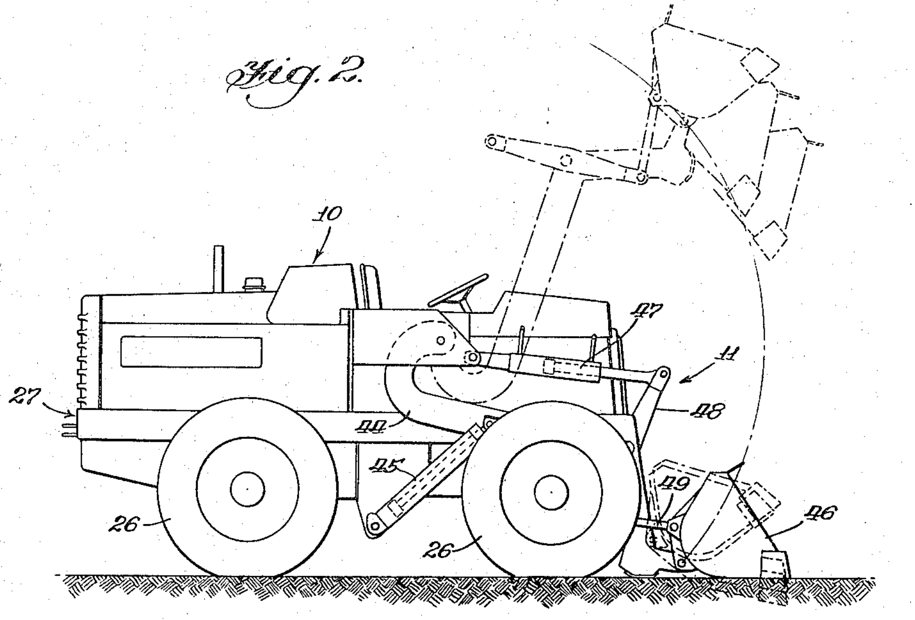
Figure 2 is a side elevational view of the tractor loader shown in Figure 1.

For a general description of the present invention reference is made to the drawings. The present embodiment comprises a tractor 10 of the four-wheel rubber tired type with all of the wheels being driven, and a shovel arrangement 11 operatively mounted on the tractor 10 to extend forwardly thereof as can be seen in Figures 1 and 2. Considering Figure 3 it may be seen in the enlarged cutaway of the tractor 10, that the tractor 10 is provided with an engine 12 mounted in the rearward portion and with certain drive and control means. The flywheel housing 13 is directly mounted to the engine 12 and includes the output shaft thereof. The power divider 14 is mounted to the flywheel housing 13. To the power divider 14, the transmission 15 and the main hydraulic pump 16 are mounted. The transmission 15 includes a transfer drive case 17 carrying the output of the transmission 15 to the traction members. From the transfer drive case 17, appropriate shafts 18 and 19 deliver power through conventional universal joints and differential assemblies to the rear and front wheels respectively of the tractor 10. A hydraulic pressure compensating and regulating valve or main control valve 20 connected to the output of the main hydraulic pump 16 delivers hydraulic fluid under proper pressures to the tool means hydraulic control valve 21. Operation of the tool means hydraulic control valve 21 through the levers 30 and 31 by the operator in the operator's compartment causes the desired operation of the tool means. A hydraulic fluid reservoir 22 is also provided for the hydraulic systems. To provide proper hydraulic control pressures, about 125 p.s.i. in the present embodiment, for operating the transmission 15, and to provide an engine speed responsive valve for the main control valve 20, a governor valve and hydraulic pump assembly 23 is provided. The governor valve and hydraulic pump assembly 23 is mounted to the crankshaft of the engine 12 at the opposite end thereof from the flywheel housing 13. The hydraulic pump portion of assembly 23 delivers hydraulic fluid to the main control valve 20 through the governor valve portion of assembly 23, the transmission control valve 24, and the secondary control valve assembly 25. The transmission control valve 24 is mounted on the side on the transmission 15 and is operated by the operator of the tractor through appropriate linkage and leverage arrangements. The secondary hydraulic valve assembly 25 has a plurality of functions which will be described in detail below.

For the general description it may be stated that the secondary hydraulic valve assembly 25 regulates hydraulic fluid pressures for operation of the transmission 15, for the lubrication oil for the system, and for a portion of the main control valve 20.

The flywheel housing 13, the power divider 14, the transmission 15 and the main hydraulic pump 16 may be seen in section in Figures 4*a* and 4*b*. Generally it may be stated that the power divider 14 comprises a planetary set wherein the output shaft of the engine 12 is connected to one of the members thereof, and the inputs of the main hydraulic pump 16 and the transmission 15 are connected to the other members of the planetary set. The transmission 15 is of the type wherein a plurality of planetary sets provide the various desired speed ratios through the operation of disk type brakes. Each component of each planetary set in both the transmission 15 and the power divider 14 is of an identical size with the comparable member of each of the different planetary sets. The basic portion of the transmission 15 is a two-speed transmission giving a low or creeper speed in one ratio and a high or travel speed in the other ratio. The basic portion of the transmission 15 is modified by a simple attachment which produces a third or intermediate speed which is exactly midway between the creeper speed and the travel speed, the three speed ratios forming an exact geometric series. In additional the transmission 15 is operable in either the forward or rearward direction.

Figures 7 shows the complete hydraulic system in a somewhat diagrammatic view. The elements 20, 23, 25, 21 and 24 are then each shown in detail in the remaining figures excluding Figure 24 which shows an explanatory graph. To make a broad summarization of how the hydraulic system cooperates with the engine 12, the power divider 14, the transmission 15, the traction members, and the tool means, reference is made to Figure 24. Figure 24 shows a chart wherein the power used by the main hydraulic pump and the power used by the traction members are plotted against the total power used on an axis of ordinates and the speed of the traction members on an axis of abscissas, and is based upon the assumption that either the traction members or the main hydraulic pump is capable of using the engine power available at full throttle governed speed. The plot of the power used by the traction members is a straight line beginning at a minimum or zero speed for the traction member and minimum or zero power used to the maximum speed of the traction members at the total engine power available at full throttle governed speed of the engine. The power used by the main hydraulic pump is also a straight line beginning at the minimum or zero speed of the traction member and total engine power available at full throttle governed speed of the engine to the maximum speed of the traction members and the minimum or zero power used. The main hydraulic pump is used as a reference point for the hydraulic system since the power delivered by the main hydraulic pump may be used by elements other than the tool means, for example, in some instances the main control valve 20 may absorb some of the engine power. The traction members are used as a reference point since except for negligible power losses in the power train, the traction members consume all of the power delivered to the transmission 15. From this chart in Figure 24 much can be seen about the operation and result of the present invention. First, it may be seen that for any one speed of the traction members, the power used by the traction members at that speed plus the power used by the main hydraulic pump at that speed of the traction members equals the total engine power available at full throttle governed. Thus, when the power used by the traction member is at zero, the speed of the traction member is zero and the power used by the main hydraulic pump is the total engine power available at full throttle governed speed. When no power is used or consumed by the main hydraulic pump, the power used by the traction members is the total engine power available at full throttle governed speed and the speed of the traction member is at the maximum. The total engine power available at full throttle governed speed is always divided between the main hydraulic pump and the traction member in some proportion dependent upon the speed of the traction members. These results may also be interpreted in terms of the power available. Considering that with the total engine power available at full throttle governed speed, if for some reason the speed of the traction members is reduced, the power used by the traction members will go down and the power available for use by the main hydraulic pump will go up, and conversely if for any reason the power available to the main hydraulic pump is not used or decreased, the power available for use by the traction members is increased. These unique results are particularly important in the art of tractor loaders. Considering the loader as a four-wheel rubber tire tractor with a hydraulically operated shovel carried by the tractor, if the tractor is operated to move the shovel into a load which is being dug and should the traction members encounter an obstruction so that the speed thereof goes down, for example, to substantially zero, it may be seen that the hydraulic system or the hydraulically operated shovel may then use substantially the total engine power available at full throttle governed speed to permit a maximum effort in the use of the hydraulically operated shovel to dig, pry out or break away any material being dug, because the necessary torque reaction is provided by the traction members, and produces excellent tractive effort to attempt to overcome the obstruction. Again, conversely, if the hydraulically operated shovel meets with some obstruction or is caught into some load being dug, substantially the total engine power available at full throttle governed speed is then available for use by the traction members so that the tractor may be moved to aid in the earth working operations of the loader. This is a very different result from that achieved by tractor loaders presently used in the art including those using torque convertors. In tractor loaders presently used in the art, if the traction members should strike an obstruction, this is applied as a reaction force to the engine, which due to the reactive torque is retarded. The retarding of the engine causes a corresponding power loss to the hydraulic system of the shovel mechanism. The same is true if the shovel mechanism strikes an obstruction.

*Tractor and shovel arrangement*

Other advantages and new features of the present invention will be described in the following detailed description of the present invention for which reference is first made to Figures 1, 2, and 3. The tractor 10 of the present embodiment has traction members comprising four wheels 26. The wheels 26 support the frame 27, to which the various components of the tractor are mounted. The engine 12 is disposed within the body of the tractor upon the frame 27 at the rearward portion of the tractor 10. An operator's compartment 28 mounted within the body of the tractor and positioned forwardly of the engine 12 includes a steering wheel 29 and the various necessary operating controls 31, 32 and 33. Controls 30 and 31 are the operating levers of the valve 21 for controlling the operation of the hydraulic tool means. Control 32 comprises a lever pivotally mounted within a tubular member 34. Tubular member 34 is operatively connected to spool 35 of the transmission control valve 24 through a linkage arrangement 36 so that when the control 32 is rotated about the longitudinal axis of the tubular member 34, the valve spool 35 is moved to its various operative positions. A rod 37 is mounted within the tubular member 34 for a sliding movement along the longitudinal axis thereof. The upper end of the rod 37 is pivotally connected to the inner end of the control 32. The lower end of the rod 37 is pivotally mounted to one arm of a bellcrank 38. The bellcrank 38 is pivotally mounted in the body of the tractor 10, and the other end of the bellcrank 38 is operatively connected to the valve spool 39 of the transmission control valve 24 through a linkage arrangement 40, so that when the control 32 moves in an upward and downward direction, the valve spool 39 is moved to its various operative positions. The control 33 is a foot throttle pedal and is pivotally mounted on the floor of the operator's compartment 28. The throttle pedal 33 is operatively connected through a linkage arrangement 41 with the throttle control 42 on the engine and a lever mounted in the hydraulic valve 25. As the throttle pedal 33 is depressed and raised the throttle control 42 is opened and closed. The cooperation of the linkage arrangement 41 with the control valve 25 will be described below.

The earth-working tool means or shovel mechanism 11 of the present invention may be of any suitable type. In the present embodiment, the shovel mechanism 11 comprises a boom 44 pivotally mounted on the tractor 10. The boom 44 comprises a pair of boom arms one of which is positioned on each side of the tractor 10 and extends forwardly thereof. To raise and lower the boom 44, a pair of hydraulic rams 45 are provided. Each of the hydraulic rams 45 are pivotally mounted at one end thereof to the tractor 10 on one side of tractor 10 with the other end of each of the hydraulic rams 45 pivotally connected to one of the boom arms of the boom 44 intermediate the ends thereof. Thus it may be seen that as the hydraulic rams 45 are extended and contracted, the boom 44 is raised and lowered. A bucket or shovel 46 is carried by the forward end of the boom 44. The shovel 46 is pivotally mounted through suitable brackets on the rear side thereof to the outer or forward ends of each of the boom arms of the boom 44. To position and pivot the shovel 46 relative to the boom 44, an adjustable linkage arrangement is provided. This adjustable linkage arrangement is formed in portions disposed at each side of the tractor 10. Each of the portions of the adjustable arrangement comprises a hydraulic ram 47, a lever 48 and a link 49. Each of the levers 48 is pivotally mounted intermediate its ends within one of the boom arms of the boom 44 intermediate the ends thereof. The lower end of each of the levers 48 is pivotally mounted to one end of the links 49. The other end of each of the links 49 is pivotally mounted to the rear surface of the shovel 46 through suitable brackets secured thereon. The upper end of each of the levers 48 is pivotally connected to one end of one of the hydraulic rams 47. The other end of each of the hydraulic rams 47 is pivotally connected to the tractor 10. Thus it may be seen that as the hydraulic rams 47 are extended and contracted, the levers 48 are pivoted to in turn move the links 49, to cause the bucket 46 to be positioned and pivoted relative to the boom 44. The operation of these tractor loaders such as herein defined are well known in the art. They are commonly used to dig, carry, dump, spread, back-fill and otherwise work many different types of materials such as earth, sand, clay, ores and chemicals. In these various operations it is usually necessary that the tractor be moved simultaneously with the raising or lowering of the boom and with the positioning and pivoting of the shovel relative to the boom. Thus it may be stated that power is generally required simultaneously in various degrees by the hydraulic system and the traction members or wheels. The dotted lines in Figure 2 shows some of the various positions to which the shovel 46 in the present invention may be operated by operations of the hydraulic rams 45 and 47.

*Hydraulic circuits*

Figure 3:
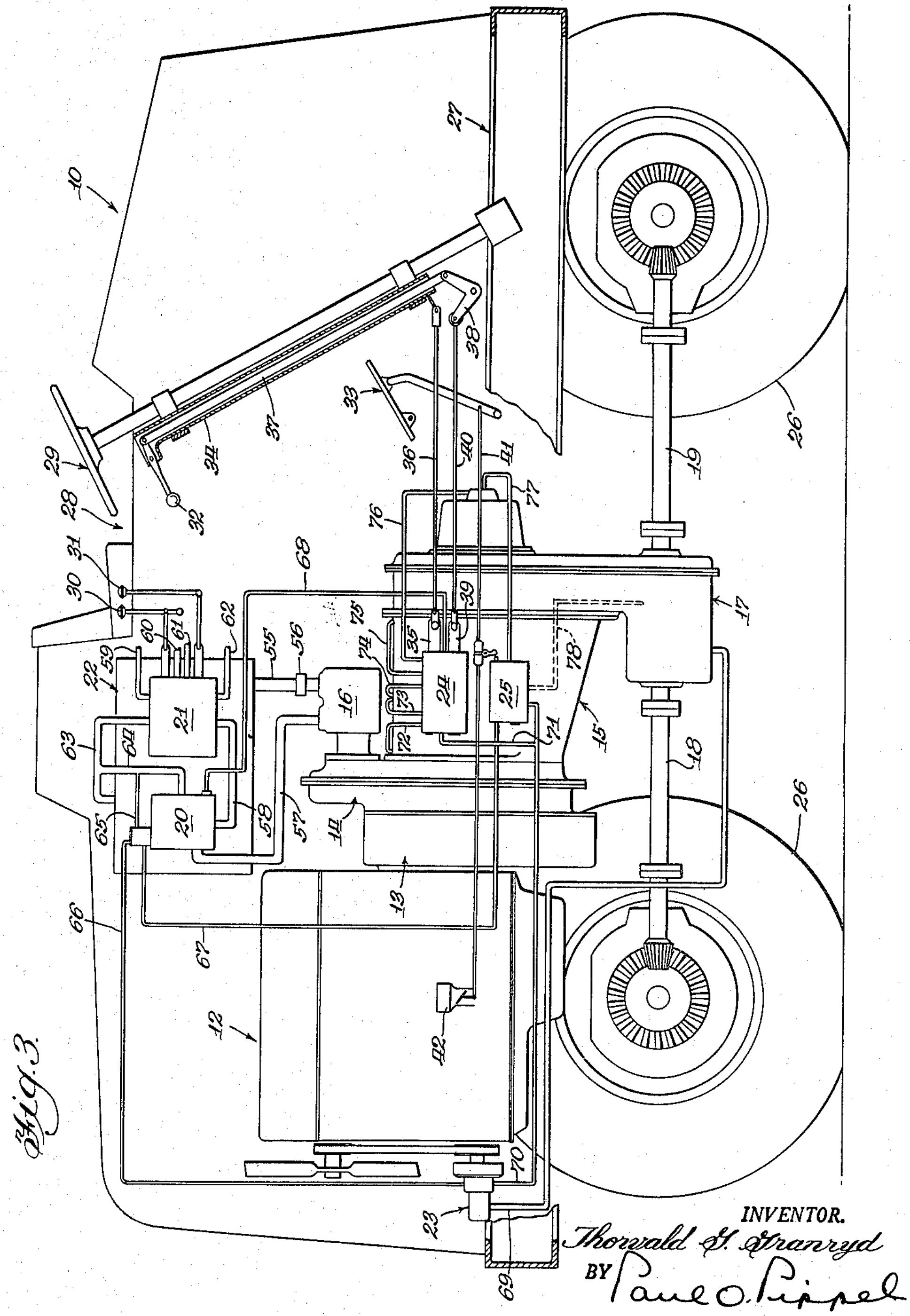
Figure 3 is an enlarged side elevational view partially in section of the tractor portion of the tractor loader shown in Figures 1 and 2.

In addition to the described elements, Figure 3 also shows in a somewhat diagrammatic manner the hydraulic conduits interconnecting the various parts of the hydraulic systems. The present embodiment comprises two cooperating hydraulic systems, one being the main hydraulic system for the earth-moving equipment and the other being the hydraulic system for the transmission and controls. These systems cooperate in the power divider 14 and through the control valve 20 and the regulating valve 25 in a manner to be described below. For the present explanation, the connections of the hydraulic conduits only will be described. From the hydraulic fluid reservoir 22, hydraulic fluid is supplied to the main hydraulic pump 16 through the hydraulic conduit 55. A check valve 56 is interposed in the hydraulic conduit 55. The supply port of the main hydraulic pump 16 is connected to the main hydraulic control valve 20 through a hydraulic conduit 57. A high pressure hydraulic fluid conduit 58 interconnects the control valve 20 and the control valve 21. From the control valve 21 hydraulic fluid is delivered to and returned from the hydraulic rams 45 and 47 through the hydraulic conduits 59, 60, 61 and 62. Hydraulic conduit 59 is connected between the valve 21 and the head end of the hydraulic rams 45. This may be clearly seen in Figure 7 to which reference is additionally made, and wherein with some duplication of Figure 2 the hydraulic systems are shown partially diagrammatically. Hydraulic conduit 60 is connected between the hydraulic valve 21 and the rod ends of the hydraulic rams 45. The hydraulic conduit 61 is connected between the hydraulic valve 21 and the rod ends of the hydraulic rams 47, and the hydraulic conduit 62 is connected between the hydraulic valve 21 and the head end of the hydraulic rams 47. The hydraulic control valve 21 is connected to the reservoir 22 through a hydraulic conduit 63, and the control valve 20 is connected to the reservoir 22 through a hydraulic conduit 64 which is connected to hydraulic conduit 63. Another portion of the control valve 20 is connected to the reservoir 22 through another hydraulic conduit 65 connected to hydraulic conduit 64. Three other hydraulic conduits are connected to the control valve 20. These conduits are conduit 66 the other end of which is connected to the transmission hydraulic pump and governor valve assembly 23, conduit 67 the other end of which is connected to the pressure regulating valve 25, and conduit 68 the other end of which is connected to the transmission control valve 24.

The hydraulic system for the transmission includes the hydraulic conduits 69, 70, 71, 72, 73, 74, 75, 76, 77, and 78. The conduit 69 is connected between the inlet to the transmission pump of the assembly 23 and the lower portion of the transfer drive case 17; the lower portion of the transfer drive case 17 is formed in cooperation with the transmission 15 and the power divider 14 to function as a hydraulic fluid reservoir. The conduit 70 is connected between the outlet of the assembly 23 and the pressure regulating valve 25. The conduit 71 is connected between the conduit 70 and the transmission control valve 24. The conduits 72, 73, 74, 75, and 76 are each connected between the transmission control valve 24 and the transmission 15. The conduit 77 is connected between the transmission 15 and the pressure regulating valve 25. The conduit 78 which is disposed substantially within the transmission housing and the transfer drive case 17 is connected between the pressure regulating valve 25 and the lower portion of the transfer drive case 17. The exact hydraulic fluid flow through these conduits will be described below.

*Power divider and transmission*

Turning next to a detailed description of the power divider 14, the main hydraulic pump 16, and the transmission 15, reference is particularly made to Figures 4A and 4B. The flywheel 80 of the engine 12 is secured to the crankshaft 81 of the engine 12 through a mounting ring 82 and a plurality of bolts such as bolt 83. These elements are disposed within the flywheel housing 13. The power divider 14 comprises a relatively flat cylindrical housing 84. The housing 84 is secured to the flywheel housing 13 by any suitable means. The transmission 15 comprises a suitable housing 85 which is bolted to the housing 84 of the power divider 14 by a number of bolts such as bolt 86. The main hydraulic pump 16 also includes a suitable housing 87 which is secured to housing 84 of the power divider 14 above the transmission 15 by any suitable means. The transfer drive case 17 is secured to the transmission housing 85 by any suitable means and includes the output shaft 88. The lower portion of the transfer drive case 17 is not shown in Figures 4A and 4B as shown in Figure 3, since the extension of the power train from the output shaft 88 to the wheels may be by many suitable means well known in the art. The transmission 15 also comprises another housing 89 which is mounted to the transfer drive case 17 at the rear end of the transmission 15 or at the forward end thereof relative to the forward end of the tractor 10. This housing 89 may be removed from the transfer drive case 17, and upon its removal therefrom the transmission 15 is simply converted to a two-speed transmission in the forward and reverse directions. With the addition of the housing 89 and the elements included therein, the transmission 15 is a three-speed forward and reverse direction transmission with the intermediate speed ratio falling exactly midway between the low speed and high speed ratios.

The power divider portion 14 of the present invention further comprises a planetary set of a planet carrier 90, which may also be seen in Figure 5, three planet pinion gears 91, a sun gear 92, and a ring gear 96. The sun gear 92 is splined on one end of a stub shaft 93. The other end of the stub shaft 93 is splined within the mounting ring 82. A ball bearing set 94 supports the stub shaft 93 in the housing 84 and a shaft oil seal 95 mounted about the stub shaft 93 within an opening through the housing 84 prevents lubricating oil from flowing into the flywheel housing 13. The planet carrier 90 is journalled to the housing 84 through the ball bearing sets 97. The planet pinion gears 91 which mesh with the sun gear 92 are carried by the planet carrier 90 through shafts 98 which are keyed through suitable openings in the planet carrier 90. The ring gear 96, which meshes with the planet pinion gears 91, is keyed to a carrier 99 which in turn is splined on a stub shaft 100. The stub shaft 100 is journalled through an opening in the housing 84 by a ball bearing set 101. The stub shafts 93 and 100 are in axial alignment, and the other end of the stub shaft 100 extends into the transmission housing 85 of the transmission 15.

The periphery of the planet carrier 90 is provided with gear teeth 102. The gear teeth 102 are meshed with a small spur gear 103. The spur gear 103 is rotatively mounted in the upper portion of the housing 84 by means of the ball bearing sets 104 and 105. The spur gear 103 is keyed to the operating shaft 106 of the main hydraulic pump 16.

The main hydraulic pump 16, in the present embodiment, is a gear-type fixed displacement pump of any suitable type well known in the art. Other suitable hydraulic pumps may be used, however, the pump of the present embodiment is of a size sufficient to intermittently absorb the entire output torque of the engine 12. The operating shaft 106 extends from the housing 84 into the pump housing 87 and is integrally formed with the pump gear 107, as may also be seen in Figure 6. The pump gear 107 meshes with the pump gear 108, and both pump gears 107 and 108 are suitably journalled in the pump housing 87. The pump housing 87 is also provided with an inlet port 110 and an outlet port 109. The hydraulic fluid conduit 55 is connected to the port 110 and the hydraulic fluid conduit 57 is connected to the port 109.

It thus may be seen that the engine 12 drives the sun gear 92 and that the torque delivered therethrough is applied through the planet pinion gears to the planet carrier 90 and the ring gear 96. The amount of torque delivered to the stub shaft 100 will be proportional to the torque reaction supplied by the main hydraulic pump 16 to the planet carrier 90 and the torque delivered to the main hydraulic pump 16 will be proportional to the torque reaction supplied by the stub shaft 100 to the ring gear 96.

The end of the stub shaft 100 projecting within the casing 85 of the transmission 15 is rotatively supported within a central opening in the planet carrier 112 through the roller bearings 113. The planet carrier 112 is secured to another planet carrier 114 by means of a number of bolts such as bolt 115. The planet carriers 112 and 114 are rotatively mounted within the casing 85 through a ball bearing set 116. The ball bearing set 116 is carried within the casing 85 by inwardly extending flange portions 117 of the housing 85. The stub shaft 100 is provided with two sun gears 118 and 119, which are splined thereon between the ball bearing set 101 and the roller bearings 113. The sun gear 118 meshes with three planetary pinion gears 120. The planetary pinion gears 120 are rotatively carried on shafts 121, which in turn are secured to a planet carrier 122. The planet pinion gears 120 also mesh with a ring gear 123. The ring gear 123 is secured to the planet carrier 112. The sun gear 119 meshes with three planet pinion gears 124. The planet pinion gears 124 are rotatively carried on shafts 125, which in turn are carried by the planet carrier 112. The planet pinion gears 124 also mesh with a ring gear 126. Brakes 127 and 128 are provided for the planet carrier 122 and the ring gear 126 respectively. These brakes are of the multiple disk type friction brakes. One pressure reaction plate 129 in a form of an annular ring is provided for both of the brakes 127 and 128. Brake 127 further comprises a plurality of stationary friction disks 130, a plurality of rotating friction disks 131 and an annular piston or pressure plate 132. Brake 128 further comprises a plurality of stationary friction disks 133, a plurality of rotating friction disks 134 and an annular piston or pressure plate 135. The rotating friction disks 131 are splined upon the outer surface of the planetary carrier 122 and positioned in an alternating order with the stationary friction disks 130. The stationary friction disks 130 are secured against rotational movement by a plurality of torque or mounting rods 136. The torque rods 136 are four in number, and are equally spaced about the periphery of the stationary friction disks 130 in slots formed therein, so that the disks 130 are slidable therealong. This construction is the same as the showing in Figure 6 relative to brake 152 and its torque rods 154. The pressure reaction plate 129 is secured substantially at the longitudinal center of the torque rods 136, and one end of each of the torque rods 136 is mounted in a suitable opening in the end of the casing 85, while the other ends are mounted in suitable openings in the inwardly projecting flange portion 117 of the casing 85. Further, means such as set screws are provided in those openings to permit some longitudinal adjustment of the torque rods 136 and the pressure reaction plate 129. Thus, any compression of the rotating friction disks 131 and the stationary friction disks 130 against the pressure reaction plate 129 will result in a transfer of the torque of the rotating friction disks 131 to the stationary friction disks 130, in turn to the torque rods 136, and therefrom to the casing 85. The pressure plate 132, for compressing the rotating and stationary friction disks against the pressure reaction plate 129, is disposed within an annular groove in the housing 84 for limited sliding movement against the friction disks 130 and 131. The other side of the pressure plate 132 is provided with an annular groove 137, which groove is open to a passageway through the housing 84 leading to a connection with hydraulic fluid conduit 72. To restore the brake 127, a plurality of restoring rods 111 and coiled springs 140 are provided. Figure 4A shows one of the restoring rods 11 and coiled springs 140 because of the particular section taken as shown along line 4—4 of Figure 6. Figure 6 shows the similar restoring rods 142 for the brakes 152 and 165. The restoring rods 111 are eight in number and are disposed in pairs between the torque rods 136 in slots about the periphery of the stationary friction disks 130. The restoring rods 111 are also mounted through the pressure reaction plate 129 and into suitable openings in the inwardly projecting flange portion 117 of the casing 85. The coiled springs 140 are mounted upon the restoring rods 111 and react against the pressure reaction plate 129 and the stationary friction disk 130 furthest therefrom to bias the brake 127 in the off position. In the brake 128, the stationary friction disks 133 are also mounted about the torque rods 136, and the rotating friction disks 134 are splined onto the outer surface of the ring gear 126. The pressure plate 135 is slidably mounted in an annular groove in the inwardly projecting flange portion 117 of the housing 85 and in cooperation with the friction disks 133 and 134. The pressure plate 135 is also provided with an annular groove 138 opening into a passageway formed through the housing 85 and connected to the hydraulic fluid conduit 73. The brake 128 also uses the same restoring rods 111 as used for brake 127. Coiled springs 141 are provided for biasing brake 128 to the off position. Assembly of this portion of the transmission is greatly simplified through its construction and through the use of the pins 139. In the assembly of the transmission, and with the casing 85 removed from the casing 84, the brakes 127 and 128 are completely assembled on the torque rods 136 except for the pressure plates 132 and 135. The pressure reaction plate 129 is secured to the plurality of torque rods 136, the friction disks 130 and 131 are properly stacked on one side of the pressure reaction plate 129 and the friction disks 133 and 134 are properly stacked on the other side of the pressure reaction plate 129. The restoring rods 111 and springs 140 and 141 for the brake 127 and the brake 128 respectively, are also properly mounted in cooperation with the friction disks 130, 131, 133 and 134. The pins 139 are then inserted through the ends of the torque rods 136 with all of these elements being held together in proper alignment as a unit. This unit is then mountable within the transmission housing 85 with the torque and restoring rods 136 and 111 being projected into the proper holes in the inwardly projecting flange portion 117 of the casing 85, and with the rotating friction disks 131 and 134 being splined onto the planet carrier 122 and the ring gear 126 respectively. With the pressure plate 132 and the stub shaft 100 in place, the housing 84 may be then secured to the housing 85. The pins 139 are spaced apart a distance sufficient to permit the various elements therebetween to be so positioned that the brakes 127 and 128 are in the off condition.

From the foregoing may be seen that when high pressure hydraulic fluid is delivered through conduit 72, high pressure hydraulic fluid will enter the annular groove 137, and the force thereby produced acting on the pressure plate 132 and against the housing 84, will move the pressure plate 132 to slide the friction disks 130 and 131 toward the pressure reaction plate 129. The friction created between the friction disks 130 and 131 will cause the planet carrier 122 to be held stationary. Assuming that no high pressure hydraulic fluid is delivered through conduit 73 at this time, any torque produced by the stub shaft 100 will rotate the sun gears 118 and 119. Since the planet carrier 122 is held stationary, the rotating sun gear 118 will rotate the planet pinion gears 120 which will in turn cause the ring gear 123 to be rotated in a direction opposite from that of the stub shaft 100. Since the ring gear 123 is secured to the planet carrier 112, the carrier 112 and the planet carrier 114 locked thereto, will be rotated in the same direction as the ring gear 123. The ring gear 126 will be rotated by the planet pinion gears 124. If the high pressure hydraulic fluid is released from conduit 72 and applied to conduit 73, the restoring springs 140 will cause the friction between the friction disks 130 and 131 to be released and the planet carrier 122 will be free to rotate. The high pressure hydraulic fluid in conduit 73 will pass through the passageway in the housing 85 and enter the annular groove 138 in the pressure plate 135. The force of the high pressure hydraulic fluid applied between the pressure plate 135 and the inwardly projecting flange portion 117 of the housing 85, will cause the pressure plate 135 to force the friction disks 133 and 134 together against the pressure reaction plate 129 and against the bias of the restoring spring 128. This friction between the friction disks 133 and 134 will cause the ring gear 126 to be held stationary. Assuming the same rotation of the stub shaft 100 as previously mentioned, the rotating sun gear 119 will rotate the planet pinion gears 124 to cause them to walk around the ring gear 126. This rotation and translation of the planet pinion gears 124 will cause a rotation of the planet carrier 112 in the same direction as the stub shaft 100 is rotating and at a reduced speed from that at which the planet gear 112 was rotated when the brake 127 was applied. The planetary set controlled by the brake 127 is the planetary set for the reverse direction, and the planetary set controlled by the brake 128 is the planetary set for the forward direction. The planet carrier 112 is the output member for both directions and in the forward direction planet carrier 112 is rotated at a slower speed than in the reverse direction. Therefore, in the forward direction brake 128 is on and brake 127 is off and in the reverse direction brake 127 is on and brake 128 is off.

Since planet carrier 114 is bolted to planet carrier 112, the planet carrier 114 is the input member for the remainder of the transmission, the portion producing the various speed ratios. In describing this portion of the transmission, reference is also made to Figure 6. As the transmission of the present invention is a two-speed transmission convertible to a three-speed transmission, that portion producing the two speeds will be described first. The planet carrier 114 carries three planet pinion gears 143. These planet pinion gears 143 are rotatively mounted onto the shafts 144 which in turn are secured to the planet carrier 114. The planet pinion gears 143 mesh with a sun gear 145 and a ring gear 146. The sun gear 145 is splined and keyed to the tubular member 147. The tubular member 147 is rotatively mounted through walls 148 and 149 of the transfer drive case 17 by means of the two ball bearing sets 150 and 151. The ring gear 146 is provided with a brake 152 which is similar in construction to brakes 127 and 128 previously described. A pressure reaction plate 153 is secured to a plurality of torque rods 154, which rods 154 are mounted into openings on the opposite side of the flange 117 in which the torque rods 136 are mounted. The flange portion 117 of the housing 85 is also provided with a suitable groove for the annular piston or pressure plate 155. The face of the pressure plate 155 within the annular groove of the flange 117, is provided with an annular groove 156. The annular groove 156 is in open communication with a passageway extending through the housing 85 and connected to conduit 74 so that any high pressure hydraulic fluid supplied through conduit 74 will cause the pressure plate 155 to be moved out of the groove in the flange 117. The friction disks for the brake 152 comprise a plurality of stationary friction disks 157 which are disposed between the pressure plate 156 and the pressure reaction plate 153, and are carried by the torque rods 154, and the rotating friction disks 158, which are splined onto the outer surface of the ring gear 146 and disposed in an alternating relationship with the stationary friction disks 157. Coiled restoring springs 159 mounted about a number of restoring rods 142, and between the pressure reaction plate 153 and the stationary friction disk 157 adjacent the pressure plate 155 bias the brake 152 in the off condition when no high-pressure hydraulic fluid is delivered to conduit 74. Thus it may be seen that when high pressure hydraulic fluid is delivered through conduit 74, the pressure plate 155 is moved to operate the brake 152 to the brake-on condition wherein the ring gear 146 is held stationary.

The planet carrier 114, which is locked to planet carrier 112, also carries or has secured thereto, a sun gear 160, so that sun gear 160 is rotated whenever the planet carrier 114 is rotated. Sun gear 160 meshes with three planet pinion gears 161, which in turn mesh with a ring gear 162. The planet pinion gears 161 are rotatively mounted on three shafts 163 which are carried by a planet carrier 164. The planet carrier 164 is splined on the tubular member 147. The ring gear 162 is provided with a brake 165. The brake 165 is similar to the brakes previously described. Brake 165 has the following elements in common with brake 152: The pressure reaction plate 153, and the plurality of torque and restoring rods 154 and 142. Brake 165 further comprises the annular piston or pressure plate 166 slidably mounted in an annular groove in wall 148, stationary friction disks 167 mounted on the torque rods 154, rotating friction disks 168 splined on the outer surface of the ring gear 162, and a plurality of coiled restoring springs 169 mounted about the restoring rods 142 and biasing the brake 165 in the off position. The surface of the pressure plate 166 adjacent to the wall 148 is provided with an annular groove 170. The annular groove 170 of the pressure plate 166 is in open fluid communication with a passageway formed through the transfer case housing 17 and connected to conduit 75. The multiple friction disks 157 and 158 of the brake 152, and the multiple friction disks 167 and 168 of the brake 165 with the plurality of torque and restoring rods 154, 142, and the pressure reaction plate 153, are assembled together as a unit in a manner similar to that previously described for brakes 127 and 128. The pins 171 mounted through the torque rods 154 maintain a unitary package of the two brake assemblies 152 and 169. When high pressure hydraulic fluid is delivered through conduit 75, the pressure plate 166 is moved to compress the friction disks 167 and 168 together against the pressure reaction plate 153. This causes the brake 169 to be operated to the brake-on position, and ring gear 162 will be held stationary.

The planetary gear set controlled by the brake 152 is the planetary set for the travel or high speed ratio, and the planetary set controlled by the brake 165 is the planetary set for the creep or low speed ratio. If brake 152 is on and brake 169 is off, the ring gear 146 will be held stationary, while the ring gear 162 will be free to rotate. Power from the previous section of the transmission will rotate planet carrier 114. This will cause a translation and rotation of the planet pinion gears 143, and the planet pinion gears 143 will in turn drive the sun gear 145, in turn driving the tubular element 147. If the brake 165 is on and the brake 152 is off, the ring gear 146 will be free to rotate and the ring gear 162 will be held stationary. The torque supplied to the planet carrier 114 will then directly rotate the sun gear 160. The rotating sun gear 160 will drive the planet pinion gears 161 about the ring gear 162. This translation and rotation of the planet pinion gears 161 will cause a low speed rotation of the planet carrier 164, and the planet carrier 164 will cause a corresponding rotation of the tubular element 147.

The tubular element 147 delivers torque to the output member 88 through the transfer drive case 17. A gear 172 is splined onto the tubular element 147. The gear 172 is meshed with a gear 173. The gear 173 is splined onto the output member 88. The output member 88 is rotatively mounted in the transfer drive case 17 through two sets of ball bearings 174 and 175. A shaft sealing assembly 176 prevents any lubricating oil from leaking from the transfer drive case 17. The shaft sealing assembly 176 may be of any suitable type well known in the art. It should be noted that the arrangement of the output member 88 and the transfer drive case 17 in Figure 4B is somewhat different from that shown in Figure 3. The showing in Figure 4B has been shortened and simplified for a clear explanation. The extension and inclusion of the output member 88 in the transfer drive casing 17 as shown in Figure 3, may be by any means will known in the art.

The intermediate speed ratio is picked up in the planet carrier 114. This is accomplished by a shaft 177. The shaft 177 extends from the intermediate speed ratio housing 89, through the tubular member 147, with the other end thereof splined into the hub of the planet carrier 114. The intermediate speed ratio housing 99 is fastened to the transfer drive case 17 by any suitable means. The portion of the shaft 177 extending within the intermediate speed ratio housing 89 is keyed within clutch member 178 of the clutch 179. The clutch member 178 is rotatively mounted in the housing 89 through the ball bearing set 180. The clutch 179 is of the multiple disk friction type clutch. The clutch member 178 of the clutch 179 is provided with an annular groove portion into which an annular piston or pressure plate 181 is mounted. The pressure plate 181 is provided with an annular groove 182 in the surface adjacent the clutch member 178. This annular groove 182 is in direct fluid communication with a passageway 183 formed in the clutch member 178. The passageway 183 is formed in the clutch member 178 by drilling a suitable hole through one side thereof and then sealing the outer end of the hole with a plug 184. The passageway 183 is intersected by another passageway 185 which extends to and in a constant fluid communicating relationship, with an annular groove 186 formed in the shaft 177. The shaft 177 has another annular groove 187 axially spaced from the annular groove 186. The annular grooves 186 and 187 are interconnected by a passageway 188 which is drilled through the end of the shaft 177 to intersect annular grooves 186 and 187, and having the outer end sealed by a plug 189. The annular groove 187 is in radial alignment with an annular groove 190 formed in the intermediate speed ratio housing 89. The annular groove 190 is connected through a suitable passageway to hydraulic fluid conduit 76. Thus, it may be seen that the following hydraulic fluid path is provided between conduit 76 and the annular groove 182 in the clutch member 178; from conduit 76 through a passageway to annular groove 190, annular groove 187, passageway 188, annular groove 186, passageway 185, and passageway 183 to annular groove 182. The clutch 179 further comprises a pressure reaction plate 191 carried by the clutch member 178 and axially spaced from the pressure plate 181, a plurality of friction disks 192, another plurality of friction disks 193, and a number of restoring springs 194. The friction disks 192 are formed to have a plurality of radially outwardly extending lugs, and are carried by the clutch member 178 through suitable slots 195 into which the lugs are positioned, between the pressure reaction plate 191 and the annular piston or pressure plate 181. The friction plates 193 are splined onto the outer end of the tubular member 147 and are positioned alternately with the friction disks 192. The restoring springs 194 bias the friction disks 192 and 193 to the clutch-off position. When the clutch 179 is in the off position, the friction disks 193 are freely rotated by the tubular member 147, while the friction disks 192 are freely rotated by the shaft 177. When high pressure hydraulic fluid is delivered to conduit 76, the pressure plate 181 is moved to compress the friction disks 192 and 193 together against the pressure reaction plate 191. The friction created between the friction disks 192 and 193 will cause the shaft 177 and the tubular member 147 to be rotated together. When brakes 152 and 165 are in the off position, and clutch 179 is in the on position or energized, power in the intermediate speed ratio is delivered over the following path: from the planet carrier 114 through the shaft 177, through the clutch 179, through the tubular member 147, gear 172, gear 173 to the output member 88.

Turning next to a detailed description of the means for lubricating the power divider 14 and the transmission 15 of the present invention, lubricating fluid is delivered in a manner to be described below to conduit 77, and another conduit (not shown) connected between conduit 77 and port 197 through housing 84 of the power divider 14. In the present embodiment the lubricating fluid is delivered at a pressure of about 50 p.s.i. From port 197 in the power divider 14 the lubricating fluid or oil flows initially in three paths: one path directly into ball bearing set 104, a second path through the central opening in gear 103, between shaft 106 and a slot in gear 103 to lubricate the ball bearing set 105, and a third path downward and through the section of tubing 198. The major portion of the lubricating fluid flow will be through tubing section 198, and will pass from the lower end thereof to and through the ball bearing sets 97. From the ball bearing sets 97, the lubricating oil passes into the planetary set of the power divider 14. A portion flows downward to lubricate ball bearing set 94, another portion flows over the various parts of the planetary set and lubricates the roller bearings for the planet pinion gears 91 by a pressure action of the oil through small radial holes in the planet pinion gears 91 as the planet pinion gears 91 rotate between the ring gear 96 and the sun gear 92. The lubricating oil collects in the lower portion of the housing 84 and flows therefrom through an opening between housings 84 and 85 adjacent bolt 86 into the transmission housing 85. From the transmission housing 85, the oil flows into the transfer drive case 17 and collects in the sump formed in the bottom portion of the transfer drive case 17. From the sump in the bottom portion of the transfer drive case 17, the lubricating oil will flow through conduit 69 to return to the pump.

For the transmission 15, the lubricating oil flows through conduit 77, through passageway 199 in shaft 177, and through passageway 200 into the space between shaft 177 and tubular member 147. From that space, a portion of the lubricating oil flows through the radial passageway 201 in the tubular member 147 to lubricate the first speed planetary set, that associated with brake 165. All of the roller bearings of the various planet pinion gears are lubricated in the same manner as that described relative to planet pinion gears 91. Another portion of the lubricating oil between shaft 177 and tubular member 147 flows through the space between the planet carrier 114 and the end of the tubular member 147 to lubricate the third speed planetary set, that associated with brake 152. A portion of the oil lubricating the third speed planetary set flows through openings in the planet carrier 114 to lubricate ball bearing set 116. Another portion of the oil between shaft 177 and the tubular member 147 flows between the plines of the shaft 177 and the planet carrier 114 to and through the roller bearings 113 to lubricate those bearings, and to the planetary sets for the forward and reverse directions. Part of the oil lubricating the forward and reverse direction planetary sets also lubricates ball bearing set 101. Ball bearing sets 174 and 175 are lubricated by return flow from transmission 15, through a lower inclined trough on housing 85. Gear 173 is partly submerged in oil in the sump, oil being picked up by gear 172. Ball bearing sets 150 and 151 being splash lubricated by oil picked up by gear 172. The ball bearing set 180 and the clutch 179 are lubricated by the leakage of oil past the various oil seals on the shaft 177. The oil return from the transmission 15 is also to the sump portion in the transfer drive case 17.

The transmission 15 and the power divider 14 of the present invention have many advantages in construction, maintenance, operation and result, note of which should be made. Firstly, all of the planetary sets are of the same size in both the power divider 14 and the transmission 15. The results of this construction will be described below. Further, the construction used in the transmission, in addition to the results in operation, provides for relatively simple maintenance and conversion between a two-speed forward and reverse direction transmission to a three-speed forward and reverse transmission. To convert the transmission 15 to a two-speed transmission, it is merely necessary to remove the housing 89 and the shaft 177 from the remainder of the transmission 15, and, in place thereof, to provide a tubular cap having conduit 77 connected through the end thereof. In this conversion, the intermediate speed ratio is removed with the first or creeper speed ratio and the third speed or travel speed ratio remaining. Also in this conversion, there is no necessity for disturbing the transfer drive case 17 in any respect. Further, when the transmission of the subject invention is used as a three-speed transmission, the only rotating clutch in the entire transmission is in that portion which is easily and simply removable from the remainder of the transmission. This advantage is important when it is considered that brakes such as brakes 127, 128, 152, and 165 as known in the art are relatively rugged and reliable as compared to rotating clutches such as clutch 179. Thus, the relatively weaker elements are in the member which is most easily removed for servicing.

Considering the size of the various planetary sets in relation to the construction and operation of the transmission 15 and power divider 14, the planetary sets of the present embodiment have been constructed of the following size: each of the ring gears is provided with 78 teeth, each of the sun gears is provided with 42 teeth, and each of the planet pinion gears is provided with 18 teeth. Assuming a counterclockwise rotation of the shaft 93 splined to the flywheel 80 of the engine 12 when looking from the transmission toward the flywheel 80, with the planet carrier 90 relatively stationary, power input is to the sun gear 92 and power output is from the ring gear 96. This size and construction results in a speed reduction of 1.86 to 1 and a clockwise direction of rotation of ring gear 96. For the forward direction, brake 128 is on and brake 127 is off. Shaft 100 drives sun gear 119 for the power input, and the output power is on the planet carrier 112. This results in a 2.86 to 1 speed reduction and a clockwise rotation of planet carrier 112. The total speed reduction between the shaft 93 and the planet carrier 112 will be 5.32 to 1. With the transmission 15 operated to the travel or third speed ratio in the forward direction, brakes 128 and 152 will be in the on position and brakes 127 and 169, and clutch 179 will be in the off position. In this condition, the output power on the planet carrier 112 is delivered as a power input to planet carrier 114, and the output is from the sun gear 145 and the tubular member 147. This arrangement will produce an overdrive speed of 1 to 2.86 between planet carrier 114 and sun gear 145, with the tubular member 147 rotating in a clockwise direction. The total speed change between shaft 93 and tubular member 147 will be a speed reduction of 1.86 to 1. For the intermediate or second speed ratio in the forward direction, brake 128 and clutch 179 will be in the on position, and brakes 127, 152 and 169 will be in the off position. In this condition the shaft 177, splined to the planet carrier 114 which in turn is bolted to the planet carrier 112, is the input member and tubular member 147 will be the output member. The change speed ratio between this input and output member will be a 1 to 1 ratio in a clockwise direction of rotation of tubular member 147. This will result in a total speed reduction between shaft 93 and tubular member 147 of 5.32 to 1. For the creeper or first speed ratio in the forward direction brakes 128 and 165 are in the on position and brakes 127 and 152 and clutch 179 are in the off position. In this condition, the power input is the sun gear 160, which is secured to planet carrier 114 in turn secured to planet carrier 112, and the output member is the planet carrier 164 splined to the tubular member 147. The speed change between this input and output member is a 2.86 to 1 speed reduction with a clockwise direction of rotation of tubular member 147. The total speed change between the shaft 93 and the tubular member 147 is a speed reduction of 15.20 to 1.

For the reverse direction, brake 127 is in the on position, and brake 128 is in the off position. Assuming again a counterclockwise rotation of shaft 93 looking from the transmission toward shaft 93, as previously noted the power divider 14 produced a speed reduction on shaft 100 of 1.86 to 1 with a clockwise direction of rotation of the ring gear 96. With brake 127 in the on position, shaft 100 supplies power to the input member, the sun gear 118. The output member is the ring gear 123 which is secured to the planet carrier 112. This arrangement produces a 1.86 to 1 speed reduction between the input and output members with a change in direction so that the ring gear 123 and the planet carrier 112 are rotated in the same direction as shaft 93, counterclockwise. The total speed change between shaft 93 and planet carrier 112 is a speed reduction of 3.46 to 1. Considering next the various speed ratios for the reverse direction, and taking first the travel or third speed ratio, the brakes 127 and 152 are then in the on position, and the brakes 128 and 165 and the clutch 179 are in the off position. In this arrangement, the planet carrier 114, which is secured to planet carrier 112 is the driving or input member and the sun gear 145 and the tubular member 147 are the output or driven members. The speed change between the input and output members is the same as previously described for the forward direction, that of an overdrive of 1 to 2.86. This results in a total speed change of a speed reduction of 1.21 to 1 between shaft 93 and tubular member 147 with a clockwise direction of rotation of tubular member 147. For the intermediate or second speed in the reverse direction, brake 127 and clutch 179 are in the on position and brakes 128, 152 and 165 are in the off position. The input and output members are the same as previously described for the forward direction giving a 1 to 1 speed ratio with total speed change of 3.46 to 1 between shaft 93 and tubular member 147 with a clockwise direction of rotation of tubular member 147. In the creeper or first speed in the reverse direction, brakes 127 and 165 are in the on position, and brakes 128 and 152 and clutch 179 are in the off position. Again, the speed change between the input and output members is the same as noted for the creeper speed in the forward direction, 2.86 to 1, and in the present arrangement, the total speed change between the shaft 93 and tubular member 147 is a speed reduction of 9.90 to 1 with a clockwise direction of rotation of tubular member 147.

These various speed ratios produced in both the forward and reverse directions may be summarized as follows:

| | Forward | Reverse |
|---|---|---|
| Travel Speed Ratio | $\frac{1.86}{1}$ | $\frac{1.21}{1}$ |
| Intermediate Speed Ratio | $\frac{5.32}{1}$ | $\frac{3.46}{1}$ |
| Creeper Speed Ratio | $\frac{15.20}{1}$ | $\frac{9.90}{1}$ |

These listed speed ratios in the two directions are all converted to vehicle speeds through the transfer drive case 17, and the axles to the driving wheels 26. From the tubular member 147 through the transfer drive case 17 to the axles, a conventional overdrive ratio is produced, and from the axles to the driving wheels 26 a conventional reduction ratio is produced. The specific speed ratios gained from the transmission 15 and power divider 14 and thereafter applied to the driving wheels 26 of the tractor 10 result in a unique and highly desirable combination of ratios for the operation of a tractor loader. A comparison between the ratios in the forward and the reverse direction shows that as opposed to the forward direction ratios, overdrive ratios are produced in the reverse direction. Further, if each series of speed ratios in both the foward and reverse directions are compared, it may be seen that in both the forward and reverse directions, the consecutive changes in speed ratios from the travel speeds to the creeper speeds form a true geometric series.

*Controls arrangement*

Turning next to a detailed description of the structure of the control means of the present embodiment, reference is particularly made to Figures 7 through 12. Figure 7 shows a simple view, the various elements forming the control means and the various conduits and elements interconnecting these control means, while Figures 8 through 12 show detailed enlarged cross-sectional views of the various elements of the control means. Describing first the main control valve 20, which is shown in Figure 8, the valve body 210 is provided with hole 209 therethrough for mounting the main control valve at some convenient position in the tractor 10, such as on one side of the hydraulic fluid reservoir 22. The valve body 210 is also provided with three cylindrical valve bores 211, 212, and 213. The valve bore 211 extends a certain distance downwardly from the upper surface of the valve body 210, and has a reduced portion at the lower end thereof. The lower portion of the valve bore 211 is provided with a valve seat 214. Within the valve bore 211, a valve spool 215 is disposed for upward and downward sliding movement. The valve spool 215 has a cup shaped depression 216 in the upper end thereof, and the lower portion thereof is formed to have a cylindrical projection 217 having a diameter larger than the opening through the valve seat 214 but smaller than the diameter of the valve bore 211. The cylindrical projection 217 is provided with a transverse passageway 218 formed therethrough, which intersects a small axial passageway 219, which extends from the lower end of the cylindrical portion 217. The diameter of the axial passageway 219 is very small compared to the diameter of the opening through the valve seat 214 so that relatively extremely small amounts of hydraulic fluid may pass therethrough compared to the amounts which may pass through the opening in the valve seat 214. The upper portion of the valve bore 211 is covered with a housing 220 which is secured thereon by suitable bolts such as bolt 221. The housing 220 includes a cap 222 and a lower cylindrical portion having substantially the diameter of the upper portion of valve bore 211 and extending into valve bore 211. The lower edge of the housing 220 and the upper surface of the valve seat 214 define the limits between which the valve spool 215 may move. The housing 220 is further provided with a cylindrical bore 223 which is positioned along the longitudinal axis of valve bore 211, and which extends from the lower surface of housing 220 to a cylindrical chamber 224 defined by the upper portion of the housing 220 and the cap 222. A piston 225 having a head portion and integrally formed shaft portion is positioned within the chamber 224 and the cylindrical bore 223. The head portion of the piston 225 has a diameter substantially equal to the diameter of the chamber 224 and the shaft portion thereof has a diameter substantially equal to the diameter of the cylindrical bore 223. The lower end of the shaft of the piston 225 extends from the lower portion of the housing 220, through the valve bore 211 and into the cup shaped portion 216 of the valve spool 215. The upper portion of the cylindrical chamber 224 above the head portion of the piston 225 is connected to conduit 66 through the cap 222, and the lower portion of the cylindrical chamber 224, below the head portion of the piston 225 is connected to conduit 65 through the housing 220. The housing 220 is also provided with a passageway 226, the lower end of which is extended into the space defined by the upper portion of the valve spool 215 and the lower surface of the housing 220 within the valve bore 211, and the upper end of which is connected to conduit 67 through the housing 220. The lower end of the valve bore 211 extends to a horizontal passageway 227. The horizontal passageway 227 extends, from a connection with a conduit 57, a certain distance into the valve body 210.

The cylindrical valve bore 212 also extends from the upper surface of the valve body 210 to the horizontal passageway 227. The lower portion 228 of the valve bore 212 is formed of a reduced diameter, and the upper end of the valve bore 212 is threaded to receive cap 229. The cylindrical valve spool 230 is mounted in the valve bore 212 for a reciprocating sliding action along the longitudinal axis of the valve bore 212. The valve spool 230 has an upper portion 231, a central portion 232 and a lower portion 233. The central portion 232 has a diameter substantially equal to the diameter of the valve bore 212 and is provided with an annular groove 234 therein. The lower portion 233 of the valve spool 230 is formed to have a cylindrical shape of a diameter substantially equal to the diameter of the reduced portion 228 of the valve bore 212, and further, is threaded to receive a cone shaped valve head 235. The upper portion 231 of the valve spool 230 has a diameter less than the diameter of the central portion 232 so that a fluid passageway is formed about the upper portion 231 within the valve bore 212. The center section of the upper portion 231 and the cap 229 are provided with cooperating spring retaining cavities for a compressed coil spring 236. The upper portion 231 of the valve spool 230 is also provided with a small groove 237 on a diameter thereof for the passage of fluid within the spring retaining cavities of the upper portion 231 and the cap 229 for lubricating the coil spring 236. A cylindrical passageway 238 is formed in the valve body 210 upwardly from the bottom thereof, the lower end of which is sealed with a plug 239. The passageway 238 is positioned to intersect the cylindrical valve bore 213 and the passageway 227 and lies along the longitudinal axis of the valve bore 212. The passageway 238 has a diameter slightly larger than the diameter of the lower portion 233 of the valve spool 230 and the largest diameter of the cone shaped valve head 235 so that when the valve spool 230 is in its lowermost position, an orifice is formed between the walls of the passageway 238 and the lower end of the lower portion 233 of the valve spool 230 and the outer periphery of the valve head 235. The lowermost limit of the valve spool 230 is determined by the distance between the upper surface of the portion 228 of the valve bore 212 and the lower surface of the central portion 232 of the valve spool 230. For purposes of clarity, the valve spool 230 is shown in its uppermost position in Figure 8, however, with no hydraulic fluid action upon the valve spool 230, the compressed coil spring 236 would move the valve spool 230 to its lowermost position wherein the orifice is formed within passageway 238. In the uppermost position of the valve spool 230, the annular groove 234 of the central portion 232 intersects a horizontal passageway 240 formed in the valve body 210. The horizontal passageway 240 extends from a connection with conduit 64 through the intersection with valve bore 212 at the point described and to the valve bore 211 at a position providing free hydraulic fluid exchange between the passageway 240 and the space about the portion 217 of the valve spool 215 within the valve bore 211. When the valve spool 230 is in its lowermost position, the central portion 232 thereof above the annular groove 234 will block the portions of the passageway 240 on each side thereof from any fluid exchange therebetween. However, a hydraulic fluid bypass around the valve bore 212 is provided. This bypass which is formed within the valve body 210 is somewhat U-shaped and comprises the two legs 241 and 242 with an interconnecting cross-piece 243. Each of the legs 241 and 242 of the hydraulic fluid bypass is connected in one portion of the passageway 240, and the interconnecting cross-piece 243 between the legs 241 and 242, which is shown in the dotted lines in Figure 8, is disposed within the valve body 210 rearwardly of the valve bore 212 as shown in Figure 8. The valve body 210 is also provided with two intersecting fluid passageways 244 and 245. The passageway 244 is formed in the valve body 210 from the upper surface thereof and connects at its lower end into passageway 240 between the valve bore 212 and the connection of the passageway 240 to the conduit 64. The upper end of the passageway 244 is sealed with a plug 246. The fluid passageway 245 is formed horizontally through the valve body 210 from one side thereof to the valve bore 212 at a position so as to be in a free fluid exchange relationship with the space defined by the outer periphery of the upper portion 231 of the valve spool 230 and the valve bore 212. The outer end of the passageway 245 is sealed with a plug 247. The valve bore 212 is also connected to another fluid passageway 248. The passageway 248 interconnects the lower portion of the valve bore 212 with the passageway 238 at a point in passageway 238 below the lowermost position of the valve head 235 in the passageway 238.

The cylindrical valve bore 213 is formed horizontally through the valve body 210 from one side thereof to the other. A cylindrical valve spool 249 is slidably mounted within the valve bore 213. One end of the valve bore 213 is sealed with a threaded plug 250 having a spring retaining cavity formed therein. The end of the valve spool 249 adjacent the plug 250 is also provided with a spring retaining cavity in the end thereof, and coiled spring 251 is disposed within these cavities. The compressed coiled spring 251 biases valve spool 249 toward the other end of the valve bore 213. The other end of the valve bore 213 is sealed with a threaded plug 252, and the conduit 68 is connected through the plug 252 into the valve bore 213. The valve body 210 is provided with another fluid passageway 253. The fluid passageway 253 is formed from the bottom of the valve body 210, to intersect the valve bore 213 and connected into the horizontal passageway 227 between passageway 238 and conduit 57. The lower end of the passageway 253 is sealed with a plug 254. The conduit 58 is connected into the valve bore 213 between passageways 253 and 238. The valve spool 249 has a portion 255 at one end thereof and a portion 256 at the other end thereof, each portion of which has an outer diameter substantially equal to the diameter of the valve bore 213 with the portion 255 having a width sufficient to block passageway 253 against the passage of any fluid therethrough when the portion 255 is disposed within the intersection of valve bore 213 and passageway 253, and with the portion 256 having a width sufficient to block passageway 238 against the passage of any hydraulic fluid therethrough when the portion 256 is disposed within the intersection of passageway 238 with the valve bore 213. The central portion 257 of the valve spool 249 between the portions 255 and 256 has a reduced diameter such that when the valve spool 249 is in the position shown in Figure 8, that position wherein the compressed spring has moved the valve spool 249 so that the portion 255 thereof blocks passageway 253 and so that the portion 256 of the valve spool 249 is clear of the passageway 238, hydraulic fluid may freely pass from passageway 227, through passageway 238 when the valve spool 230 is in its upper position, through the valve bore 213 about the portion 257 of the valve spool 249 and into conduit 58. When sufficient hydraulic fluid under pressure is delivered to conduit 68 to overcome the bias of compressed coil spring 251 to move the portion 255 to unblock passageway 253 and to move portion 256 to block passageway 238, hydraulic fluid may then pass freely from passageway 227, through passageway 253, through valve bore 213 about portion 257 and into conduit 58. The function and operation of the various described elements of the main control valve 20 will be described below after a further description of the remainder of the control means of the present invention since the cooperation of the various elements requires explanation of the whole control means before the function and operation of any one element thereof may be fully understood.

Turning next to a detailed description of the transmission hydraulic pump and governor arrangement 23, reference is particularly made to Figure 9. Note should be made that the governor portion 260 is separate from the normal engine governor which regulates the maximum speed of the engine. The governor portion 260 of the arrangement is shown in section and the transmission hydraulic pump 261 of the arrangement is shown in a side elevational view. The details of the transmission hydraulic pump 261 are not shown since any suitable type well known in the art may be used. The pump 261 may be similar in construction to pump 16 except, of course, in capacity. For the present invention it is sufficient to note that the pump 261 is provided with a drive shaft 262, an inlet or suction port 263 to which conduit 69 is connected, and an outlet or delivery port 264 connected in part to conduit 70. The transmission hydraulic pump 261 is fastened to the governor housing 265 by suitable bolts 266. The governor housing 265 of the governor mechanism 260 is secured by any suitable means such as bracket 267 and bolt 268 in axial alignment with the foreward end of the crankshaft 81 of the engine 12. The housing 265 is somewhat cylindrical in shape, having a cylindrical portion 270, an enlarged cylindrical portion 271, and a cover plate 272 fastened over the open end of of the portion 271 by bolts such as 273. The section 270 has a cylindrical bore 274 formed axially therethrough. The bore 274 is provided with three annular grooves 275, 276 and 277 axially spaced from each other. The annular grooves 275 and 276 are interconnected by a fluid passageway 278 formed in the housing 265, and the passageway 278 is connected to the delivery port 264 of the transmission pump 261 through the body of the pump 261. The annular groove 277 is connected to conduit 66 through the housing 265 by a passageway 279. The cylindrical bore 274 is provided with a sleeve 280 mounted therewithin and extending substantially from one end to the other. The sleeve 280 has three openings therethrough. One of the openings 281, in alignment with annular groove 275, permits hydraulic fluid flow from annular groove 275 through opening 281 to provide lubrication for the roller bearings 286. Another opening 282 is positioned in axial alignment with annular groove 276 and provides for fluid communication from annular groove 276 through the sleeve 280 at the point of the opening 282. The third opening 283 is positioned through the sleeve 280 in axial alignment with passageway 279 and provides for fluid communication from passageway 279 to a certain point within sleeve 280. The governor mechanism 260 is further provided with a carrier element 284. The carrier element 284 is provided with a cylindrical portion which is journalled within the sleeve 280. The carrier element 284 also is formed to have a shaft portion which extends outwardly from the plate 272 and is keyed to the crankshaft 81 of the engine 12. Between the shaft portion and the cylindrical portion, the carrier element 284 has an enlarged narrow cylindrical section which is positioned for rotation within the cylindrical chamber defined by the portion 271 and the plate 272. The shaft portion of the carrier element 284 is rotatively mounted within the ball bearing set 285 which is in turn mounted within an opening through plate 272. The cylindrical portion of the carrier element 284 journalled within the sleeve 280 is adapted to cooperate with the roller bearings 286. The end of the cylindrical portion of the carrier element 284 is also provided with a sleeve 287 keyed therein, and the drive shaft 262 of the transmission pump 261 is splined within the sleeve 287. The remainder of the cylindrical portion of the carrier element 284 has an outer diameter substantially equal to the inner diameter of the sleeve 280, and is provided with three fluid seals to substantially prevent the leakage of any hydraulic fluid axially of the carrier element 284 and between the sleeve 280 and the outer circumference of the cylindrical portion of the carrier element 284. It may thus be seen that when the crankshaft 81 of the engine 12 is rotated, the carrier element 284 is rotated thereby, and the carrier element 284 in turn rotates the drive shaft 262 to operate the transmission pump 261.

The portion of the carrier element 284 within the chamber formed by the portion 271 and plate 272 of the governor 260, carries a governor valve element 290 which is fastened thereto. The governor valve element 290 comprises a governor valve section 291 and a governor weight 292. The two sections 291 and 292 are disposed at the opposite ends of an axis normal to the axis of rotation of the carrier element 284, and the sections 291 and 292 are interconnected by a hole 293 through the carrier element 284. A governor shaft 294 is mounted within the hole 293 and extends into the governor valve section 291 at one end thereof and into the governor weight section 292 at the other end thereof. The portion of the shaft 294 within the governor valve section 291 carries two cylindrical lands 295 and 296 separated by a short cylindrical member 297. The lands 295 and 296 and the member 297 are secured to the shaft 294 by the nut 298. The other end of the shaft 294, that end within the governor weight section 292 is provided with a governor weight 299 which is secured thereon by a nut 300. A compressed coiled spring 301 is disposed about the shaft 294 within the section 291, and bears against one side of the land 296 and the shaft portion of the carrier element 284. The compressed coiled spring 301 exerts a calculated force upon the land 296 to keep the weight 299 at its radially innermost point when the carrier element 284 is rotated at any speed less than normal lowest operating speed of the engine 12. This position is shown in Figure 9. The governor weight 299 may be moved radially outward by a centrifugal force until the land 296 abuts a shoulder within the valve section 291, further compressing the coiled spring 301. The land 296 has a diameter substantially smaller than the diameter of the land 295 so that the surface of the land 295 radially outward from the cylindrical member 297 is substantially larger in area than the surface of the land 296 radially outward from the cylindrical member 297. The result of this construction is that for any hydraulic fluid under certain pressure between land 295 and 296 and about the cylindrical member 297, a greater hydraulic force will be exerted in a direction radially outward from the axis of rotation of carrier element 284 than will be exerted radially inward from axis of rotation of carrier element 284. The governor valve section 291 is further provided with a cylindrical bore 302 and an adjacent cylindrical bore 303. The cylindrical bore 302 has a diameter substantially equal to the diameter of the land 295 and a length substantially equal to the distance of travel of the land 295 plus the width of the land 295. The bore 303 has a diameter substantially equal to the diameter of the land 296 and a length substantially equal to the distance of travel of the land 296 plus the width of the land 296. An annular groove 304 is formed in bore 302, an annular groove 305 is formed at the junction of bores 302 and 303, and a third annular groove is formed in bore 303. Each of the annular grooves 304, 305, and 306 is connected by a short passageway extending to the surface of the section 291 toward the transmission pump 261. The annular groove 304 and its passageway are positioned along the bore 302 at a point wherein the land 295 will seal the groove 304 from bore 302 in all positions of axial movement of the land 295, except that position when the land 295 is in its radially outermost position from the axis of rotation of the carrier element 284. The short passageway of the annular groove 304 opens into the chamber defined by the portion 271 and the plate 272 of the housing 265. Annular groove 305 is always open to the space between lands 295 and 296 about the cylindrical member 297. Annular groove 306 and its short passageway are positioned along the bore 303 at a position such that when the land 296 is in its innermost position from the axis of rotation of the assembly 284, the entire width of groove 306 is unblocked by land 296 to open groove 306 to groove 305. The short passageway of the annular groove 306 is connected through the adjacent portion of the carrier element 284 to a passageway 307. The passageway 307, which is formed in the carrier element 284, has one end thereof sealed with a plug 308. The other end of the passageway 307 is connected into a passageway 309. One end of the passageway 309 is sealed with a plug 310. The other end of the passageway 309 is connected into an annular groove 311. The annular groove 311 is positioned about the cylindrical portion of the carrier element 284 at a point providing free fluid interchange with the opening 282 in the sleeve 280, which opening 282 was previously described as interconnected with annular groove 276 in the bore 274 of the housing 265. The short passageway of the annular groove 305 is connected into a passageway 312. The passageway 312 is similar to passageway 307 and lies parallel thereto and directly therebehind as seen in Figure 9. Passageway 312 is independent of passageway 307 in the carrier element 284. The passageway 312 is connected to a passageway 313 formed in the carrier element 284, and the passageway 313 in turn, is connected into a passageway 314, which in turn is connected to an annular groove 315 formed in the cylindrical portion of the carrier element 284 and at a position providing free fluid interchange with the opening 283 through the sleeve 280, which opening 283 was previously described as connected to annular groove 277 in the cylindrical bore 274 of housing 265. Thus it may be seen that hydraulic fluid may freely pass from the delivery port 264, through the passageway 278, annular groove 276, opening 282, annular groove 311, passageway 309, passageway 307, short passageway and annular groove 306, and further, if land 296 is radially inward sufficient to unblock annular groove 306, the hydraulic fluid may freely pass from annular groove 306, about cylindrical member 297 into annular groove 305, through the passageway 312, passageway 313, passageway 314, annular groove 315, opening 283, annular groove 277, passageway 279, to conduit 66. It may be added that any hydraulic fluid passing from the short passageway of annular groove 304 serves to lubricate the ball bearing set 285, and the excess is collected in the lower portion of the chamber defined by portion 271 and plate 272 of housing 265. From this portion of the housing, hydraulic fluid is free to return to the suction port 263 of the pump 261 through passageway 316 formed through the cylindrical portion 265 of housing 265 and connected to conduit 69. Although conduit 316 is shown as connected to conduit 69 externally of the transmission pump 261, this may be done internally thereof in a manner similar to the connection of passage 278 to delivery port 264 of the pump 261. Any excess fluid lubricating roller bearing 286 is collected through passageway 317 which is connected between passageway 316 and the space between sleeve 280 and carrier element 284.

Turning next to a detailed description of the structure of the pressure regulating valve 25 shown in an enlarged cross-section in Figure 10, the body 318 thereof is mounted against the transmission housing by means of fasteners (not shown) through the four mounting holes 319. The valve body 318 is provided with three horizontal valve bores 320, 321 and 322. The valve bore 320 is formed to extend from one side of the valve body 318 a certain distance therewithin. The open end of valve bore 320 is sealed with a plug and bracket member 323. The plug and bracket member 323 has an opening therethrough axially of the valve bore 320 and a spring compressor rod 324 is slidably mounted therein. The plug and bracket 323 also carries a lever 325 and a link 326. The lever 325 and the link 326 are both rotatively mounted about a pin 327. A pin 328 secures the lever 325 and the link 326 together so that any rotation of the link 326 causes a comparable rotation of the lever 325. The link 326 is pivotally connected to the throttle operating rod 41 so that when the throttle pedal 33 is depressed to increase the throttle opening in the carburetor means for the engine, the link 326 is pivoted to rotate the lever 325 which projects against the spring compressor rod 324 to move the rod 324 further into the valve bore 320. A release of the throttle pedal 33 to the idle position as shown in Figures 3, 7, and 10 causes the link 326 to be pivoted to its maximum counterclockwise position as shown in Figure 10, in turn, pivoting the lever 325 to a point permitting the spring compressor rod 324 to be moved to its maximum outward position from the valve bore 320. The annular bore 320 is provided with annular grooves 329, 330, 331, 332 and 333 spaced consecutively from each other starting with annular groove 329 at the innermost end of the valve bore 320. The annular grooves 330 and 333 are connected by means (not shown) to the sump within the transfer drive casing 17. The conduit 78 has been previously noted as connected to the sump and an alternative construction would be to connect annular grooves 330 and 333 to the conduit 78 through the valve body 318. Each of the valve bores 320, 321 and 322 have a opening 334, 335 and 336 respectively, in the spring retaining sections thereof. Each of these openings 334, 335 and 336 is also connected into the sump of the transfer drive case 17, however, these openings also may be connected to conduit 78 through the valve body 318 as an alternate form of construction. The valve bore 320 is also provided with a valve spool 337. The valve spool 337 comprises three axially spaced lands 338, 339 and 340. Lands 338 and 339 are separated by a short groove 341 and lands 339 and 340 are separated by a reduced section 342. The end of the land 340 facing the spring compressor rod 324 abuts against a compressed coiled spring 343, the other end of which abuts a flange on the spring compressor rod 324. The compressed coiled spring 343 biases the valve spool 337 toward the inner end of the valve bore 320. The valve spool 337 and the valve bore 320 may be designated the throttle responsive or pilot valve, and it may be seen that this pilot valve will operate under conditions dependent upon the settings of the throttle of the engine 12. The reduced portion 342 of the valve spool 337 has an opening therein connected to a passageway 344 which extends to the inner end of the valve spool 337 cooperating with the annular groove 329 of the valve bore 320. The land 338 has an outer diameter substantially less than the diameter of the lands 339 and 340. The lands 339 and 340 have substantially the same outer diameter. The valve bore 320 is formed to have substantially the same diameter as land 338 adjacent thereto, and substantially the same diameter as lands 339 and 340 adjacent thereto. The annular grooves of the valve bore 320, and the lands of the valve spool 337 are so disposed that when the valve spool 337 is in its innermost position, land 338 blocks any fluid flow between grooves 329 and 330, land 339 blocks any fluid flow between grooves 330 and 331, reduced portion 342 permits fluid flow between grooves 331 and 332, and land 340 blocks any fluid flow between grooves 332 and 333. Fluid may flow from annular groove 331 through passageway 344 into annular groove 329. As the valve spool 337 is moved outwardly, the land 339 will be moved to a position blocking annular groove 331 from fluid communication with annular groove 332. As the valve spool 337 is additionally moved outwardly, the reduced portion 342 will permit fluid communication between annular groove 332 and 333. Annular groove 332 is connected through the valve body 318 to conduit 67, and annular groove 331 is connected by passageway 345 to an annular groove 346 in valve bore 321.

Valve bore 321 extends through the valve body 318 from one side thereof to the other. One end thereof is sealed with a cap 347, and the other end thereof is sealed with a cap 348. The valve bore 321 is provided with annular grooves 346, 353 354 and 355 axially spaced from each other respectively from the cap 347 toward the cap 348, and a spring chamber between the annular groove 355 and the cap 348. The annular groove 346 is connected to conduit 70 through the valve body 318. The annular groove 353 is connected to the sump in the transfer drive case 17 through the conduit 78 connected thereto through the valve body 318. The annular groove 354 is connected to passageway 345 through a passageway 356. The remaining annular groove, groove 355, is connected through the valve body 318 to an annular groove 357 of the valve bore 322. The spool 358, which with the valve bore 321 may be designated the pressure regulating valve, comprises lands 349, 350, 351 and 352 of substantially the same diameter and equal to the diameter of the valve bore 321, which lands are axially spaced from each other respectively from the cap 347 toward the cap 348. The end of the valve spool 358 from the land 352 to the cap 348 is provided with a compressed coiled spring 359 mounted thereabout and acting upon the cap 348 and the land 352 to bias the valve spool 358 against the cap 347. In this position of the valve spool 358, the annular groove 346 is unblocked by the portion of the valve spool 358 between lands 349 and 350, the annular groove 346 is blocked from annular groove 353 by land 350, the lands 350 and 351 are positioned at each end of the annular groove 353, the land 351 blocks annular groove 353 from annular groove 354 and the land 352 blocks annular groove 355. Fluid communication is provided between groove 354 and the end of the valve spool 358 adjacent cap 347 by a fluid passageway 360 extending between that end of the valve spool 358 and the portion of the valve spool 358 between lands 351 and 352. When the valve spool 358 is moved toward cap 348 against the bias of the coiled spring 359 by fluid pressures operating against the end of the spool 358 adjacent cap 347, the land 352 is moved to first unblock annular groove 355 thereby providing free fluid communication between annular grooves 354 and 355. Secondly, the land 350 is moved to permit fluid communication between grooves 346 and 353. Thirdly, the land 351 is moved to permit fluid communication between annular grooves 353 and 354.

The valve bore 322 is formed to extend from one side of the valve body 318 therein a certain distance, and is formed to include three annular grooves 362, 357 and 363. The annular grooves 362, 357 and 363, respectively, are axially aligned in a spaced relationship to each other along valve bore 323. The outer end of the valve bore 323 is sealed with a cap 364. The valve bore 322 includes a spring retaining chamber between annular groove 363 and the cap 364 into which a portion of the valve spool 365 projects. The valve spool 365 comprises two lands 366 and 367 axially spaced on the valve spool 365. A compressed coiled spring 368 mounted within the spring retaining chamber of the valve bore 322, about the valve spool 365 and between the land 367 and the cap 364, biases the valve spool 365 against the inner end of the valve bore 322. In this position, the land 366 blocks annular groove 362 from any fluid communication with annular groove 357. Further, in this position, there exists free fluid communication between the grooves 357 and 363 between lands 366 and 367. Spool 365 and valve bore 322 may be designated the lubricating fluid pressure regulating valve, and when a fluid pressure in excess of a certain amount determined by the force of spring 368, is applied against the end of land 366 through the passageway 369, which extends between the end of the valve spool 365 within annular groove 362 and the portion of the valve spool 365 between lands 366 and 367, the valve spool 365 is moved toward cap 364. This movement of the valve spool 365 will cause land 366 to block annular groove 357 from fluid communication with annular groove 363. Annular groove 363 is connected to conduit 77 through a suitable passageway in the valve body 318. The function and operation of the various valves in the assembly 25 will be described below in the description of the operation of the invention.

Turning next to a detailed description of the control valve 21 for operating the boom control rams 45 and the bucket control rams 47, reference is particularly made to Figure 11 wherein the control valve 21 is shown in an enlarged cross-sectional view. The valve 21 comprises a valve body 370, two valve spools 371 and 372, and a pressure relief valve 373. The valve body 370 is provided with four holes 374 therethrough by which the valve 21 may be mounted in the tractor 10. The valve spool 371 is slidably mounted within the valve bore 375, and the valve spool 372 is slidably mounted within the valve bore 376. The valve bores 375 and 376 are formed through the valve body 370 from one side thereof to the other. The valve spool 371 extends from each end of the valve body 370. A portion 377 at one end of the valve spool 371 is adapted for an operative connection with the lever 30 shown in Figure 3. A cap and indexing means 378 is mounted over the other end of the valve spool 371 sealing that end of the valve bore 375. The cap 378 is provided with three sets of indexing slots 379, each set being positioned in a spaced apart relationship to each other axially of the valve bore 375. These three sets of slots 379 cooperate with detent balls 380 carried by the end of the valve spool 371 projecting into the cap 378. As shown in Figure 11, the valve spool 371 is in the center or neutral position, and from that position the valve spool 371 may be moved longitudinally in either direction to bring the detent balls 380 into one of the other sets of slots 379 to index the valve spool in these other positions. The valve bore 375 is provided with five annular grooves 381, 382, 383, 384 and 385 which are axially spaced therein. The annular groove 381 is directly connected to a port in the valve body 370 shown in dotted lines, which port is connected to conduit 59. The annular grooves 382 and 384 are interconnected by a passageway which further interconnects these grooves to an annular groove 386 of valve bore 376. The annular groove 383 simplifies construction of the valve bore 375. The annular groove 385 is directly connected to a port through the valve body 370 shown in dotted lines in Figure 11, which port is connected to conduit 60. The valve spool 371 is formed to have two annular grooves 387 and 388, separated by a land 389, and a number of passageways. These passageways comprise fluid passageways 390, 391, 392 and 393 formed transversely through the valve spool 371. Passageways 390 and 391 are interconnected by a center bore 394, and passageways 392 and 393 are interconnected by a center bore 395. The valve body 370 is further formed to include a cavity 396 which intersects valve bores 375 and 376 adjacent each end thereof and which is in a fluid connecting relationship with conduit 63 previously noted as connected into the reservoir 22. The various grooves and passageways of the valve spool 371 and the valve bore 375 are so positioned that in the neutral position shown in Figure 11, the passageways 390, 391, 392, and 393 and the annular grooves 381 and 385 are blocked by the valve spool 371, and so that when the valve spool 371 is moved outwardly from the valve body 370, passageway 393 is connected into cavity 396, passageway 392 is connected into annular groove 385, passageway 391 is connected into annular groove 382, and passageway 390 is connected into annular groove 381. Further, when the valve spool 371 is moved to its innermost position, passageway 390 is then connected into cavity 396, passageway 391 is connected into annular groove 381, passageway 392 is connected into annular groove 384, and passageway 393 is connected into annular groove 385. The operations of the boom control rams 45 when valve spool 371 is moved to its various positions will be described below.

Valve spool 372 extends outwardly from one end of the valve body 370, and that end has a portion 397 adapted to be operatively connected to the lever 31 shown in Figure 3. The other end of spool 372 is slidably positioned in a hollow cap 398, threaded into the valve body 370 at that end of the valve bore 376. A coiled spring 399 is secured at one end thereof to the end of the valve spool 372 in the cap 398 and at the other end thereof to the valve body 370 in the cavity 396. This spring 399 serves to bias the valve spool 372 to the neutral position shown in Figure 11. When the valve spool 372 is moved axially or longitudinally to either side of this neutral position, a reaction force is created by the spring 399 tending to return the valve spool 372 to the neutral position. The valve bore 376 comprises five annular grooves 400, 401, 386, 402 and 403. Annular groove 400 is directly connected to a port shown in dotted lines, through the valve body 370, which port, in turn, is connected to conduit 62. Annular grooves 401 and 402 are interconnected by a cavity 404. The cavity 404 includes a connection to conduit 58 from the main control valve 20 and a portion of the pressure relief valve 373. As previously noted annular groove 386 is interconnected by a short passageway to annular grooves 382 and 384. Annular groove 403 is connected to a port, shown in dotted lines in Figure 11, formed through the valve body 370, which port is directly connected to conduit 61. The valve spool 372 is formed to include two annular grooves 405 and 406 on each side of a land 407, and a number of passageways. These passageways include four passageways 408, 409, 410 and 411 formed transversely through the valve spool 372 in a spaced apart relationship to each other, and two passageways 412 and 413 formed axially through the center of the valve spool 372. The axial passageway 412 interconnects the two transverse passageways 408 and 409 and the axial passageway 413 interconnects the two transverse passageways 410 and 411. The various grooves and passageways of the valve bore 376 and the valve spool 372 are so positioned that when the portion 397 of the valve spool 372 is moved outwardly from the valve body 370, passageway 411 is connected to cavity 396, passageway 410 is connected to annular groove 403, passageway 409 is connected to annular groove 401 and passageway 408 is connected to annular groove 401 and passageway 408 is connected to annular groove 400. When the portion 397 of the valve spool 372 is moved inwardly with respect to the valve body 370, passageway 408 is connected into cavity 396, passageway 409 is connected to annular groove 400, passageway 410 is connected to annular groove 402 and passageway 411 is connected to annular groove 403. Further, it should be noted that when the valve spool 372 is in the neutral position shown in Figure 11, all of the passageways 408, 409, 410 and 411, and annular grooves 400 and 403 are blocked by the valve spool 372. The operations of the bucket control cylinders or rams 47 when the valve spool 372 is moved to its various positions will be described below.

It may be noted that conduit 58 is a high pressure hydraulic fluid line and conduit 63 is a low pressure hydraulic fluid return line. The only means in the valve 21 for directly interconnecting the high pressure hydraulic fluid side of the valve to the low pressure hydraulic fluid side is the pressure relief valve 373. The pressure relief valve 373 comprises a cylindrical valve member 431 formed with one end closed, and with the other end open and forming a valve seat, and having a plurality of openings 414 therethrough. The member 431 is formed to have an exterior annular groove 415 for cooperation with a retaining screw 416. The member 431 is mounted through an opening between the cavity 404 and the cavity 396 with the open end and valve seat projecting into cavity 396 and with the closed end and the openings 414 extending into the cavity 404. The open end of the member 431 is adjustably closed by a piston and valve head assembly 417. The assembly 417 includes a piston slidably mounted within the member 431 interconnected by a short shaft portion to the valve head portion with the valve head portion seating against the valve seat of the open end of the member 431 within the cavity 396. The assembly 417 includes a center passageway and chamber interconnecting cavity 396 and the closed end of the member 431 so that the piston of the assembly 417 will not draw a vacuum in the closed end of the member 431. The valve head portion of the assembly 417 is maintained against the valve seat portion at the open end of the member 431 by a compressed coiled spring 418. The coiled spring 418 is compressed between the valve head portion of the assembly 417 and a set screw carried by a cap member 419. The cap member 419 is threaded through an opening in the valve body 370 and into the cavity 396, and the outwardly extending tip portion of the cap member 419 is removable to expose the set screw threaded therein and by threading the set screw inwardly or outwardly with respect to the valve body 370, the amount of compression in the coiled spring 418 and the resulting force with which the valve head portion of the assembly 417 is maintained against the valve seat portion of the member 431 may be varied. If the hydraulic fluid pressure in the cavity 404 rises above that amount for which the coiled spring 418 is calibrated and adjusted, the high pressure hydraulic fluid entering through the openings 414 in the member 431 will act upon the valve head portion of the assembly 417, and against the bias of the coiled spring 418 to force the valve head portion of the assembly 417 from its valve seat. The high pressure hydraulic fluid side is then directly connected to the low pressure hydraulic fluid side of the valve 21, and this condition will remain as long as an excessive hydraulic fluid pressure is delivered to cavity 404. When the hydraulic fluid pressure therein falls below the predetermined maximum amount, the coiled spring 418 will return the valve head portion of the assembly 417 against its valve seat to seal cavity 404 from cavity 396.

Describing the remainder of the structure shown in Figure 11, the boom and bucket control cylinders or hydraulic rams 45 and 47 may be of any type well known in the art. Each of these hydraulic rams comprises a cylinder having a piston and integral piston rod slidably mounted therein, and hydraulic fluid ports at each end of the cylinders thereof so that the pistons may be moved in either direction relative to the longitudinal axis of the cylinders by delivering high pressure hydraulic fluid to the port at one end of one of cylinders and by permitting hydraulic fluid to flow from the port at the other end of that cylinder. Further, the hydraulic valve 21 shows a number of openings through various portions of the valve body 370 with these openings sealed by plugs 420, 421 and 422. This construction greatly aids the fabrication of the valve in such details as the drilling of passageways in the valve body and the assembly of the various portions of the valve. Further, shaft sealing means 423 and 424 of any suitable type well known in the art, are used about valve spools 371 and 372 respectively to reduce to a minimum the leakage of any hydraulic fluid about the outer surface of these valve spools.

Turning next to a description of the transmission control valve 24, reference is particularly made to Figure 12 wherein that valve is shown partially in cross-section. Reference will be made to the other operated positions of valve 24 in the description of the operation of the control valve 24. The transmission control valve 24 comprises a valve body 430 having two valve spools 35 and 39 slidably mounted therein. The valve body 430 is mounted against the transmission 15 and this mounting arrangement serves to permit a number of the low pressure hydraulic fluid lines to be returned to the sump in the transfer drive case 17 directly through the casing 85 of the transmission 15. These low pressure hydraulic fluid return lines are shown as the following ports extending through the back wall of the body 430 of the transmission control valve 24 in Figure 12: 433, 434, 435, 436, 437, 438, 439, 440, 441 and 442. The valve body 430 is further formed to have two valve bores 443 and 444 formed therethrough from one side of the valve body 430 to the other. Valve spool 35 is slidably mounted in valve bore 443 and valve spool 39 is slidably mounted in valve bore 444. One end of the valve spool 35 is formed to have detent balls 445 mounted therein, which detent balls cooperate with four indexing slots 446, 447, 448 and 449 formed in a cylindrical cap 450. The cylindrical cap 450 is secured over one open end of the valve bore 443 through the valve body 430. The other end of the valve spool 35 is adapted for connection to the link 36 shown in Figure 3. The valve spool 35 is further formed to have four lands 451, 452, 453 and 454, positioned in a spaced apart relationship along the valve spool 35 and separated from each other by depressed portions or portions having a smaller diameter than the diameter of the lands. Each of the lands 451, 452, 453 and 454 has a diameter substantially equal to the diameter of the bore 443. Lands 451 and 452 are separated by depressed portion 455, lands 452 and 453 are separated by depressed portion 456, and lands 453 and 454 are separated by depressed portion 457. Valve spool 39 is provided with a number of detent balls 458 at one end thereof, which detent balls cooperate with three detent slots 459, 460 and 461 formed in a cylindrical cap 462. The cylindrical cap 462 is secured over one open end of the valve bore 444 extending through the valve body 430. The other end of the valve spool 39 is adapted for operative connection to the link 40 shown in Figure 3. The valve spool 39 is further formed to include five lands 463, 464, 465, 466, and 467 spaced from each other along valve spool 39. The lands are separated by depressed portions. Each of the lands 463, 464, 465, 466 and 467 has a diameter substantially equal to the diameter of valve bore 444. The lands 463 and 464 are separated by depressed portion 468, lands 464 and 465 are separated by depressed portion 469, lands 465 and 466 are separated by depressed portion 470, and lands 466 and 467 are separated by depressed portion 471. The detent balls and slots for the valve spool 35 provide for four operated positions of the valve spool 35, and the detent balls and slots of valve spool 39 provide for three operated positions of the valve spool 39. In the various operated positions of the valve spools 35 and 39, the lands and depressed portions of these valve spools cooperate with a number of passageways formed through the valve body 430 to provide means for controlling the operation of the transmission 15 in the desired manner. The low pressure hydraulic fluid return ports 433, 434, 435, 436 and 437 are connected by short passageways into valve bore 443. The low pressure hydraulic fluid return ports 440, 438, 441, 439 and 442 are connected by short passageways into the valve bore 444. Conduit 73 is connected by a passageway through the valve body 430 into valve bore 443. Conduit 73 is connected at two points into the valve bore 443 by passageways 472 and 473. Conduit 74 is connected through valve body 430 into valve bore 444 at two points through passageways 474 and 475. Conduit 75 is connected into valve bore 444 through the valve body 430 at two points therein through passageways 476 and 477. Conduit 76 is also connected into valve bore 444 through valve body 430 at two points therein through passageways 478 and 479. Passageway 478 is positioned to connect into valve bore 444 at a point axially of the valve bore 444 in alignment with the short passageway of port 441. Passageway 476 is connected into valve bore 444 at the same axial point of valve bore 444 as the short passageway connected to port 438. Further, in the same manner passageway 475 is in alignment with the short passageway of port 439. Conduit 71 is connected to three passageways 480, 481 and 482 formed in the valve body 430. Passageway 480 leads into a valve bore 444 at a point axially of the valve bore 444 between passageways 477 and 479. Passageway 481 leads into valve bore 443 at a point axially of the valve bore 443 between passageway 472 and the passageway connecting conduit 72 into valve bore 443. Passageway 482 leads into valve bore 444 at a point axially of valve bore 444 between passageway 478 and the passageway of port 439. Conduit 68 is connected through the valve body 430 to two passageways 483 and 484. Passageway 483 leads into valve bore 443 at a position in alignment with passageway 473 axially of the valve bore 443, and passageway 484 leads into valve bore 443 in alignment with the passageway of port 435 axially of the valve bore 443. The operation of the transmission control valve 24 resulting from the position of the various described passageways therein and the resulting hydraulic fluid paths therethrough will be described below with reference to the other figures of the control valve 24, Figures 13 through 23.

*Operation*

With the detailed description of the structure of the present invention as defined above and disclosed in the drawings, reference is again made to the drawings for a detailed description of the various functions, operations and results of the present invention in order that the present invention may be readily understood. With the engine 12 operating at the lowest speed, the crankshaft 81 in Figures 4A and 9 are rotated at the same speed. Governor member 284 will be rotated to in turn rotate shaft 262 of the transmission hydraulic pump 261. The governor weight 299 will not be moved radially outward at this time as the coiled spring 301 is so selected that at the lowest speed of the engine, below approximately 500 r.p.m., the spring 301 will counteract the centrifugal force tending to move the governor weight 299 radially outward to maintain the governor weight 299 substantially in the radial position shown in Figure 9. However, at a speed of approximately 500 r.p.m. of the engine and speeds thereabove, the centrifugal force equals and then overcomes the force exerted by the coiled spring 301. Hydraulic fluid will be drawn into the inlet port 263 through the suction line conduit 69 of the transmission pump 261, and hydraulic fluid will be delivered from the outlet port 264 through conduit 70 and passageway 278. The hydraulic fluid flowing into passageway 278, in addition to flowing through annular groove 275 to provide lubrication, will flow into annular groove 276. From annular groove 276 the hydraulic fluid will flow through opening 282, annular groove 311, passageway 309, passageway 307 to annular grove 306. The flow of hydraulic fluid is blocked at this point by the land 296, and this result which is due to the force of the coiled spring 301, performs a very important function, that of preventing any drag on the transmission and a consequent slow creep of the tractor when the transmission is in one of the driving positions and the engine speed is at the lowest operating speed. With the hydraulic fluid blocked in annular groove 306 by land 296, no hydraulic fluid can flow from annular groove 306 to annular groove 305, and from there through passageway 312, passageway 313, passageway 314, annular groove 315, opening 282, annular groove 277, passageway 297, conduit 66 to chamber 224. Thus, no hydraulic fluid pressure is exerted upon the piston 225. Therefore, the piston 225 will not force the valve plunger 215 downwardly. Also, no pressure is exerted upon the valve plunger 215 from conduit 67 and passageway 226 as may be shown. The hydraulic fluid flowing to conduit 70 is delivered to annular groove 346, passageway 345 to annular groove 331. When no pressure is exerted upon the throttle pedal 33, substantially no pressure is exerted upon link 324 by lever 325. The coiled spring 343 is so selected that at this condition substantially no pressure is exerted upon valve spool 337 of the pilot valve. The hydraulic fluid will then flow through the opening in the reduced portion 342 of the pilot valve spool 337, through passageway 344 into annular groove 329. The pressure of the hydraulic fluid in annular groove 329 will move the valve spool 337 a distance sufficient to cause land 339 of the valve spool 337 to block annular groove 331. Hydraulic fluid pressures slightly above zero p.s.i. are sufficient to cause land 339 to block annular groove 331. When land 339 blocks annular groove 331, annular groove 332 will be connected to annular groove 333 about depressed section 342 to vent any hydraulic fluid from conduit 67 to the sump. Of course, passageway 344 is then also vented to the sump thereby permitting valve spool 337 to again move inwardly, however, the fluid pressure in annular groove 331 will again cause the groove 331 to be blocked by land 339. This reciprocating action of the valve spool will continue and no hydraulic fluid pressure will be applied to conduit 67. The groove 330 will vent any hydraulic fluid under pressure leaking past land 339 to the sump. Thus, at the lowest operating speed, no hydraulic fluid under pressure is delivered through conduit 67. Assuming that the transmission is in one of the driving positions, which is possible since hydraulic fluid under a pressure of approximately 125 p.s.i. is delivered through conduit 71 connected to conduit 70 as will be described hereinafter, and this pressure is sufficient to operate one of the brakes in the transmission, as the crankshaft 81 is rotating stub shaft 93, in turn driving sun gear 92 of the power divider 14, any braking effect upon the planet carrier 90 will create a force reaction sufficient to cause the planet pinion gears 91 to drive the ring gear 96 to in turn deliver power to the wheels 26 of the tractor to cause the slight drag or creep of the vehicle which has always been found very objectionable in the art. However, in the present invention there will be no braking effect upon the planet carrier 90 since no hydraulic fluid under pressure is delivered through conduits 66 and 67. The inertia of the transmission and traction elements of the tractor is many times greater than the inertias in the following power path: The planet carrier 90, gear 103, shaft 106, main hydraulic pump 16. The main hydraulic pump 16 will rotate freely since no pressures will be developed over the following circuit, from reservoir 22, conduit 55, check valve 56, main hydraulic pump 16, conduit 57, through the opening in valve seat 214, passageway 240, passageway 241, passageway 243, passageway 242, conduit 64, conduit 63 to the reservoir 22. The weight of the piston 225 and the valve spool 215 are negligible with respect to the hydraulic fluid force required to raise them. Thus, it may be seen that as long as the engine speed is at the lowest operating speed, and substantially no pressure is exerted upon throttle pedal 33, all of the engine power will be transmitted through the planet carrier 90, and none will be transmitted through the ring gear 96 to cause a slight creep of the vehicle.

The hydraulic fluid pressure of approximately 125 p.s.i. in conduit 71 is produced by the pressure regulating valve of the assembly 25. The hydraulic fluid delivered by the pump 261 through conduit 70 to annular groove 346, will pass therefrom to passageway 345, passageway 356, annular groove 354, through hole in depressed section between lands 351 and 352, passageway 360 to the end of valve spool 358 adjacent cap 347. When the hydraulic fluid pressure throughout these circuits, and in conduit 71 connected in parallel of conduit 70, reaches a value of approximately 100 p.s.i., determined by the force of spring 359, the valve spool 358 will begin to be moved against the bias of spring 359. The first action will be the unblocking of annular groove 355, and the consequent hydraulic fluid flow to annular groove 357 of the lubricating fluid pressure regulating valve. The hydraulic fluid will pass from groove 357, through passageway 369 to the end of valve spool 365 in annular groove 362. When the hydraulic fluid pressure in groove 362 reaches a value of approximately 50 p.s.i., determined by the force of coiled spring 368, valve spool 365 will begin to be moved against the bias of spring 368, and land 366 will block annular groove 357. As the hydraulic fluid pressure in annular groove 362 drops below 50 p.s.i., the coiled spring 368 will move spool 365 so that land 366 will again unblock groove 357. Thus the spool 365 will reciprocate between blocking and unblocking groove 357 to provide a substantially constant hydraulic fluid pressure of approximately 50 p.s.i. in conduit 77 for lubrication purposes. Returning to the valve spool 358 of the pressure regulating valve, the next action, at a pressure of 125 p.s.i., will be an opening of annular groove 353 to annular grooves 346 and 354. The hydraulic fluid under pressure is then vented to the sump through conduit 78 and when the hydraulic fluid pressure drops below 125 p.s.i., the coiled spring 359 will again move valve spool 358 so that the lands 350 and 351 will block annular groove 353 from annular grooves 346 and 354. Thus the valve spool 358 will reciprocate as described to maintain a hydraulic fluid pressure of approximately 125 p.s.i. in groove 346, and conduits 70 and 71.

If the speed of the engine 12 is then increased above the lowest operating speed, about 500 r.p.m., the centrifugal force caused by the rotating governor weight 299 will begin to overcome the bias force of the coiled spring 301 in the governor 260, and the governor weight 299 will begin to be moved radially outwardly. As this is done, land 296 will unblock annular groove 306, and land 295 will block annular groove 304. Hydraulic fluid will then be delivered over the previously noted path from passageway 278 to chamber 224 connected to conduit 66. As the governor element 284 increases in speed from the idle speed to the governed speed of the engine 12, the governor valve will operate to deliver hydraulic fluid under increasing fluid pressures to conduit 66 wherein the pressure will increase at substantially a parabolic rate to the maximum hydraulic fluid pressure of approximately 125 p.s.i., which pressure has been previously noted as determined by the fluid pressure regulating valve comprising valve spool 358 and valve bore 321 of the assembly 25 in Figure 10. This parabolic increase in the fluid pressure delivered to conduit 66 for increasing engine speeds is determined by the governor weight 299, and the lands 295 and 296. The side of the land 296 facing the reduced portion 297 has an area less than the area of the side of the land 295 facing the depressed portion 297 so that as the fluid under pressure is delivered through annular groove 306, the fluid pressure within the valve bore 302 about the depressed portion 297 of the valve spool will counteract the centrifugal force created by the rotating governor weight 299 to tend to move land 296 to block annular groove 306. When the engine 12 is at its governed speed, the centrifugal force of the governor weight 299 is sufficient to maintain the land 296 in a position completely unblocking the annular groove 306 and the full fluid pressure of approximately 125 p.s.i. from passageway 287 is delivered through the previously described circuits to conduit 66. This parabolic increase of the fluid pressure in conduit 66 from the lowest operating speed of the engine to the governed speed thereof causes a corresponding parabolic force increase on the piston 225 in the chamber 224 of the main control valve 20.

As the throttle pedal 33 is depressed, the lever 325 acted upon by the link 326 will move the spring plunger 324 to compress the coiled spring 343 of the pilot pressure control valve. The pressure applied by the coiled spring 343 to the valve spool 337 will increase directly with increased throttle setting. As the spring pressure on the valve spool 337 increases, the 125 p.s.i. fluid pressure available in passageway 345 acting through the annular grooves 331 and 332 will counteract that spring pressure to cause an increase in the fluid pressure in conduit 67. The fluid under pressure in passageway 345 will pass from annular groove 331 through passageway 344 into annular groove 329 and will act upon the end of the valve spool 337 to counteract the pressure of the coiled spring 343 to close annular groove 331 with land 339. As the land 339 closes annular groove 331, and as the pressure in conduit 67 drops, due to leakages in the various cooperating elements, the coiled spring 343 will move the valve spool 337 to cause land 339 to again unblock annular groove 331. Hydraulic fluid under pressure may then again enter passageway 344 and annular groove 322 to again cause the movement of valve spool 337 against the bias of the coiled spring 343. This reciprocation of the valve spool 337 will take place constantly as the force of the coiled spring 343 is increased by an increased throttle setting. The increased fluid pressure in conduit 67 as the throttle setting is increased, will result in an increased fluid pressure in passageway 226 of the main control valve 20. The hydraulic fluid pressure increasing in the chamber 224 at a parabolic rate as the engine speeds up from lowest operating speed to the governed speed, and the hydraulic fluid pressure in passageway 226 increasing directly with the throttle settling, are applied respectively over the area of the piston 225 and the areas of the upper portion of the valve spool 215 to result in certain forces tending to seat the valve spool 215 against the valve seat 214. With the engine 12 operating, with the boom and bucket control valve 21 in the neutral position, and with the traction means operated to one of the driving positions, the developed engine torque is applied to planet carrier 90 and ring gear 96. The relative amounts of the developed engine torque which can be delivered to the planet carrier 90 and the ring gear 96 will be determined by the size of the various members of the planetary set of the power divider 14. When there is any load upon the main hydraulic pump 16, the proportion of the developed engine torque received by the main hydraulic pump 16 from the planet carrier 90 is transformed by the main hydraulic pump 16 into hydraulic fluid pressures in passageway 227 and all interconnecting passageways to and including the blocked passageways of the boom and bucket control valve 21 of a magnitude dependent upon the displacement of the main hydraulic pump 16 and the magnitude of any load thereon. These hydraulic fluid pressures create a force tending to lift valve spool 215 from the valve seat 214, and this force will have a magnitude dependent upon the hydraulic fluid pressure and the diameter of the opening in the valve seat 214. This lifting force on the valve spool 215 is opposed by the seating forces on the valve spool 215 created in the chambers 224 and 216, and thus it may be seen that the main hydraulic pump 16 will operate to discharge hydraulic fluid through passageway 240 in amounts regulated by the difference between the lifting and seating forces on the valve spool 215. If the seating forces are substantially zero, as is the case when the throttle pedal 33 is not depressed, and the engine 12 is at the lowest operating speed, the diameter of the opening in the valve seat 214 is large enough to permit a free flow of hydraulic fluid through passageway 240 so that any developed engine torque will be used to merely bypass hydraulic fluid to reservoir 22. If the seating forces are some amount above zero, as is the case with the throttle pedal 33 depressed some amount, and with the engine 12 at some speed above the lowest operating speed, these seating forces on the valve spool 215 will cause the main hydraulic pump 16 to create hydraulic fluid pressures in the noted passageways resulting in a load upon the main hydraulic pump 16 and with a resulting torque reaction of the main hydraulic pump 16 on the planet carrier 90. Recognizing that for any one throttle setting, the engine torque-engine speed curve is one where from the lowest operating speed of the engine the torque value rises substantially to a maximum at a point intermediate that speed of the engine and the governed speed, and then descends to a certain torque value at the governed speed, it has been found that the reaction torque developed at the planet carrier 90 is a combination of two superimposed reaction torques, resulting from the previously noted seatings forces on valve spool 215, one produced by the throttle pilot valve of the assembly 25 and the other produced by the governor valve portion of the assembly 23. The reaction torque on the planet carrier 90 due to the throttle pilot valve varies directly with the throttle setting so that for one throttle setting this reaction torque plotted on the engine torque-engine speed graph for that one throttle setting is a straight line from the lowest operating engine speed to the governed engine speed and at a torque value lower than the torque curve of the engine. The reaction torque produced on the planet carrier 90 by the governor valve portion of the assembly 23 is a portion of a parabolic curve beginning at the lowest operating engine speed and the torque value of the throttle pilot valve and rising therefrom along the parabolic curve to a point substantially above the engine torque value at governed speed. The various valves of the assemblies 20, 25 and 23 are so constructed that the parabolic curve for the governor valve intersects the torque-speed curve of the engine at its maximum torque for any one throttle setting. Thus, at the speed for maximum engine torque value for any one throttle setting, the torque reaction at the planet carrier 90 will be equal to the torque developed by the engine 12 on the same. For engine speed values greater than the speed for maximum engine torque at any one throttle setting, the reaction torque developed by the pilot pressure regulating valve and the governor valve on the planet carrier 90 will exceed the torque developed by the engine 12 on the planet carrier 90, and the planet carrier 90 will be substantially stationary at those values. The term substantially is used because firstly, there is some small internal slippage in the pump 16 allowing some creep of the pump 16, and secondly, the small orifice 219 and the passageway 218 provide for a very slight leakage to passageway 240 to prevent heating. This will permit substantially all of the developed engine power to be supplied to the ring gear 96 of the power divider 14. Further, at engine speed values below speed for maximum engine torque for any one throttle setting, the torque reaction provided by the pilot valve and the governor valve on the planet carrier 90 will be less than the torque developed by the engine on the same for that one throttle setting so that the planet carrier 90 will be rotated to operate the main hydraulic pump 16 to in turn raise the valve spool 215 from the valve seat 214 and permit hydraulic fluid to flow through passageway 240 to the reservoir 22. A number of the important functions of this described arrangement are, that for any one throttle settling and engine speeds above the engine speed for maximum torque, the valve spool 215 will not open, thus providing that substantially the maximum available engine power can be utilized for the propulsion of the tractor, and that when the tractor is driven against an obstruction or obstacle, the engine, regardless of throttle setting will not stall when the traction elements or wheels come to a complete stop. Whenever the engine speed reaches a value substantially equal to or above the speed for maximum engine torque developed at any one throttle setting and engine speeds above the engine speed for plied into cavity 224 and passageway 226 to prevent the opening of valve spool 215. Whenever the speed of the vehicle is reduced by an excessive load on the wheels of the tractor, the speed of the ring gear 96 will be reduced to in turn cause a reduction in the speed of the sun gear 92 to in turn reduce the speed of the engine 12. When the speed of the engine 12 has been reduced to a speed below that for maximum engine torque at that throttle setting, the reduced engine speed operating through the governor valve portion assembly 23 will reduce the fluid pressure in chamber 224 permitting the valve spool 215 to open whereupon hydraulic fluid may flow through conduit 57 and passageway 240 to the reservoir 22, so that the engine power is then used to rotate the main hydraulic pump 16 and thereby prevent a stalling of the engine. Note should be made that under this condition maximum tractive effort remains at the wheels or traction elements of the tractor.

With the control circuits and arrangements operating as described, with the 125 p.s.i. hydraulic fluid delivered through conduit 71 to the transmission control valve 24, and with the substantially higher hydraulic fluid pressures delivered by the main hydraulic pump 16 to the boom and bucket control valve 21, the operation of the present invention in various material handling operations will be described next. First assuming that the bucket and boom control valve 21 is in the neutral position shown in Figure 11, and that the transmission control valve 24 is in the parking and creep positions as shown in Figure 12. Since the boom and bucket control valve 21 is in the neutral position, the valve spools 371 and 372 will block the flow of any hydraulic fluid from conduit 58 through the control valve 21 to conduit 63. Pressure relief valve 373 will only operate to bypass hydraulic fluid from conduit 58 to conduit 63 when excessively high fluid pressures are encountered in conduit 58. The pressure relief valve 373 is provided for protection of the various parts should a failure of some part cause excessively high fluid pressures to be developed. With the lever 32 so adjusted that the valve spools 35 and 39 of the transmission control valve 24 are in the parking and creep positions respectively as shown in Figure 12, hydraulic fluid is delivered to the valve 24 through conduit 71. From conduit 71 the hydraulic fluid will flow through passageways 480 and 481. The fluid through passageways 481 will flow into annular bore 443 about the depressed portion 456 of the valve spool 35, and from therefrom will flow into conduit 72, and the passageway 472. The fluid in conduit 72 will enter the transmission 15 to operate brake 127 for the reverse direction planetary set. From passageway 472 the hydraulic fluid will flow into conduit 73 and passageway 473. The hydraulic fluid in conduit 73 will operate brake 128 for the forward direction planetary set in the transmission 15. The hydraulic fluid flowing through passageway 473 will traverse annular groove 443 about the depressed section 457 of the valve spool 35, and flow through passageway 483 and conduit 68. From conduit 68 the fluid will flow into valve bore 213 of the main control valve 20 causing the valve spool 249 to be moved to block passageway 238 and unblock passageway 253 from conduit 58. The function of this parking valve comprising valve spool 249 and valve bore 213 will be described below with the operation of the boom and bucket control valve 21. The hydraulic fluid flowing through passageway 480 will traverse the valve bore 444 about the depressed section 468 of the valve spool 39 and then flow through passageway 477, 476 to conduit 75. From conduit 75, the fluid will flow into the transmission 15 to operate or energize the brake 165 for the creeper planetary set. At this time the conduits 74 and 76, from the travel speed brake and intermediate speed clutch are vented to the sump in the transmission. Conduit 74 is vented through passageway 474, 475, and through the valve bore 444 about depressed section 471 of the valve spool 39 to port 439. Conduit 76 is vented through passageway 478, through valve bore 444 about depressed section 470 of the valve spool 39 to port 441. In this operated position of the transmission control valve 24, the wheels 26 are locked against any movement since two members of the planetary set for the creeper speed, the ring gear 162 and the sun gear 160 are held stationary. Further, the ring gear 96 of the power divider 14 is held stationary so that all of the developed engine power is delivered to the hydraulic pump 16. The engine 12 will slow from the governed speed to the speed at which the engine torque applied through the main hydraulic pump 16 can operate the valve spool 215 in the main control valve 20. One important function of the parking position is to provide the necessary torque reaction of the main hydraulic pump 16 so that full engine power can be transmitted to the main hydraulic system when the loader is digging under slippery or icy conditions.

Figure 13:
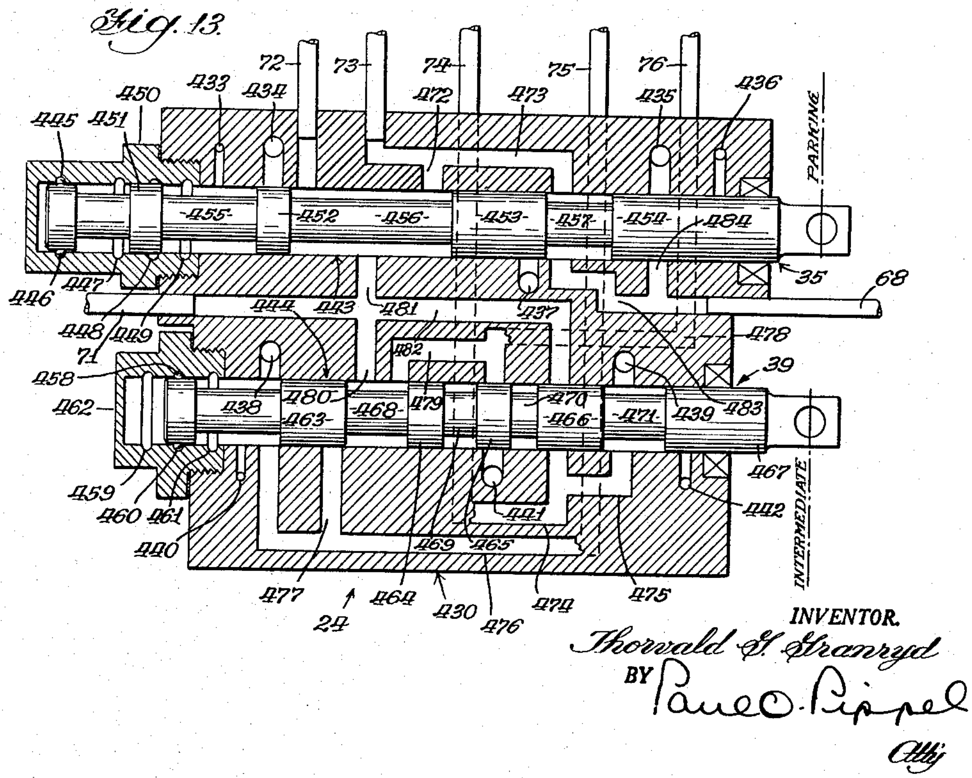

If the transmission control valve 24 is next operated to the position shown in Figure 13, the parking and intermediate positions, the hydraulic fluid flow from conduit 71 through the conduits 72, 73 and 68 will be the same as previously described for Figure 12. However, now the hydraulic fluid flowing into passageway 480 will flow through the annular bore 444 about the depressed section 468 of the valve spool 39 into passageway 479. From passageway 479, the fluid will flow through passageway 478 and conduit 76 to the clutch 179 for the intermediate speed. Brakes 152 and 165 for the travel and creeper speeds respectively are vented to the sump to the transfer drive case 17. The brake 152 is vented through conduit 74, passageway 474, passageway 475, valve bore 444 to port 439. Brake 165 is vented over the following path: conduit 75, passageway 476, valve bore 444 to port 438. Again the tractor may not be moved since the valve spool 35 is in the parking position and the clutch 179 is energized.

Figure 14:
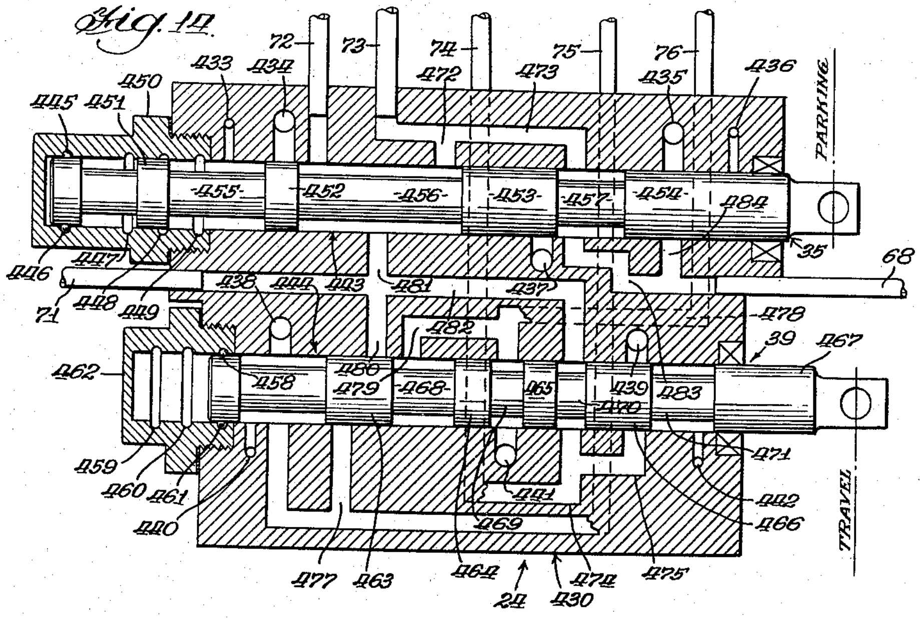

Referring next to the operated position of the transmission control valve 24 shown in Figure 14 wherein the valve spools 35 and 39 are respectively in the parking and travel positions. With the valve spool 35 in the parking position, the hydraulic fluid from conduit 71 flows through conduits 72, 73 and 68 as previously noted relative to Figure 12. In this position the hydraulic fluid under pressure in conduit 71 is delivered to conduit 74, and brake 165 and clutch 179 are vented to the sump in the transfer drive case 17. The hydraulic fluid under pressure is delivered to conduit 74 to operate brake 152 for the travel speed over the following path: conduit 71, passageway 482, valve bore 444, about the depressed portion 470 of the valve spool 39, passageway 474 to conduit 74. Brake 165 is vented over the following path: conduit 75, passageway 476, valve bore 444 to port 438. Clutch 179 is vented over the following path: conduit 76, passageway 478, valve bore 444 about the depressed section 469 to port 441. Again, the wheels 26 and the ring gear 96 of the power divider are locked against rotation since the valve spool 35 is in the parking position and the brake 152 for the travel speed is energized.

Figure 15:
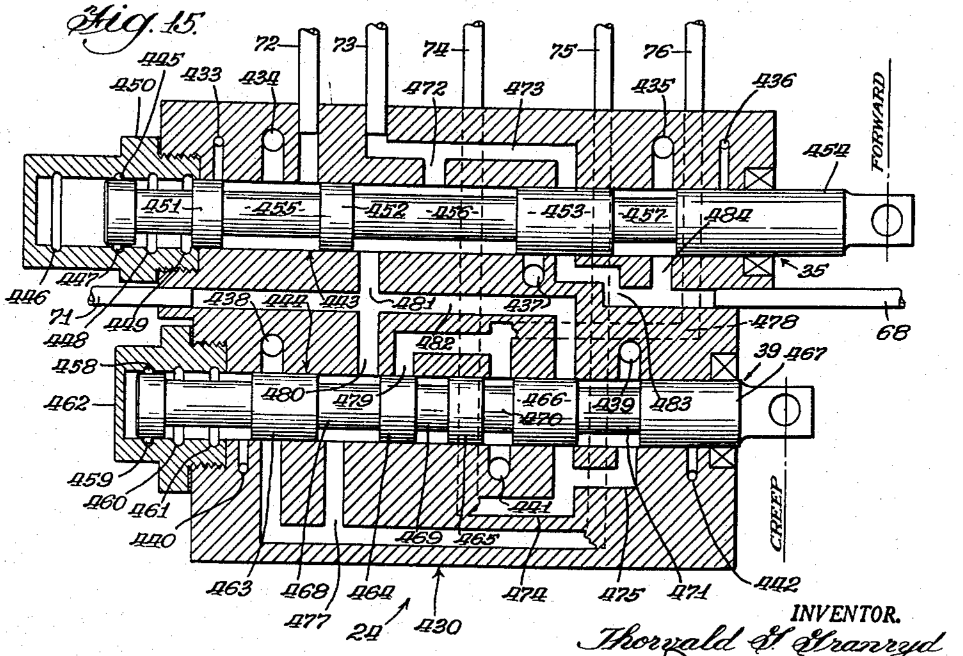

Referring next to Figure 15 wherein the transmission control valve 24 is shown operated to the forward and creep positions, hydraulic fluid under pressure is delivered to conduits 73 and 75 while conduits 72, 74, 76 and 68 are vented to the sump in the transfer drive case 17. Conduit 73 receives the hydraulic fluid under pressure over the following path: conduit 71, passageway 481, valve bore 443 about the depressed portion 456 of the valve spool 35, passageway 472 to conduit 73. Conduit 75 receives hydraulic fluid under pressure over the following path: conduit 71, passageway 480, valve bore 444 about the depressed portion 468 of the valve spool 39, passageway 477, passageway 476 to conduit 75. Conduit 72 is vented through the valve bore 443 about the depressed portion 455 to port 434. Conduit 74 is vented over the following path: passageway 474, passageway 475, valve bore 444 about the depressed portion 471 of the valve spool 39 to port 439. Conduit 76 is vented over the following path: passageway 478, valve bore 444, about the depressed section 469 of the valve spool 39 to port 441. Conduit 68 is vented over the following path: passageway 484, annular valve bore 443 about the depressed portion 457 of the valve spool 35 to port 435. The hydraulic fluid delivered under pressure to conduit 73 causes an energization of brake 128 for the planetary set for the forward direction, and the hydraulic fluid under pressure delivered to conduit 75 will cause an energization of brake 165 for the creeper speed. The venting of conduits 72, 74, 76 and 68 will insure the deenergization of brake 127, brake 152, clutch 179, and the return of the parking valve spool 249 in the main control valve 20 to the position shown in Figure 8.

Figure 16:
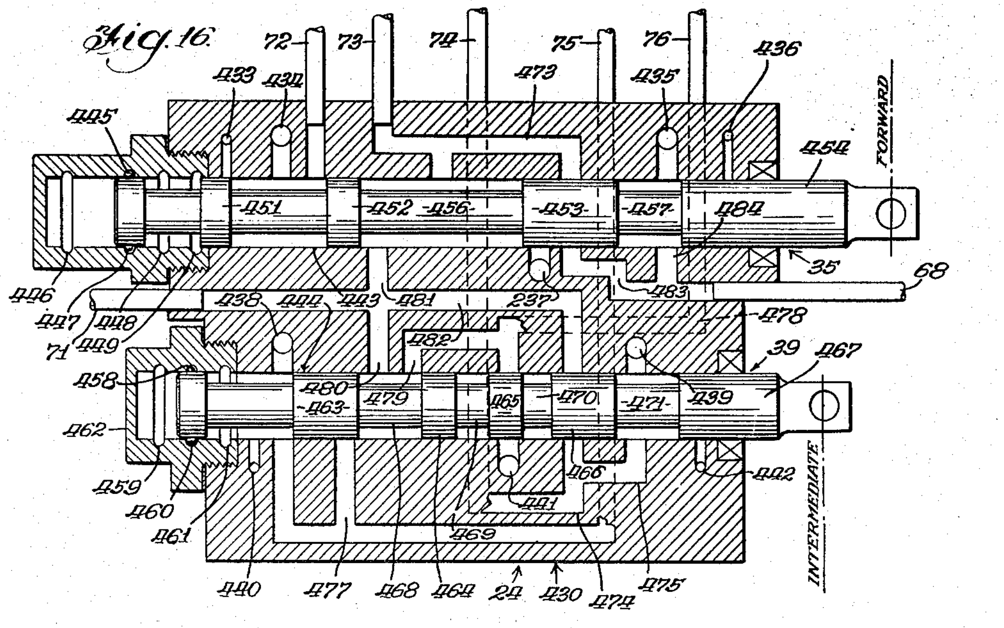

Figure 16 shows the transmission control valve 24 operated to the forward and intermediate positions. Hydraulic fluid under pressure is delivered to conduit 73 and conduits 72 and 68 are vented, as previously described relative to Figure 15. Hydraulic fluid under pressure is delivered to conduit 76, and conduits 74 and 75 are vented as previously described relative to Figure 13. Thus brake 128 and clutch 179 are in the on or energized position and brakes 127, 152 and 165 are in the off or deenergized position causing the tractor to travel in the forward direction at the intermediate speed.

Figure 17:
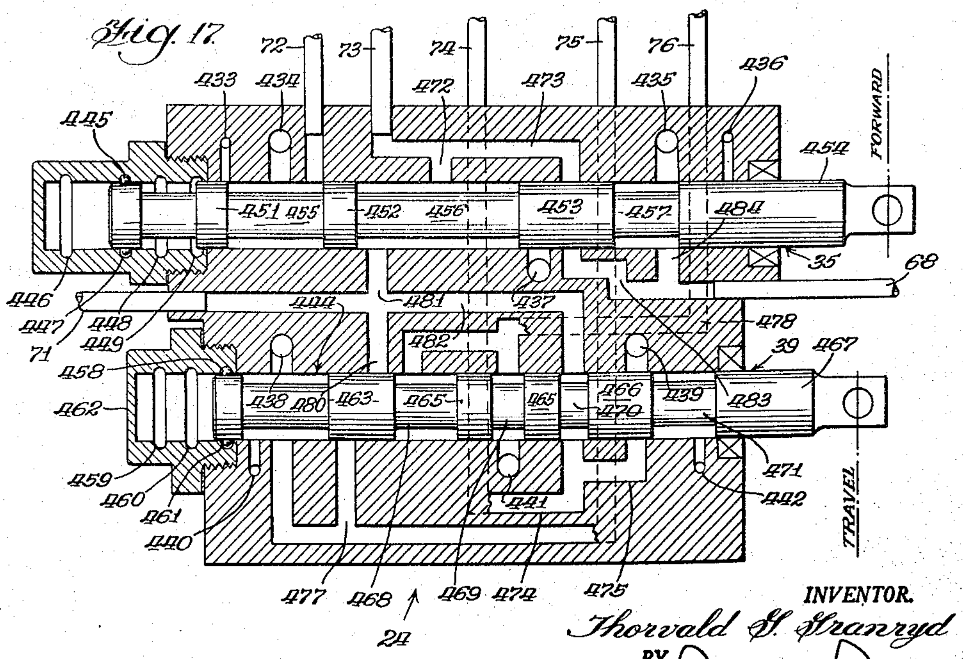

Referring to Figure 17, the transmission control valve 24 is shown therein with the valve spools 35 and 39 operated respectively to the forward and travel positions. In the forward position of the valve spool 35, hydraulic fluid is delivered under pressure to conduit 73 while conduits 72, 68 are vented, as previously noted relative to Figure 15. With the valve spool 39 operated to the travel position, hydraulic fluid under pressure is delivered to conduit 74, and conduits 75 and 76 are vented to the sump in the transfer drive case 17 as previously noted relative to Figure 14. The hydraulic fluid under pressure delivered to conduits 73 and 74 will cause energizations respectively of brakes 128 and 152, while the vented conduits will insure that brakes 127 and 165 and clutch 179 are in the off or de-energized positions. The tractor will then move forwardly at the travel speed.

Figure 18:
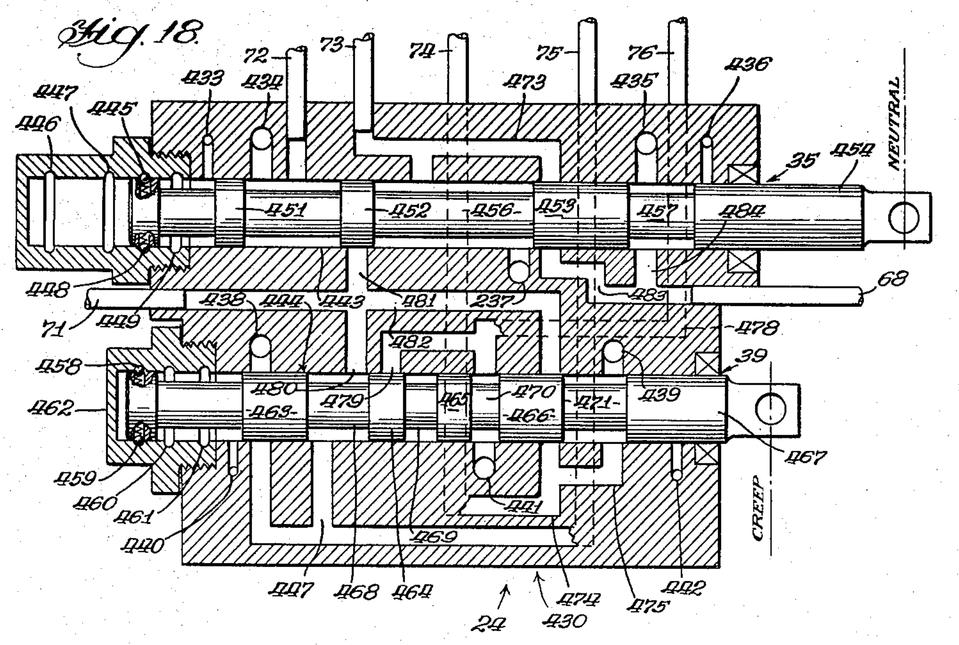

Figure 18 shows the valve spools 35 and 39 operated respectively to the neutral and creep positions. With the valve spool 35 in the neutral position none of the hydraulic fluid under pressure in conduit 71 and passageway 481 may enter the valve bore 443, since in that position, the land 452 of the valve spool 35 blocks passageway 481. In this position conduits 72, 73 and 68 are connected to the sump in the transfer drive case 17. Conduit 72 is vented to port 434 over the obvious path to valve bore 443 and about the depressed section 455 of valve spool 35. Conduit 73 is vented over the following path: passageway 472, valve bore 443, about the depressed section 456 of valve spool 35 to port 437. Conduit 68 is vented through passageway 484, valve bore 443, about the depressed section 457 of valve spool 35 to port 435. With the valve spool 39 in the creep position, hydraulic fluid under pressure is delivered to conduit 75 and conduits 74 and 76 are vented to the sump in the transfer drive case 17 as previously noted relative to Figure 12. Since no hydraulic fluid under pressure is delivered to conduits 72 and 73, the brakes 127 and 128 will be in their off positions, and none of the engine torque will be transmitted to the wheels 26. Further, none of the engine power may be delivered to the main hydraulic pump 16 since the ring gear 96 of the power divider 14 is free to rotate and no torque reaction is supplied by the ring gear 96 so that some of the power developed by the engine 12 may be transmitted to the main hydraulic pump 16.

Figure 19:
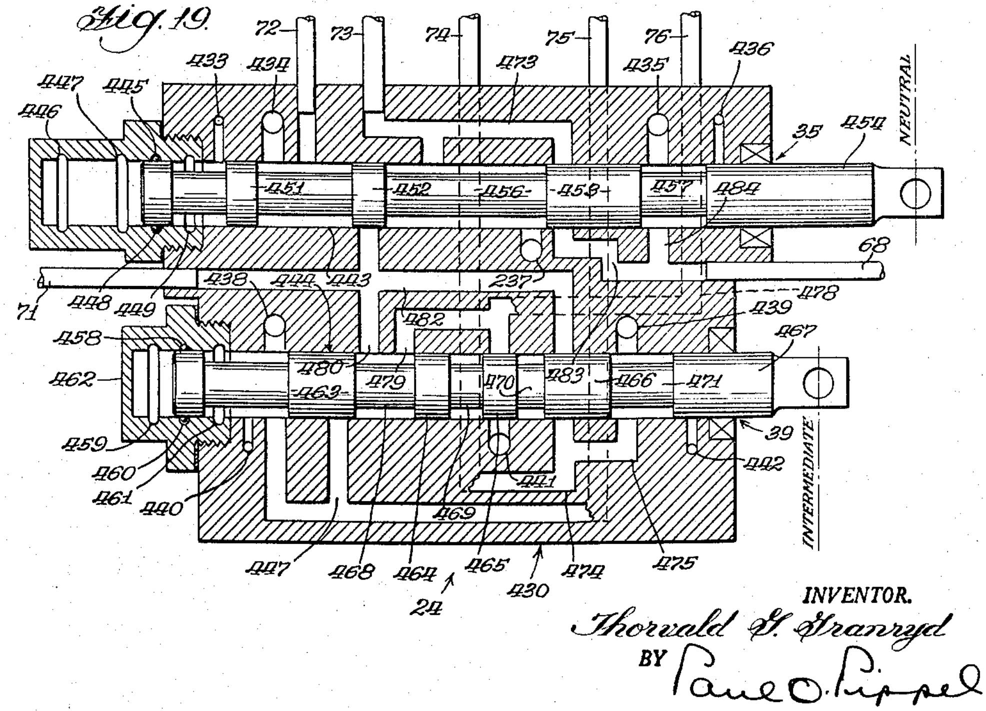

Figure 19 shows another one of the possible operated positions of the transmission control valve 24 and the lever 32 operatively connected thereto. In this view the valve spool 35 is in the neutral position described relative to Figure 18 and the valve spool 39 is in the intermediate speed position as described relative to Figure 13. Similarly to the view in Figure 18, with the transmission control valve 24 operated to the position shown in Figure 19, none of the engine power wil be supplied to drive the wheels 26 or the main hydraulic pump 16.

Figure 20:
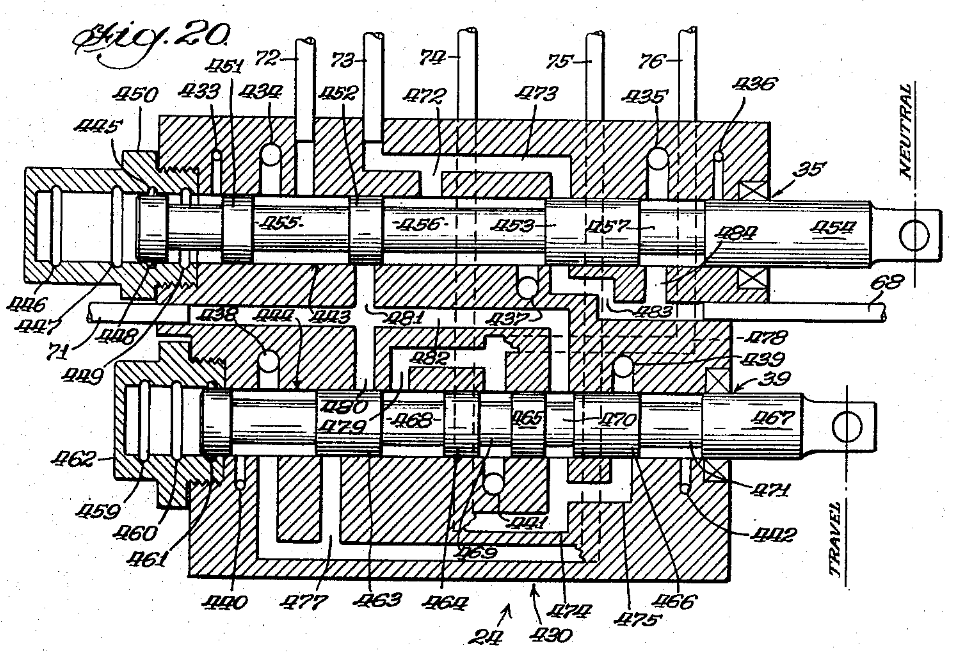

Figure 20 shows still a further possible operated position of the transmission control valve 24. The view shown in Figure 20 is similar to the views of Figures 18 and 19 in that the valve spool 35 is operated to the neutral position, however, this view differs from the others in that the valve spool 39 is shown operated to the travel speed position. With valve spool 39 in the travel position, conduit 74 is supplied with hydraulic fluid under pressure, and conduit 75 and 76 are vented as previously noted relative to Figure 14. However, with the valve spool 35 in the neutral position as in Figures 18 and 19, none of the engine power is directed to drive the wheels 26 or the main hydraulic pump 16.

Figure 21:
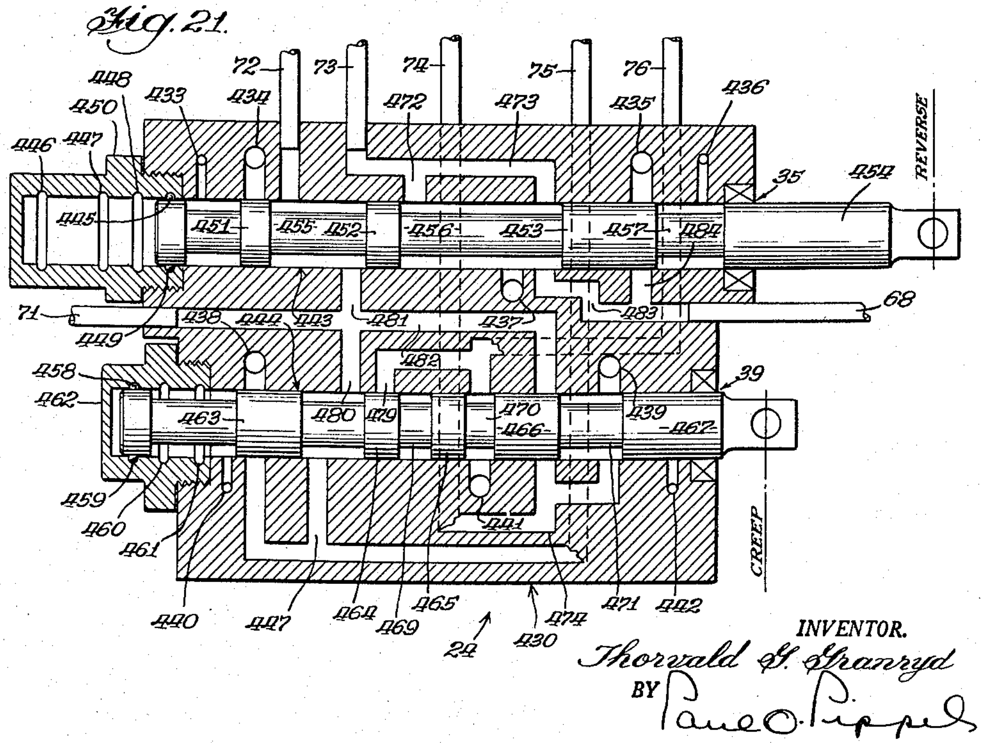

Turning next to Figure 21, the transmission control valve 24 is shown therein with the valve spool 35 operated to the reverse direction position, and with the valve spool 39 operated to the creeper speed position. With the valve spool 35 in the reverse direction position, hydraulic fluid under pressure is delivered to conduit 72 over the following path: Conduit 71, passageway 481, valve bore 443, about the depressed section 455 of the valve spool 35 to conduit 72. Conduit 73 is vented to the sump in the transfer drive case 17 over the following path: passageway 472 and 473 to valve bore 443, about the depressed section 456 of the valve spool 35 to port 437. Conduit 68 is also vented to port 437 through passageway 483. With the valve spool 39 in the creeper speed position, hydraulic fluid under pressure is delivered to conduit 75, and conduits 74 and 76 are vented to the transfer drive case 17 as previously described relative to Figure 12. The hydraulic fluid under pressure delivered to conduits 72 and 75 will cause energizations of brakes 127 and 165, while brakes 128 and 152 and clutch 179 will be vented to insure the restoration of these brakes and clutch to the off or deenergized positions. This will cause the operation of the tractor in the reverse direction at the creeper speed.

Figure 22 shows still another possible operated position of the transmission control valve 24. In this view, valve spool 35 is operated to the reverse direction position, and valve spool 39 is operated to the intermediate speed position. With valve spool 35 in the reverse direction position, brake 127 will be operated to the on position, and brake 128 will be operated to the off position as noted relative to Figure 21. With valve spool 39 in the intermediate speed position, clutch 179 will be operated to the on position, and brakes 152 and 165 will be deenergized as previously noted relative to Figure 13. Thus it may be seen that the tractor will move in the reverse direction at the intermediate speed.

The last view, that shown in Figure 23, is a view of the one remaining possible operated position for the transmission control valve 24, that of the valve spool 35 operated to the reverse direction position, and the valve spool 39 operated to the travel speed position. The reverse direction position of valve spool 35 will cause an energization of brake 127 and a deenergization of brake 128 as previously described relative to Figure 21. The position of the valve spool 39 in the travel speed position will cause an energization of brake 152 and a deenergization of brake 165 and clutch 179 as previously described relative to Figure 14. This operated position of the transmission control valve 24 will cause the tractor to be moved in the reverse direction at the travel speed.

Some summarization of the operation on the present invention relative to the operation of the transmission control valve 24 may now be made. Firstly, it may be seen that the transmission control valve 24 may be operated from any one of the twelve possible operated positions to any other one of those positions; secondly, no neutral position is provided for the valve spool 39, so that when valve spool 35 is in the parking position, the wheels 26 of the tractor are locked against any movement no matter what position the valve spool 39 is in; thirdly, when any one or more of the conduits leading from the transmission control valve 24 are supplied with hydraulic fluid under pressure, all of the other conduits are vented to the sump in the transfer drive case 17; fourthly, in any operated position of the transmission control valve 24 other than the neutral position of the valve spool 35, some torque reaction dependent upon the resistance encountered by the wheels 26, and excepting the parked position of the valve spool 35, is applied to the ring gear 96 of the power divider 14 whereby a corresponding amount of the developed engine torque may be delivered to the main hydraulic pump 16; and lastly, with the valve spool 35 of the transmission control valve 24 operated to the neutral position none of the engine power may be delivered to the main hydraulic valve 16 or the wheels 26.

Reference is next made to Figure 11 for a detailed description of the operation of the boom and bucket control valve 21. It will be herein assumed that high pressure hydraulic fluid is available from conduit 58. All of the conditions under which the high pressure hydraulic fluid is supplied to conduit 58 are discussed below. Of the boom and bucket control valve 21, the valve spool 371, for operation of the boom control rams 45, may be operated as previously noted to three positions, the first of these corresponding to the position of the valve spool 37 shown in Figure 11, with the detent balls 380 in the center set of the detent slots 379, the second, for extending the boom control rams 45, being the position wherein the valve spool 371 is moved outwardly from the valve body 370 so that the detent balls 380 are in the right set of detent slots 379, and the third position, for contracting the boom control rams 45, being the position wherein the valve spool 371 is moved inwardly of the valve body 370 so that the detent balls 380 are in the left set of detent slots 379. Further, with the coiled spring 399 maintaining the valve spool 372 for the bucket control rams 47 in the neutral position, as shown in Figure 11, the lever 31 in the operator's compartment as shown in Figure 3, may be operated to move the valve spool 372 to the right as shown in Figure 11 wherein the bucket control rams 47 will be extended, or to the left as shown in Figure 11 for a retraction of the bucket control rams 47. The valve spool 372 will automatically return to the neutral position, shown in Figure 11, when the lever 31 is released by the operator of the tractor loader of the present invention.

When the valve spool 371 is moved to the right position as shown in Figure 11, passageway 390 is placed in direct fluid communication with annular groove 381, passageway 391 is placed in direct fluid communication with annular groove 382, passageway 392 is placed in direct fluid communication with annular groove 385, and passageway 393 is placed in direct fluid communication with the cavtiy 396. High pressure hydraulic fluid will then flow from conduit 58 into cavity 404, into annular grooves 401 and 402, about depressed sections 405 and 406 of the valve spool 372, into annular groove 386, annular groove 382, through passageway 391, passageway 394, passageway 390, annular groove 381 to and through conduit 59 to the head end of the hydraulic rams 45. From the rod ends of the hydraulic rams 45, the low pressure or return hydraulic fluid will flow through conduit 60 into annular groove 385, into and through passageway 392, passageway 395, passageway 393, into and through cavity 396 to and through conduit 63 to the hydraulic fluid reservoir 22. Thus it may be seen that when the valve spool 371 is moved to the right position as shown in Figure 11, the hydraulic rams 45 are extended. If the valve spool 371 is moved from the neutral position shown in Figure 11 to the left position, the following direct fluid connections are established: Passageway 390 with cavity 396, passageway 391 with annular groove 381, passageway 392 with annular groove 384, and passageway 393 with annular groove 385. High pressure hydraulic fluid is then delivered over the following path from conduit 58: cavity 404, annular grooves 401 and 402, about the depressed portions 405 and 406 to annular groove 386, annular groove 384, passageway 392, passageway 395, passageway 393, annular groove 385, conduit 60, to the rod end of the hydraulic rams 45. Low pressure hydraulic fluid is returned over the following path from the head ends of the hydraulic rams 45: conduit 59, annular groove 381, passageway 391, passageway 394, passageway 390, cavity 396, to conduit 63. Thus it may be seen that when the valve spool 371 is moved to the left from the neutral position as shown in Figure 11, the hydraulic rams 45 are retracted.

When valve spool 372 is moved to the right from the neutral position shown in Figure 11, the following direct fluid connections are established: Passageway 408 with annular groove 400, passageway 409 with annular groove 401, passageway 410 with annular groove 403 and passageway 411 with cavity 396. High pressure hydraulic fluid is then delivered from conduit 58 to the head ends of the hydraulic rams 47 over the following path for controlling the movement of the bucket 46: cavity 404, annular groove 401, passageway 409, passageway 412, passageway 408, annular groove 400, through conduit 62. Low pressure hydraulic fluid is returned from the rod ends of the hydraulic rams to the return conduit 63 to the reservoir 22 over the following path: conduit 61, annular groove 403, passageway 410, passageway 413, passageway 411, cavity 396 to conduit 63. Thus it may be seen that when the valve spool 372 is moved to the right as shown in Figure 11, the hydraulic rams 47 are extended. If the valve spool 372 is moved to the left of the neutral position as shown in Figure 11, the following direct fluid connections are established: passageway 408 with cavity 396, passageway 409 with annular groove 400, passageway 410 with annular groove 402, and passageway 411 with annular groove 403. High pressure hydraulic fluid is then delivered from conduit 58 over the following path to the rod end of the hydraulic rams 47: cavity 404, annular groove 402, passageway 410, passageway 413, passageway 411, annular groove 403, and conduit 61. The low pressure hydraulic fluid is returned from the head end of the hydraulic rams 47 over the following path: Conduit 62, annular groove 400, passageway 409, passageway 412, passageway 408, cavity 396, to conduit 63. Thus it may be seen that when the valve spool 372 is moved to the left as shown in Figure 11, the hydraulic rams 47 are contracted.

As has been noted previously, lands 389 and 407 and the adjacent portions of the valve spools 371 and 372 and the cooperating portions of the valve bores 375 and 376 aid in balancing valve spools 371 and 372 for efficient longitudinal movement in their valve bores. The valve spools 371 and 372 have been described as operated separately, and this, as is conventional in the art, is the manner in which they are operated by the operator of the loader, for no high pressure hydraulic fluid may be delivered to the boom control spool 371 when the bucket control valve spool 372 is operated. When the valve spool 372 is moved to the right as shown in Figure 11, land 407 blocks annular groove 402, and a portion of the valve spool 372 blocks annular groove 401, from fluid communication with annular grooves 382 and 384 of valve bore 375. When the valve spool 372 is moved to the left as shown in Figure 11, land 407 blocks annular groove 401, and a portion of the valve spool 372 blocks annular groove 402, from fluid communication with annular grooves 382 and 384 of valve bore 375. Thus, in operation of the boom and bucket control valve 21, the bucket control spool 372 takes perference over the boom control spool 371.

In summarization of the operation of the boom and bucket control valve 21, it may be noted that movement of the lever 30 by the operator of the loader causes the boom means 44 to be raised, lowered or held in any one position, that operation of the lever 31 by the operator of the loader causes the bucket 46 to be pivoted forwardly or rearwardly relative to the boom means 44. These permissible movements provide for all of the normal and necessary movements of the bucket 46 in performing such material handling functions as digging, carrying, or dumping at any level within the span of the boom 44. Further note may be made that the boom and bucket control valve 21 is of the closed center type so that in the neutral poistions of the spools 371 and 372, no high pressure hydraulic fluid is vented from the valve 21 to the reservoir 22.

Considering next the various conditions under which the developed engine power is divided between the traction elements and the hydraulically operated tool means. With the tractor 10 in one driving position, and with the engine operating at the lowest operating speed and with the throttle closed, no drag is experienced at the wheels 26 since all of the engine torque then developed will be used in rotating the main hydraulic pump 16 to circulate the hydraulic fluid from the reservoir 22, through the pump 16 and back through the reservoir through the control valve 20 as the circulating hydraulic fluid raises valve spool 215 against no seating forces. As previously noted, at speeds of the engine below the lowest operating speed or approximately 500 r.p.m., no hydraulic fluid pressure is developed in conduits 66 and 67.

As the throttle pedal 33 is depressed and as the engine speed increases, the pilot valve portion of the assembly 25, which is throttle responsive, develops a hydraulic fluid pressure in conduit 67, and the governor control valve of the assembly 23, which is speed responsive, develops a hydraulic fluid pressure in conduit 66, to provide a seating force for the valve spool 215. The seating force of the valve spool 215 in the main control valve 20 provides resistance for the main hydraulic pump 16 resulting in a load upon the main hydraulic pump 16 which will transfer a proportional torque reaction to the planet carrier 90 in the power divider 14. As the pressure in passageway 227 is raised, the valve spool 230 is raised to the position shown in Figure 8. With the engine speed below the speed for maximum engine torque and above the lowest operating speed of approximately 500 r.p.m., the developed engine torque is greater than the torque reaction provided in the main hydraulic pump 16 through the seating force on the valve spool 215 applied through conduits 66 and 67 from the governor valve portion of the assembly 23 and the pilot valve portion of the assembly 25, for any one throttle setting. As the engine speed approaches the speed for maximum torque for that one throttle setting, the reaction torque exerted by the main hydraulic pump 16 on the planet carrier 90 will be greater than the engine torque, developed on the planet carrier 90 and the main hydraulic pump will be substantially stopped making substantially all of the developed engine power available for driving the tractor. The tractor transmission control valve 24 may then be operated through all of the previously described possible operations thereof to cause a corresponding movement of the tractor utilizing substantially the full developed engine power.

The above explanation has assumed that the valve spools 371 and 372 of the boom and bucket control valve 21 are in the neutral position so that no high pressure hydraulic fluid is flowing through conduit 58. Assuming next that the traction members of the tractor, utilizing full engine power, encounter some obstruction such as a material pile. This will result in a slowing down of the tractor and the traction members will in turn slow down or brake the engine 12. As the engine 12 slows down, and assuming the same throttle setting, the hydraulic pressure developed in chamber 224 by the governor valve portion of the assembly 23 will be decreased, and as previously noted, when the speed of the engine is reduced to approximately the point wherein the engine develops maximum torque for that one throttle setting, the engine torque transmitted to the main hydraulic pump 16 through the torque reaction of the traction members through the ring gear 96 in the power divider 14, will result in a higher pressure against the end of the valve spool 215 than is at that engine speed exerted by the pressures in conduits 66 and 67, and the valve spool 215 will be raised from the valve seat 214 to permit hydraulic fluid to flow through the valve seat 214 into the passageway 240 and from there into the reservoir 22. Thus, the main hydraulic pump 16 will begin to rotate, and the engine 12 will not be stalled by the traction members encountering the obstruction. It should be noted that the engine 12 will be developing maximum engine torque and although this torque will be spent in overcoming the pressures upon the valve spool 215, the tractive effort at the wheels 26 will be at the maximum for that one throttle setting. Thus, it may be noted that the tractor 10 is exerting the maximum effort, for that one throttle setting, against the obstruction, which effort is ideally suited to the operation of tractor loader. Therefore, at this condition substantially all the developed engine power is converted into heat at the valve spool 215. Should the obstruction give way in any manner such as the breaking of a pile of material, the engine 12 will again begin to speed up to the maximum governed speed, the force exerted upon piston 225 in chamber 224 will again be increased by the speed responsive governor valve in the assembly 23 so that the main hydraulic pump 16 will again be held stationary, and the engine torque developed at the governed speed for that one throttle setting, will again be used by the traction members in propelling the tractor 10. These operations will be performed at all throttle settings between the idle throttle setting of about 500 r.p.m. and the full throttle governed speed of the engine 12, due to the operations of the pilot control valve portion of the assembly 25 which is as has been previously noted, throttle responsive.

Assuming next that the hydraulic system for the boom and bucket is used while the tractor 10 is being propelled, and assuming that a substantial load is worked with the hydraulic system, for example, the raising of a loaded bucket. With the operation of the boom and bucket control valve 21, the hydraulic fluid will flow from passageway 227 through passageway 238 about the depressed section 257 of the valve spool 249 and into and through conduit 58 to the boom and bucket control valve 21. Since the hydraulic system is operating under a load, in raising the loaded bucket, a torque reaction from the main hydraulic pump will be applied to the planet carrier 90 of the power divider 14. The developed engine power will then be divided between the hydraulic system for operating the boom and bucket, and the traction members according to the equations shown in graph form in Figure 24. This operation also, is ideally suited to tractor loaders. Maximum effort and cooperation of both the hydraulic system for the tool means and the traction means may be utilized in working any material. The tractor can be crowded into a load or material being worked, and the hydraulic system simultaneously operated to fully utilize the material working abilities of the tool means. Uniquely with tractor loaders, in the working of any material, the traction means and the tool means are operated simultaneously. In the present invention, when the traction members and the tool means are simultaneously working the material, the meeting of any resistance or obstruction by either the tool means or the traction means automatically provides that the other can receive an effort corresponding to the maximum torque developed by the engine. Thus, in digging a hard material, if the wheels are slowed down or stopped, the full engine power may be used to operate the bucket to dig into the material, and the harder the material, the greater the tractive effort that will be applied. It should further be noticed that the slower the wheel speed the higher is the pump speed, and therefore, the faster the hydraulic action.

Assuming next that the tractor 10 is being propelled and that the hydraulic system for the tool means is operated against a negligible resistance such, for example, in raising an empty bucket. The rapid filling of the hydraulic rams because of the negligible resistance lowers the hydraulic pressure in conduit 58 and passageway 238. The compensator valve comprising valve spool 230 and valve bore 212 will then operate and valve spool 230 will drop to its lower position creating the orifice between the tip portion 235 of spool 230 and the passageway 238. The tip portion 235 is tapered to gradually build up the orifice. The orifice about tip portion 235 and passageway 238 prevents the hydraulic fluid pressure in passageway 227 from dropping any appreciable amount and thus, creates a reaction torque for the main hydraulic pump 16 of an amount to provide for a normal and efficient torque transmission to the traction means to enable the tractor 10 to continue to be propelled. It may be expected that with the noted orifice there will be some slight slowing down of the tractor 10 until the hydraulic rams are filled at which time the hydraulic fluid pressure in conduit 58, and passageway 238 will again rise. When the hydraulic pressure in 238 again rises, the hydraulic fluid in passageway 248 will again cause a return of the valve spool 230 to the position shown in Figure 8. Thus it may be seen that at times when the hydraulic system for the tool means is operated at negligible resistances, the compensator valve comprising valve spool 230 and valve bore 212 will operate to provide a normal torque reaction for the power divider 14, so that a corresponding normal engine torque may be transmitted to the traction means. The coiled spring 236 in the compensator valve is selected to provide a proper bias upon valve spool 230 so that the orifice will be formed at the proper moment when the pressure in passageway 238 begins to drop.

Assuming next that the hydraulic system for the tool means is to be operated while no tractive effort is desired at the wheels 26 of the tractor 10. In this situation, the lever 32 is operated to place spool 35 of the transmission control valve 24 in the parking position. This, as previously noted, places the reverse and forward brakes 127 and 128 in the transmission 15 in the on position, locking the traction members and the ring gear 96 of the power divider 14. Further, the parking valve comprising valve spool 249 and valve bore 213 in the main control valve 20 is operated to unblock passageway 253 and block passageway 238 from conduit 58. With the ring gear 96 of the power divider 14 locked against rotation, all of the engine power being developed is transmitted to the main hydraulic pump 16. With the compensating valve bypassed through the operation of the parking valve in the main control valve 20, there will be no difference in the operation of the boom and bucket control valve 21 with a light or heavy load on the tool means, thus assuring rapid action of the tool means through the unrestricted flow of the high pressure hydraulic fluid from passageway 227 through passageway 253, valve bore 213 about the depressed section 257 of the valve bore 249 and into and through conduit 58.

Having described the invention what is considered new and desired to be protected by Letters Patent is:

1. In a tractor loader, a tractor comprising an engine developing at any one throttle setting an output torque increasing from a certain value at minimum engine speeds to a maximum between said minimum speeds and governed speed and decreasing to the governed speed, traction means for said tractor, torque coupling means connected to receive said output torque and operable responsive to a torque reaction applied thereto for delivering varying amounts of said output torque to said traction means dependent upon the amount of said torque reaction, governing means operating responsive to the speed of said engine for applying a torque reaction to said torque coupling means of an amount to deliver full output torque to said traction means at engine speeds from the speed for maximum output torque to the governed speed for one throttle setting, and to deliver less than full output torque to said traction means at engine speeds less than the speed for maximum output torque for one throttle setting, and throttle means operating responsive to the throttle setting of said engine for applying a torque reaction to said torque coupling means which is additive of said applied torque reaction of said governor means to deliver full output torque to said traction means at engine speeds from the speed for maximum output torque to the governed speed for all throttle settings and to deliver less than full output torque to said traction means at engine speeds less than the speed for maximum output torque for all throttle settings.

2. In a tractor loader as claimed in claim 1, wherein said governor means further operates responsive to the speed of said engine at said minimum engine speeds thereof to apply no torque reaction to said torque coupling means and said throttle means further operates responsive to the minimum throttle setting to apply no torque reaction to said torque coupling means so that substantially no output torque is delivered to said traction means at said minimum engine speeds and minimum throttle setting.

3. In a tractor loader, a tractor comprising an engine developing at any one throttle setting an output torque increasing from a certain value at minimum engine speeds to a maximum between said minimum engine speeds and governed speed and decreasing to the governed speed, traction means for said tractor, a planetary set comprising a sun gear, a planet gear carrier, a plurality of planet gears journalled on said carrier, and a ring gear, said sun gear connected to receive said output torque, said ring gear connected to drive said traction means, brake means connected to said carrier and operable to control the speed of said carrier, governor means connected to operate said brake means, said governor means being formed to operate responsive to the speed of said engine to operate said brake means to substantially stop said carrier from rotation whereby the full output power of said engine is delivered to said ring gear at engine speeds from the speed for maximum output torque to the governed speed for one throttle setting and to operate said brake means to permit said carrier to rotate whereby less than the full output power of said engine is delivered to said ring gear at engine speeds less than the speed for maximum output torque for one throttle setting, and throttle means connected to operate said brake means, said throttle means being formed to operate responsive to the throttle setting of said engine to operate said brake means to substantially stop said carrier from rotation whereby the full output power of said engine is delivered to said ring gear at engine speeds from the speed for maximum output torque to the governed speed for all throttle settings and to operate said brake means to permit said carrier to rotate whereby less than the full output power of said engine is delivered to said ring gear at engine speeds less than the speed for maximum output torque for all throttle settings.

4. In a tractor loader, a tractor comprising an engine developing at any one throttle setting an output torque increasing from a certain value at the lowest operating engine speed to a maximum between said lowest operating speed and governed speed and decreasing to the governed speed, traction means for said tractor, a planetary set comprising one power input member and two power output members, said input member connected to receive said output torque from said engine, one of said power output members connected to drive said traction means, brake means connected to the other output of said two output members and operable to brake said other output member so that said output torque is transmitted to said one output member dependent upon the degree of operation of said brake means, governor means connected to operate said brake means, said governor means being formed to operate responsive to the speed of said engine to operate said brake means to substantially stop said other output member from rotation whereby the full output power of said engine is delivered to said one power output member at engine speeds from the speed for maximum output torque to the governed speed for one throttle setting and to operate said brake means to permit said other power output member to rotate whereby less than the full output power of said engine is delivered to said one power output member at engine speeds less than the speed for maximum output torque for one throttle setting, and throttle means connected to operate said brake means, said throttle means being formed to operate responsive to the throttle setting of said engine to operate said brake means to substantially stop said other output member from rotation whereby the full output power of said engine is delivered to said one output member at engine speeds from the speed for maximum output torque to the governed speed for all throttle settings and to operate said brake means to permit said other power output member to rotate whereby less than the full output power of said engine is delivered to said one power output member at engine speeds less than the speed for maximum output torque for all throttle settings.

5. In a vehicle having an engine developing an output torque, power dividing means comprising one power input member and two power output members, said input member being connected to receive said output torque from said engine, said power dividing means being formed to operate to transmit said output torque from said input member to one of said two output members in an amount dependent upon the amount of torque reaction of the other of said two power output members, traction means for said vehicle connected to be driven by said one output member, a hydraulic pump connected to be driven by said other output member and operating to apply a torque reaction on said other output member when the outlet of said pump is restricted, a hydraulic fluid operated valve connected to the outlet of said hydraulic pump and including a spool, said valve operable responsive to the application of hydraulic fluid under pressure from said pump to one end of said spool for passing hydraulic fluid from said pump and operable responsive to hydraulic fluid pressures delivered to the other end of said spool for restricting the passage of hydraulic fluid from said hydraulic pump, a throttle valve connected to the throttle of said engine and operating responsive to the throttle setting thereof to deliver hydraulic fluid pressures to said other end of said spool of said hydraulic fluid operated valve dependent upon the throttle setting, and a centrifugal governor valve connected to be driven by said engine and opening responsive to the speed of said engine to deliver hydraulic fluid pressures to said other end of said spool of said hydraulic fluid operated valve dependent upon the speed of said engine.

6. In a vehicle as claimed in claim 5, wherein said throttle valve and said centrifugal governor valve are formed to deliver hydraulic fluid pressures to said other end of said spool of said hydraulic fluid operated valve to operate said hydraulic fluid operated valve to restrict the passage of hydraulic fluid from the outlet of said hydraulic pump to a degree directly proportional to the throttle setting so that said hydraulic pump is substantially blocked to substantially stop said other output member whereby the full output power of said engine is delivered to said traction means at engine speeds from the speed for maximum output torque to the governed speeds for any throttle setting and so that the passage of hydraulic fluid from said hydraulic pump is partially blocked whereby less than the full output power of said engine is delivered to said traction means at engine speeds less than the speed for maximum output torque for any throttle setting.

References Cited in the file of this patent

UNITED STATES PATENTS

| | | |
|---|---|---|
| 1,689,537 | Sorensen | Oct. 30, 1928 |
| 1,997,682 | Emery | Apr. 16, 1935 |
| 2,026,777 | Dumble | Jan. 7, 1936 |
| 2,340,241 | Woods | Jan. 25, 1944 |
| 2,455,082 | Morith | Nov. 30, 1948 |
| 2,573,472 | Martin | Oct. 30, 1951 |
| 2,580,449 | Moat | Jan. 1, 1952 |
| 2,653,487 | Martin et al. | Sept. 29, 1953 |
| 2,661,806 | Nims et al. | Dec. 8, 1953 |
| 2,692,513 | Hattan | Oct. 26, 1954 |